US012252590B2

(12) United States Patent
Webster et al.

(10) Patent No.: US 12,252,590 B2
(45) Date of Patent: Mar. 18, 2025

(54) ACETOACETYLATED AND (METH)ACRYLATED RESIN COMPOSITIONS AND THERMOSETS AND FOAMS THEREFROM

(71) Applicant: NDSU RESEARCH FOUNDATION, Fargo, ND (US)

(72) Inventors: Dean C. Webster, Fargo, ND (US); Eric M. Krall, Minneapolis, MN (US); Kelly M. Sutko, Maple Grove, MN (US); Alexander T. Hart, Farmington, MN (US); Karan Bansal, Fargo, ND (US); Mohiuddin Quadir, West Fargo, ND (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 870 days.

(21) Appl. No.: 17/106,866

(22) Filed: Nov. 30, 2020

(65) Prior Publication Data
US 2021/0171720 A1    Jun. 10, 2021

Related U.S. Application Data

(63) Continuation-in-part of application No. 15/794,500, filed on Oct. 26, 2017, now Pat. No. 10,851,244.
(Continued)

(51) Int. Cl.
*C08H 7/00* (2011.01)
*C08J 9/14* (2006.01)
*C08L 97/00* (2006.01)

(52) U.S. Cl.
CPC ............... *C08H 6/00* (2013.01); *C08J 9/141* (2013.01); *C08L 97/005* (2013.01);
(Continued)

(58) Field of Classification Search
CPC ......... C08H 6/00; C08J 9/141; C08J 2203/14; C08J 2397/00; C08J 2483/04; C08L 97/005
See application file for complete search history.

(56) References Cited

U.S. PATENT DOCUMENTS

2007/0173602 A1* 7/2007 Brinkman .............. C09J 133/14
524/592

FOREIGN PATENT DOCUMENTS

CN     105780474 A      7/2016
EP      1165713 B1 *    1/2003   ......... C08G 18/0823

OTHER PUBLICATIONS

Dziurka et al., "The Effect of Grafting Particles with Acetoacetyl Groups on the Properties of Particleboards," Elec. J. Polish Agric. Univ., Wood Tech., vol. 6, Issue 2 [retrieved on Apr. 13, 2019]. Retrieved from the Internet:< URL: http://www.ejpau.media.pl/articles /volume6/issue2/wood/art-02.pdf > (Year: 2003).
(Continued)

*Primary Examiner* — Ling Siu Cho
*Assistant Examiner* — Andrea Wu
(74) *Attorney, Agent, or Firm* — RAPHAEL BELLUM PLLC

(57) ABSTRACT

The invention relates to acetoacetylated lignin resin compositions comprising the reaction product of lignin and an acetoacetate ester. The invention also relates to (meth) acrylated lignin resin compositions comprising the reaction product of lignin and a (meth)acrylic compound. The invention also relates to methods of making the acetoacetylated and (meth)acrylated lignin resin compositions. The invention also relates to curable coating compositions comprising the acetoacetylated and (meth)acrylated lignin resin compositions. The invention also relates to methods of making the curable coating compositions of the invention. The invention also relates to methods of applying curable coating
(Continued)

compositions of the invention to substrates. The invention also relates to articles of manufacture comprising a curable coating composition of the invention and a method of making such article. The invention also relates to foam materials comprising the reaction product of an acetoacetylated resin composition, a polyamine compound, and a physical blowing agent and/or a polysiloxane compound.

21 Claims, 50 Drawing Sheets

Related U.S. Application Data

(60) Provisional application No. 62/413,225, filed on Oct. 26, 2016.

(52) U.S. Cl.
CPC ........ *C08J 2203/14* (2013.01); *C08J 2397/00* (2013.01); *C08J 2483/04* (2013.01)

(56) References Cited

OTHER PUBLICATIONS

CN 105780474 A, machine translation, EPO Espacenet. (Year: 2016).

\* cited by examiner

FIG. 14A
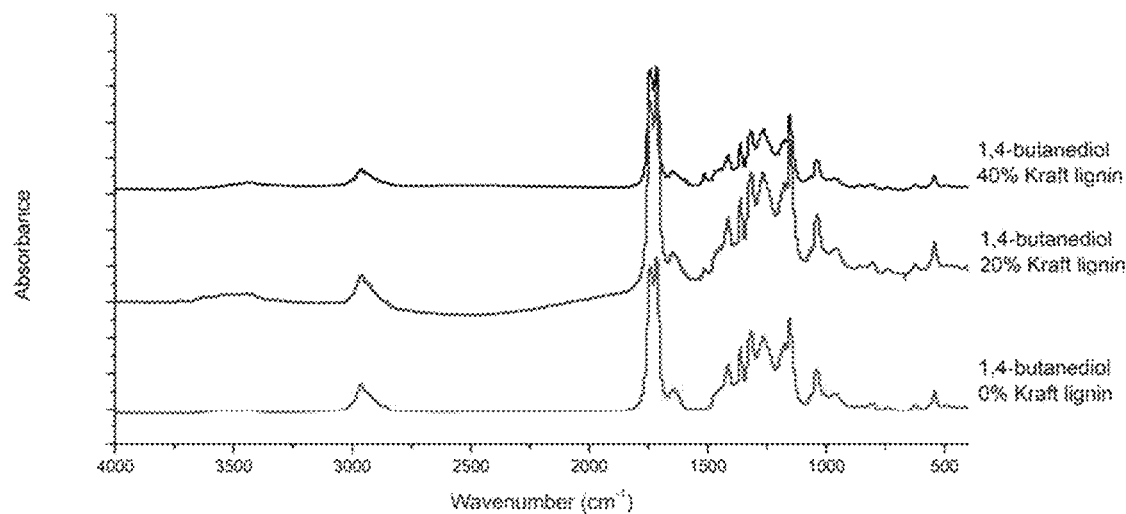
FIG. 14B
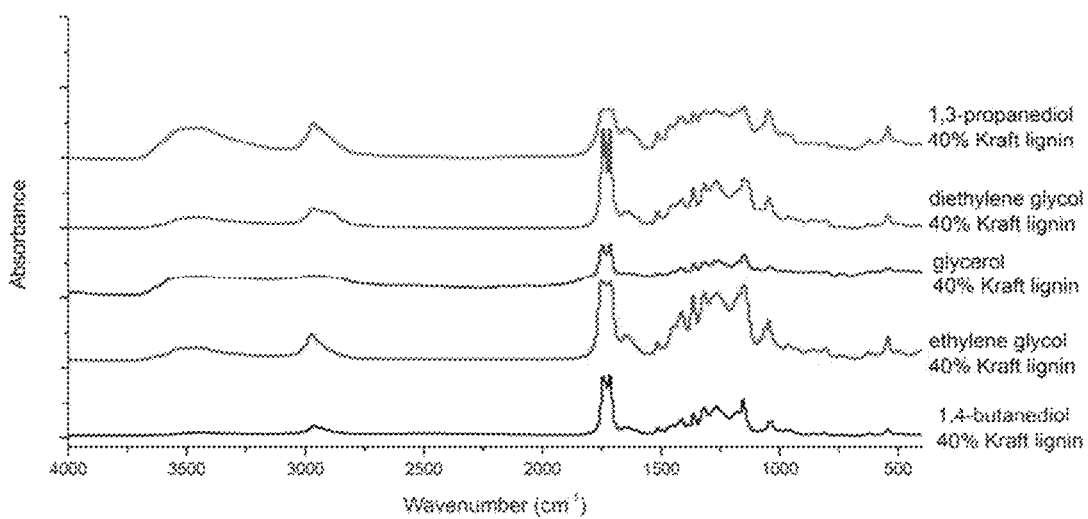
FIG. 14

FIG 24E
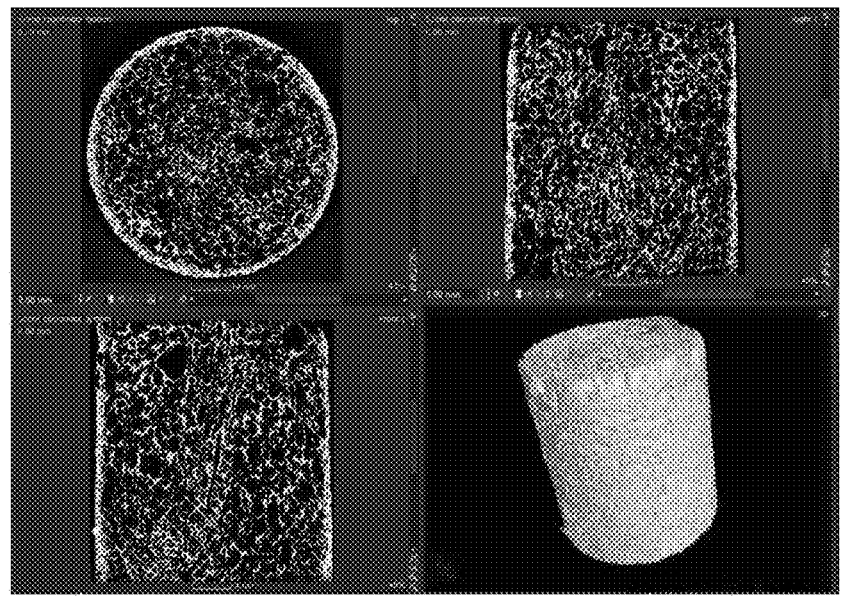
FIG 24F
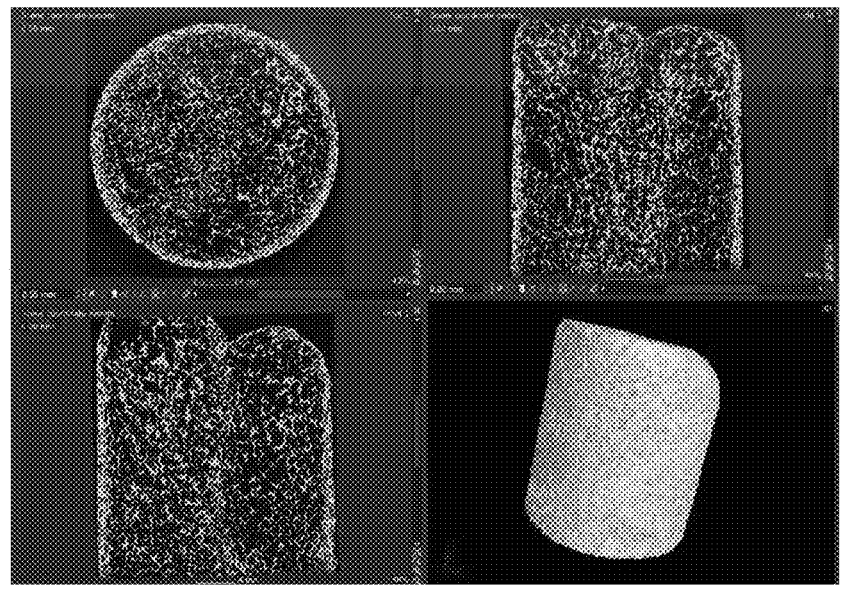
FIG. 24

ACETOACETYLATED AND (METH)ACRYLATED RESIN COMPOSITIONS AND THERMOSETS AND FOAMS THEREFROM

CROSS-REFERENCE TO RELATED APPLICATIONS

This application is a continuation-in-part application of U.S. patent application Ser. No. 15/794,500, filed Oct. 26, 2017, which claims priority to U.S. Provisional Application No. 62/413,225, filed Oct. 26, 2016, the disclosures of each of which are incorporated herein by reference.

STATEMENT OF US GOVERNMENT SUPPORT

This invention was made with government support under IIA-1330840 and IIA-1355466 awarded by the National Science Foundation (NSF). The US government has certain rights in the invention.

BACKGROUND OF THE INVENTION

Green chemistry has been a very hot topic recently with the development of sustainable materials becoming a focal point for many research groups. Bennett et al., Role of continuous flow processes in green manufacturing of pharmaceuticals and specialty chemicals. *Current Opinion in Chemical Engineering* 2019, 26, 9-19; Jawerth et al., Mechanical and Morphological Properties of Lignin-based Thermosets. *ACS Applied Polymer Materials* 2020, 2, 668-676. Green Chemistry is built around 12 principles. Ivanković et al., Review of 12 principles of Green chemistry in practice. *International Journal of Sustainable and Green Energy* 2017, 6 (3), 39. One of the principles is the use of renewable feedstocks. Of sources of renewable feedstocks, plant material is the most abundant. Lligadas et al., Oleic and undecylenic acids as renewable feedstocks in the synthesis of polyols and polyurethanes. *Polymers* 2010, 2 (4), 440-453. There are three major components that come from plants: Lignin, Cellulose, and Hemicellulose. Mansora et al., Characteristics of Cellulose, Hemicellulose and Lignin of MD2 Pineapple Biomass. *Chemical Engineering* 2019, 72.

Lignin is a biopolymer that is branched and makes up about 15-30% of biomass from plant material. Mansora et al., Characteristics of Cellulose, Hemicellulose and Lignin of MD2 Pineapple Biomass. *Chemical Engineering* 2019, 72. It is a key component of woody plants and is found in the cell walls of plants that grow on dry land. Lignin's rigidity and protects the plant from microbial degradation. Unlike other plant-based polymers, lignin is not made up of carbohydrate monomers. Lignin is a polymer made up of a mixture of aromatic alcohols, the monolignols. Lignin is synthesized via an enzymatic oxidation and subsequent free radical polymerization of its monomeric monolignol constituents according to Scheme 1. Krall et al., Catalyst-free lignin valorization by acetoacetylation. Structural elucidation by comparison with model compounds. *Green Chemistry* 2018, 20 (13), 2959-2966.

Scheme 1. Reaction Scheme of Radical Polymerization of Lignin Monomers

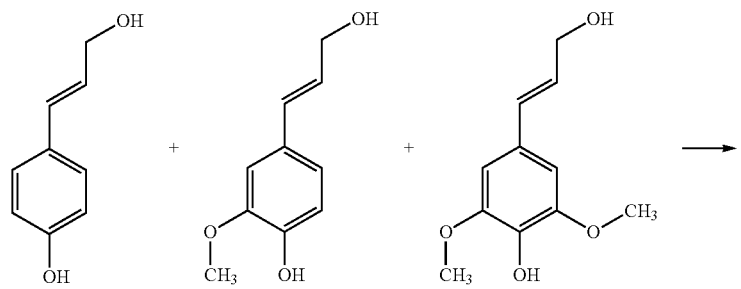

-continued

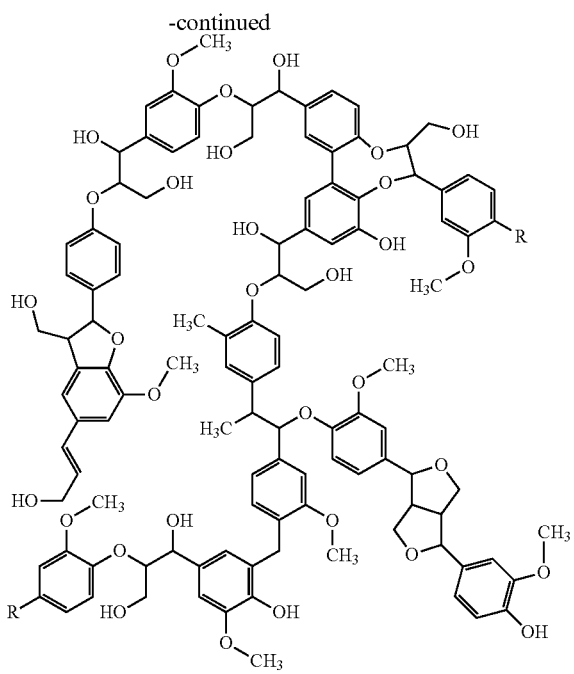

Monolignols include p-coumaryl alcohol, coniferyl alcohol, and sinapyl alcohol, represented by the molecules from left to right in Scheme 1. Lignin therefore possesses significant hydroxyl functionality. Commercially, lignin is sourced from wood products and produced in a pulping process to convert wood into wood pulp and extract cellulose. One type of lignin, Kraft lignin results from the Kraft or sulfate pulping process which uses sodium hydroxide and sodium sulfide to break the bonds between lignin and cellulose.

Currently lignin is treated as a waste product in the pulp and paper industries and is burned to provide energy for cellulose extraction. With green chemistry and other environmental concerns in mnd, a need exists to find productive uses for lignin beyond its current limited uses.

Research has been focused on the depolymerization and fractionation of lignin. Jawerth et al., Mechanical and Morphological Properties of Lignin-based Thermosets. *ACS Applied Polymer Materials* 2020, 2, 668-676; Zakzeski et al., The catalytic valorization of lignin for the production of renewable chemicals. *Chemical reviews* 2010, 110(6), 3552-3599. There have been some approaches to create products directly from lignin. Monteil-Rivera et al., Solvent-free catalyst-free microwave-assisted acylation of lignin. *Industrial Crops and Products* 2015, 65, 446-453. No matter the approach, the nature of kraft lignin makes any research complicated. This is because kraft lignin is decomposed and put back together again multiple times. This happens during the kraft paper process which seeks to maximize the amount of paper that is obtained from the starting plant material. Silva et al., Effect of lignin carbohydrate complexes of hardwood hybrids on the kraft pulping process. *Journal of Wood Chemistry and Technology* 2017, 37 (1), 52-61. The process therefore creates a wide range of molecular weights with a high degree of polydispersity. McClelland et al., Functionality and molecular weight distribution of red oak lignin before and after pyrolysis and hydrogenation. *Green Chemistry* 2017, 19 (5), 1378-1389. This makes any scheme with reproducibility a challenge.

In the foam industry, the largest share of the market is dominated by polyurethane foams. Calvert et al., *Characterization of commercial rigid polyurethane foams used as bone analogs for implant testing. Journal of Materials Science: Materials in Medicine* 2010, 21 (5), 1453-1461; Şerban et al., Evaluation of the mechanical and morphological properties of long fibre reinforced polyurethane rigid foams. *Polymer Testing* 2016, 49, 121-127; Wang et al., Pore structures and thermal insulating properties of high Nb containing TiAl porous alloys. *Journal of alloys and compounds* 2010, 492 (1-2), 213-218; Cornille et al., A new way of creating cellular polyurethane materials: NIPU foams. *European Polymer Journal* 2015, 66, 129-138. This is due to polyurethanes' cost effectiveness, strength, and reliability. The general method of creating a polyurethane is to use a polyol which reacts with an isocyanate to generate a polyurethane. This reaction scheme can be seen in Scheme 2. This reaction does however have some drawbacks. One of the largest and most studied drawbacks is the use of isocyanates. Cornille et al., A new way of creating cellular polyurethane materials: NIPU foams. *European Polymer Journal* 2015, 66, 129-138; Xi et al., Non-isocyanate polyurethane adhesive from sucrose used for particleboard. *Wood Science and Technology* 2019, 53 (2), 393-405; Wilkes et al., Nonisocyanate polyurethane materials, and their preparation from epoxidized soybean oils and related epoxidized vegetable oils, incorporation of carbon dioxide into soybean oil, and carbonation of vegetable oils. U.S. Pat. No. 7,045,577, 2006; Delebecq et al., On the versatility of urethane/urea bonds: reversibility, blocked isocyanate, and non-isocyanate polyurethane. *Chemical reviews* 2013, 113 (1), 80-118; Guan et al., Progress in study of non-isocyanate polyurethane. *Industrial & Engineering Chemistry Research* 2011, 50 (11), 6517-6527; Figovsky et al., Ultraviolet and thermostable non-isocyanate polyurethane coatings. *Surface Coatings International Part B: Coatings Transactions* 2005, 88 (1), 67-71.

This group of chemicals are toxic to both produce and handle. Therefore, removing isocyanates from the production of polyurethanes has become paramount in increasing the sustainability of the foam industry.

Scheme 2. General Reaction Scheme of Polyurethanes

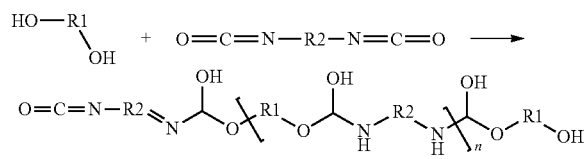

One of the methods to make non-isocyanate polyurethane foams is by using a silane blowing agent as well as polyfunctional amines along with a cyclic carbonate. Cornille et al., A new way of creating cellular polyurethane materials: NIPU foams. *European Polymer Journal* 2015, 66, 129-138. The reaction scheme is shown below in Scheme 3.

Scheme 3. Reaction Scheme of Polyfunctional Amine and Silane Blowing Agent to Make Polyurethane Foams

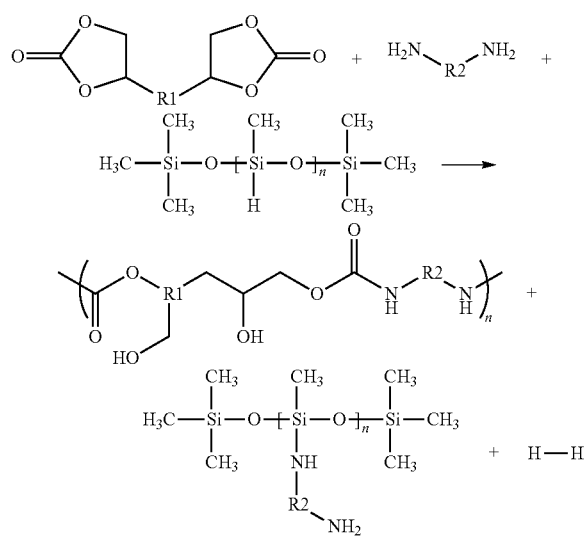

This reaction scheme is particularly useful because it makes use of a silane blowing agent which can react into the system to increase the atom economy of foams made with lignin. Increasing atom economy is also another tenant of Green Chemistry. Ivanković et al., Review of 12 principles of Green chemistry in practice. *International Journal of Sustainable and Green Energy* 2017, 6 (3), 39. In theory, the only loss comes from the hydrogen gas that is evolved from reaction of the amine with the silane and serves as the blowing agent for the foam. This system can further be extrapolated by switching from a bifunctional amine to trifunctional amine. This allows for crosslinking to occur between both the kraft lignin resin and silane blowing agent.

Different types of foams are available commercially. Some foams are used for insulation and are more rigid. Șerban et al., Evaluation of the mechanical and morphological properties of long fibre reinforced polyurethane rigid foams. *Polymer Testing* 2016, 49, 121-127. Other types of foams are deliberately soft and flexible which are used for medical dressings and other applications. Swaniker et al., Super soft foams. U.S. Pat. No. 9,808,554, 2017. There are classes of foams that are even more rigid than insulating foams which have very high compression resistance. These foams are called structural foams. Zepnik et al., Structural Foams of Biobased Isosorbide-Containing Copolycarbonate. *International Journal of Polymer Science* 2017, 4308687. Applications for these are often found in the structural components of buildings. Mazzon et al., Biobased structural epoxy foams derived from plant-oil: Formulation, manufacturing and characterization. *Industrial Crops and Products* 2020, 144, 111994. These foams have a cellular core with a very rigid and strong outer skin. Cellular refers to a solid with thin walls that surround air pockets. This allows the foam to maintain its rigidity while reducing its weight and cost. Zepnik et al., Structural Foams of Biobased Isosorbide-Containing Copolycarbonate. *International Journal of Polymer Science* 2017, 4308687. The application for the foams made with acetoacetylated kraft lignin resins could be in this very market. The foams have low density while maintaining high strength and good adhesion. One possible avenue is sandwiching the foam between two pieces of wood to make a rigid composite. This would be a cost-effective way to increase the load that a wall may need to bear. The other application that is seen already in use is in the construction of boats. Mazzon et al., Biobased structural epoxy foams derived from plant-oil: Formulation, manufacturing and characterization. *Industrial Crops and Products* 2020, 144, 111994. This is due to the lightweight properties that structural foam has combined with its high strength.

Foams also have differences in how the cells arrange themselves. There are two major categories, open cell and closed cell. Mills, *Polymer foams handbook: engineering and biomechanics applications and design guide*. Elsevier: 2007. This difference comes with whether the air pockets within the foams are connected to each other. Closed cell foams have completely contained air pockets with none of the cell walls being broken. Open cell are the opposite with the cells that are broken and connected to one another. Mills, *Polymer foams handbook: engineering and biomechanics applications and design guide*. Elsevier: 2007. It is possible to have a combination of the two with the foam containing both open and closed cells.

One of the largest uses of polyurethanes is in insulation. A requirement is that the foams have flame retardance. Lignin is naturally fire retardant. Mandlekar et al., An Overview on the Use of Lignin and Its Derivatives in Fire Retardant Polymer Systems. In *Lignin-Trends and Applications*, IntechOpen: 2018. Upon heating, lignin will decompose and recondense rapidly to form char. Brodin et al., The behavior of kraft lignin during thermal treatment. *Journal of Analytical and Applied Pyrolysis* 2010, 87 (1), 70-77. The newly formed char helps to protect the underlying vital organs of the tree from being killed during a fire event. However, it is desirable to provide even greater fire retardancy. One of the ways insulation is made fire retardant is by using intumescent agents, such as phytic acid (Scheme 4). Zhang et al., Chitosan/phytic acid polyelectrolyte complex: a green and renewable intumescent flame retardant system for ethylene-vinyl acetate copolymer. *Industrial & Engineering Chemistry Research* 2014, 53 (49), 19199-19207; Gao et al., A novel bio-based flame retardant for polypropylene from phytic acid. *Polymer Degradation and Stability* 2019, 161, 298-308; Kalali et al., Effect of phytic acid-modified layered double hydroxide on flammability and mechanical properties of intumescent flame retardant polypropylene system. *Fire and Materials* 2018, 42 (2), 213-220. Phytic acid is readily extracted from biomass, specifically plant material. Zhang et al., Chitosan/phytic acid polyelectrolyte complex: a green and renewable intumescent flame retardant system for ethylene-vinyl acetate copolymer. *Industrial & Engineering Chemistry Research* 2014, 53 (49), 19199-19207; Gao et al., A novel bio-based flame retardant for polypropylene from phytic acid. *Polymer Degradation and Stability* 2019, 161, 298-308; Li et al., One-step assembly of phytic acid metal complexes for superhydrophilic coatings. *Angewandte Chemie* 2016, 128 (31), 9239-9242.

Scheme 4. Phytic Acid Structure

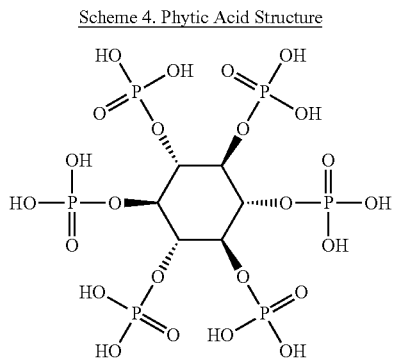 [SMILES: O=P(O)(O)O[C@H]1[C@H](OP(=O)(O)O)[C@@H](OP(=O)(O)O)[C@H](OP(=O)(O)O)[C@@H](OP(=O)(O)O)[C@@H]1OP(=O)(O)O]

BRIEF DESCRIPTION OF THE FIGURES

FIG. 14 shows the FTIR of acetoacetylated Kraft lignin resins made with 1,4-butanediol (FIG. 14A), and the FTIR of acetoacetylated resins made with different reactive diluents and 40% Kraft lignin (FIG. 14B).

SUMMARY OF THE INVENTION

Figure 1A:
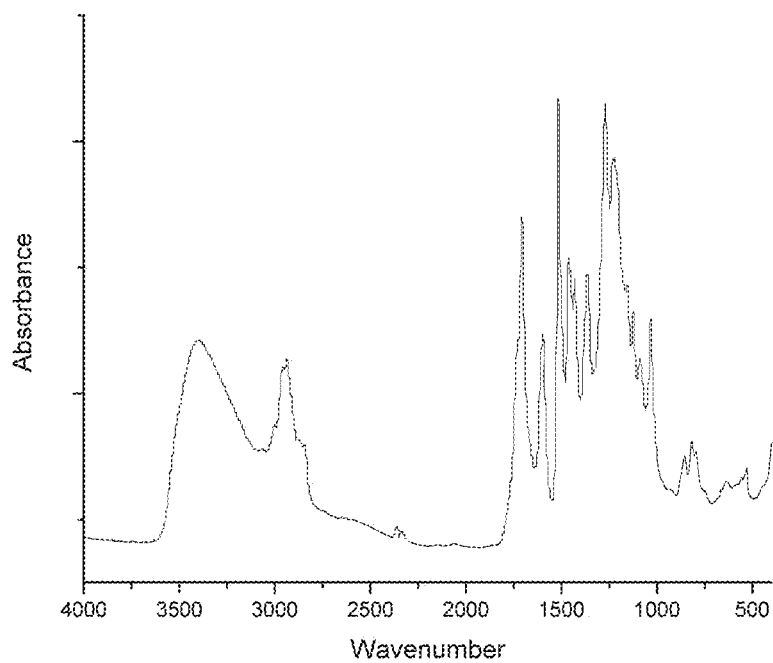
FIG. 1 shows the FTIR spectra for the depolymerized Kraft lignin described in Example 1, reactions 1-1 (FIG. 1A), 1-3 (FIG. 1B), 1-4 (FIG. 1C), and 1-7 (FIG. 1D), respectively.
Figure 1B:
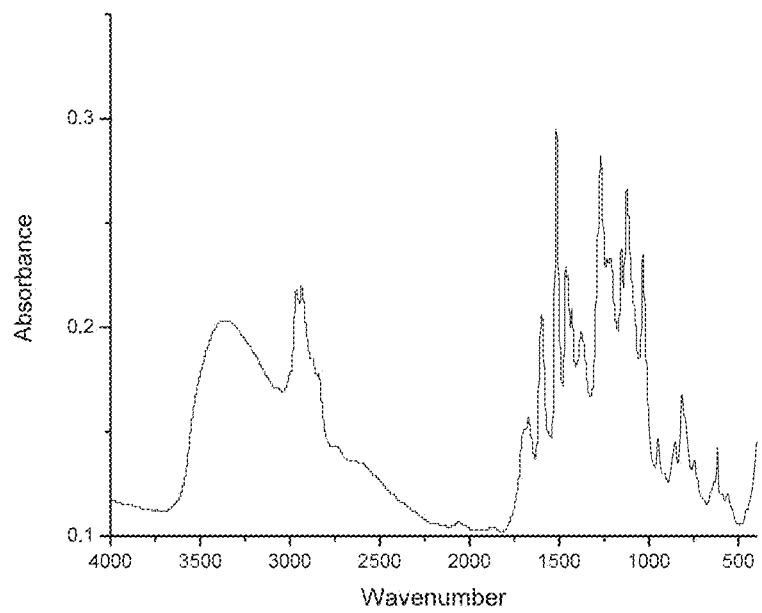

The invention relates to acetoacetylated lignin resin compositions comprising, consisting essentially of, or consisting of the reaction product of lignin and an acetoacetate ester. The invention further relates to (meth)acrylated lignin resin compositions comprising, consisting essentially of, or consisting of the reaction product of lignin and a (meth)acrylic compound. The invention also relates to methods of making the acetoacetylated and (meth)acrylated lignin resin compositions.

The invention also relates to curable coating compositions comprising, consisting essentially of, or consisting of the acetoacetylated and (meth)acrylated lignin resin compositions and methods of making the curable coating compositions.

The invention also relates to methods of applying the curable coating compositions to substrates, and articles of manufacture comprising, consisting essentially of, or consisting of the curable coating compositions and methods of making the articles.

The invention further relates to a foam material, comprising, consisting essentially of, or consisting of the reaction product of: a) at least one acetoacetylated resin composition, including the acetoacetylated lignin resin compositions of the invention; b) at least one polyamine compound; c) at least one physical blowing agent and/or at least one polysiloxane compound; d) optionally at least one surfactant; e) optionally phytic acid; and f) optionally at least one additive.

DESCRIPTION OF THE INVENTION

The invention relates to acetoacetylated lignin resin compositions comprising, consisting essentially of, or consisting of the reaction product of lignin and an acetoacetate ester. The invention further relates to (meth)acrylated lignin resin compositions comprising, consisting essentially of, or consisting of the reaction product of lignin and a (meth)acrylic compound. The invention also relates to methods of making the acetoacetylated and (meth)acrylated lignin resin compositions.

The invention also relates to curable coating compositions comprising, consisting essentially of, or consisting of the acetoacetylated and (meth)acrylated lignin resin compositions and methods of making the curable coating compositions.

The invention also relates to methods of applying the curable coating compositions to substrates, and articles of manufacture comprising, consisting essentially of, or consisting of the curable coating compositions and methods of making the articles.

The invention further relates to a foam material, comprising, consisting essentially of, or consisting of the reaction product of: a) at least one acetoacetylated resin composition, including the acetoacetylated lignin resin compositions of the invention; b) at least one polyamine compound; c) at least one physical blowing agent and/or at least one polysiloxane compound; d) optionally at least one surfactant; e) optionally phytic acid; and f) optionally at least one additive.

The acetoacetylated and (meth)acrylated lignin resin compositions of the invention are based on lignin, a byproduct of paper pulping, and thus could be low cost bio-based resins. Being a direct byproduct of pulping processes makes lignin an excellent source of terrestrial carbon that could be developed into thermoplastic and thermosetting polymers. The resins of the invention may be prepared using lignin directly as produced. Lignin can also be degraded (depolymerized) into lower molecular weight compounds using methods known the art. Lignin and depolymerized lignin contain both aliphatic and aromatic hydroxyl groups. Resins of the invention may be prepared using lignin or depolymerized lignin.

Lignin and depolymerized lignin contain both aliphatic and aromatic hydroxyl groups. Taking advantage of this hydroxyl functionality, the lignin used in the resin compositions is functionalized to introduce acetoacetate functionality. An advantage of acetoacetylated lignin is that it should have a lower viscosity than lignin due to a reduction of hydrogen bonding. Sufficient amounts of acetoacetylation should also render the functionalized lignin a viscous liquid. The acetoacetylated lignin can be crosslinked to form thermosets by reaction with amines, polyisocyanates, or melamine-formaldehyde resins.

According to the invention, lignin is functionalized with acetoacetate groups. Lignin may be used as it is produced in a pulping process or may be depolymerized first using methods known in the art prior to functionalization or it may be functionalized with acetoacetate groups directly. An acetoacetylated lignin of the invention has improved solubility over lignin and is a viscous liquid rather than a solid.

Acetoacetate groups may be introduced into a lignin by transesterification with an acetoacetate ester molecule, such as methyl acetoacetate, ethyl acetoacetate, or t-butyl acetoacetate (tBAA), preferably tBAA. Scheme 5 shows this for tBAA below. The esterification of a polyol to form acetoacetylated polyols is known in the art and has been described in U.S. Pat. No. 4,551,523, which is incorporated herein by reference. Acetoacetylation can also be carried out by the reaction of a hydroxyl group with diketene. Clemens, Diketene, *Chemical Reviews,* 1986, 86, 241-318.

Scheme 5

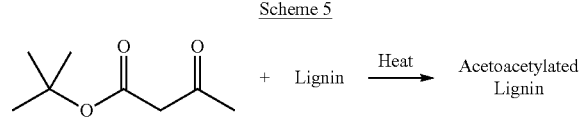

Representative structures of Kraft lignin and acetoacetylated Kraft lignin are shown below in Scheme 6. A representative structure of depolymerized lignin (also known as partially depolymerized lignin) is also shown below where "n" indicates its remaining polymeric nature. The "R" groups indicate other portions of the lignin due to its complex structure.

Scheme 6
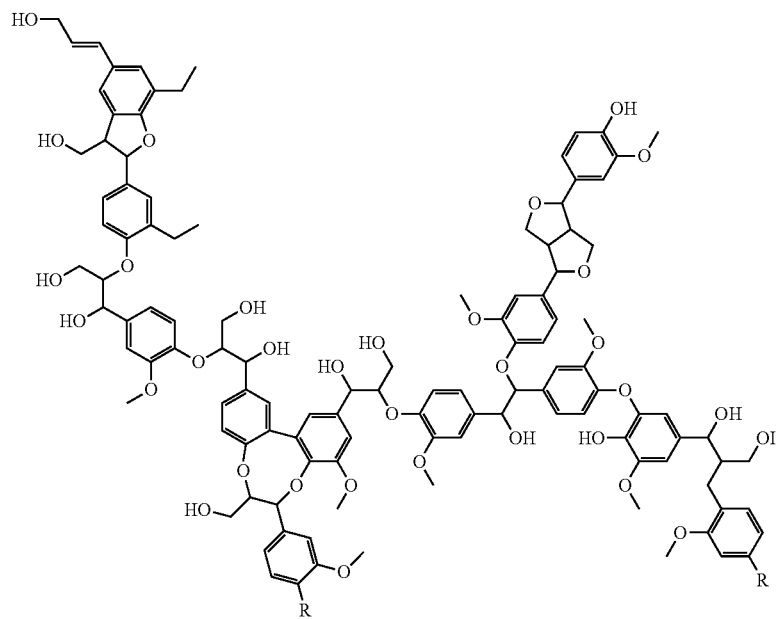
(A) Representative structure of Kraft Lignin.
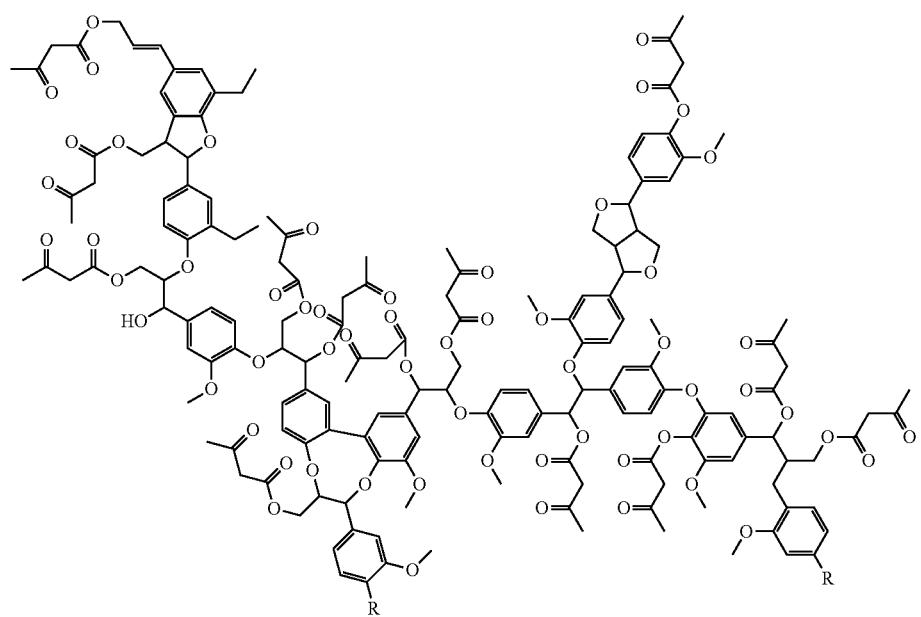
(B) Representative structure of acetoacertylated Kraft Lignin.

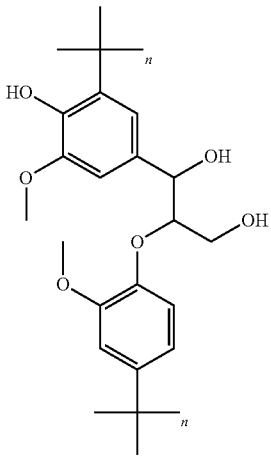

(C) Representative structure of depolymerized lignin.

The number of acetoacetoxy groups introduced into the lignin may be varied. The lignin may be fully acetoacetylated, where substantially all of the hydroxyl groups have been replaced with acetoacetoxy groups, or it may be partially acetoacetylated, where only a fraction of the available hydroxyl groups has been replaced with acetoacetoxy groups. It is understood in the art that some residual hydroxyl groups may remain, even when full acetoacetylation is desired. In some applications, as discussed below, residual hydroxyl groups may provide benefits to the resin. When substantially all of the hydroxyl groups are converted to acetoacetoxy groups, this correspond to a 1:1 ratio of hydroxyl groups to acetoacetoxy groups and where a portion of the acetoacetoxy groups is converted the ratio is less than 1:1. Only a portion of the hydroxyl groups of the lignin may be replaced by acetoacetoxy groups. Different lignins from different sources and processes contain different compositions and differing amounts of hydroxyl groups. In addition, lignins contain different types of hydroxyl groups: primary aliphatic, secondary aliphatic, and aromatic. These hydroxyl groups may have different reactivity toward acetoacetylation. As an example, an analysis of Indulin AT indicated that approximately 26% of the hydroxyl groups were primary aliphatic, 17% were secondary aliphatic, and 57% were phenolic. Cateto et al., J. Applied Polymer Science, 109:3008-3017 (2008). Reaction conditions could be such that only the primary aliphatic hydroxyl groups are acetoacetylated, leading to 26% of the hydroxyl groups being acetoacetylated, both the primary and secondary aliphatic hydroxyl groups could be acetoacetylated, leading to 43% of the hydroxyl groups being acetoacetylated, or all of the hydroxyl groups could be acetoacetylated. It is preferred to have at least 25%, more preferably at least 35%, even more preferable at least 40%, and even more preferable at least 45% of the hydroxyl groups acetoacetylated to provide sufficient a number of functional groups for crosslinking. It is also possible that even higher amounts are satisfactory.

The invention also relates to acetoacetylated lignin resins prepared in the presence of a polyol as the solvent, as shown in Scheme 7 below, where the group R represents the internal structure of a terminal diol as a representative polyol.

Scheme 7
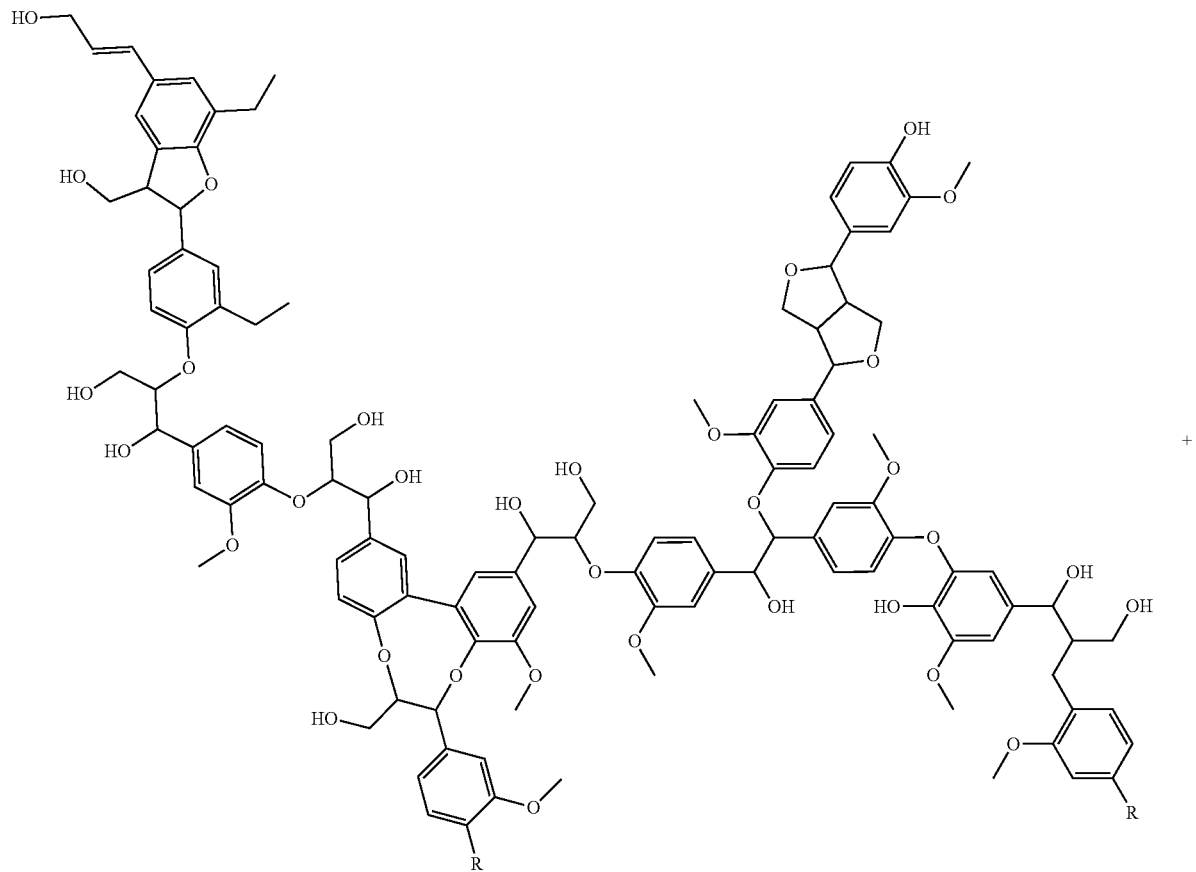
+
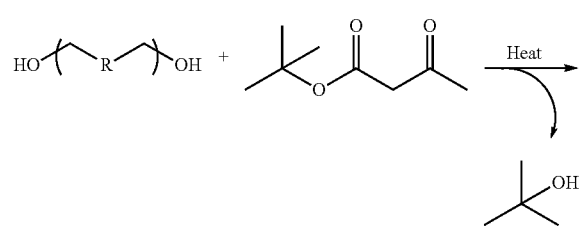

17 18
-continued
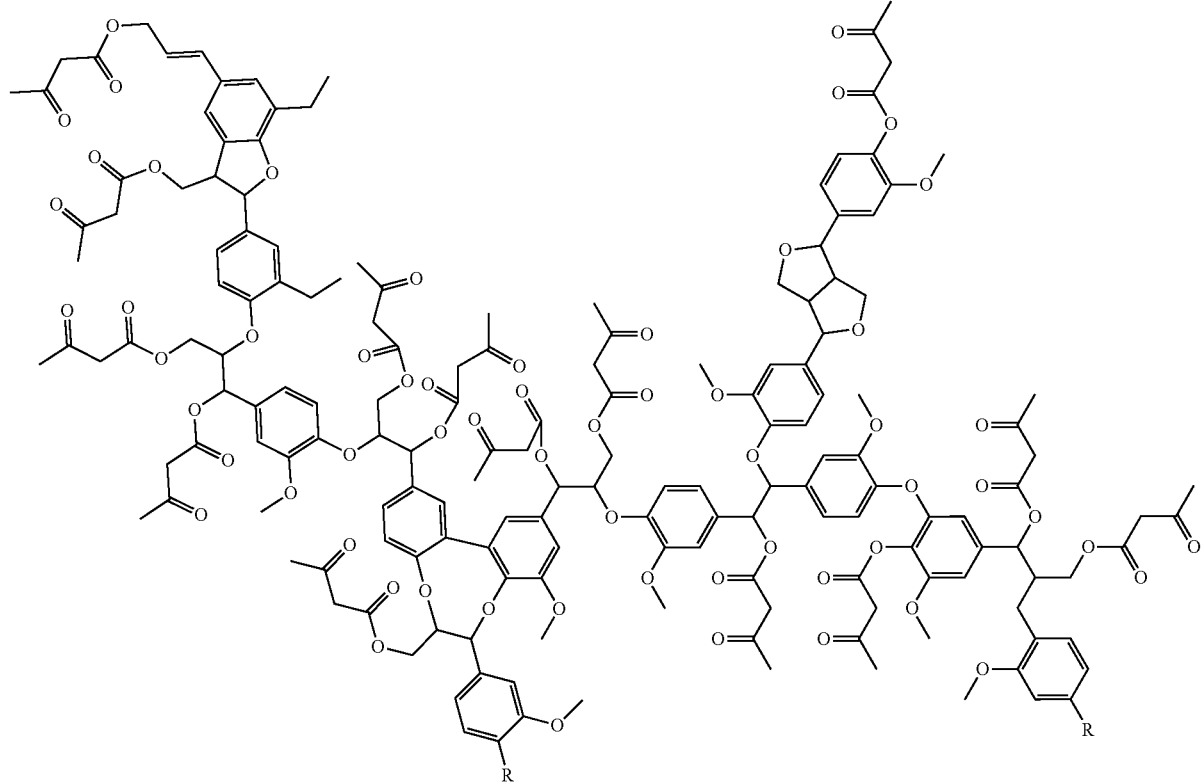
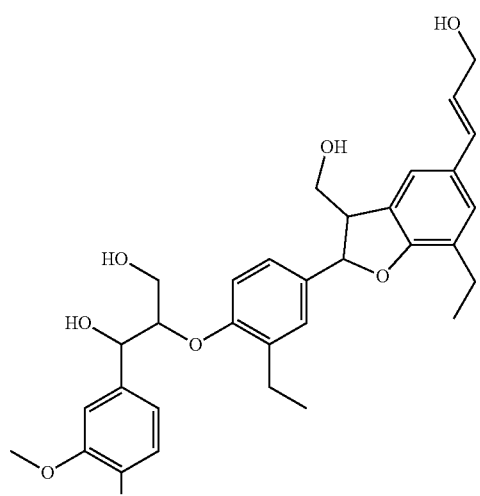

-continued
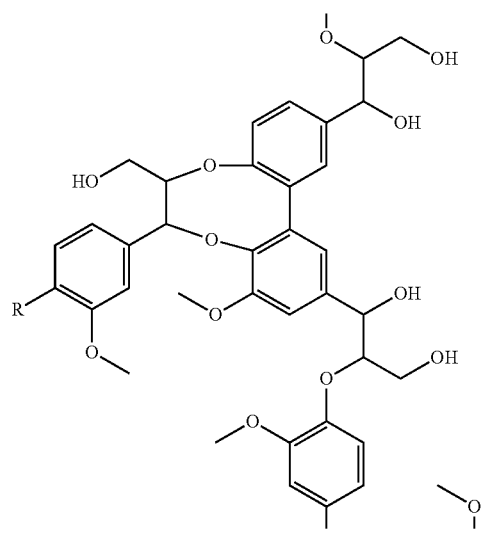
+
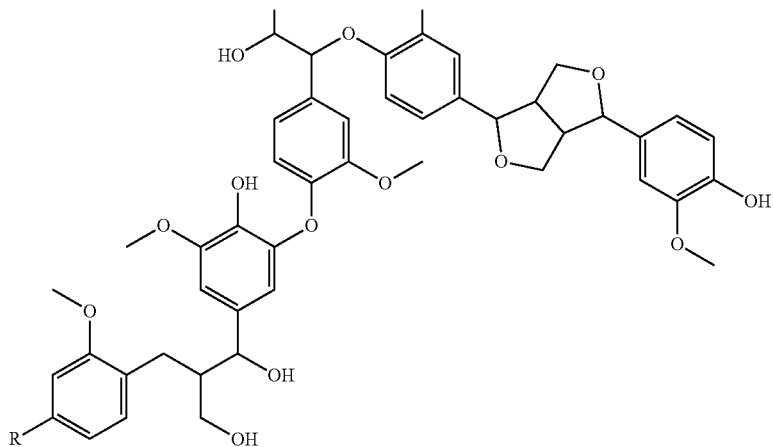
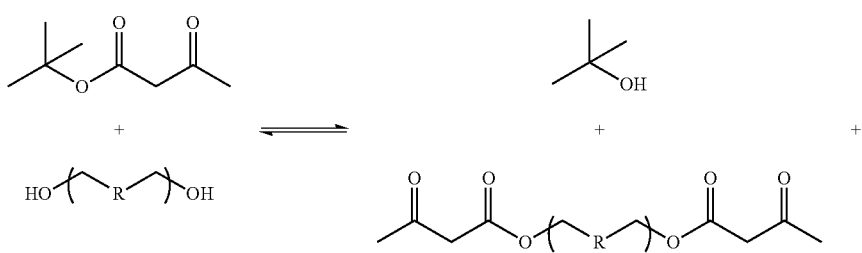

-continued
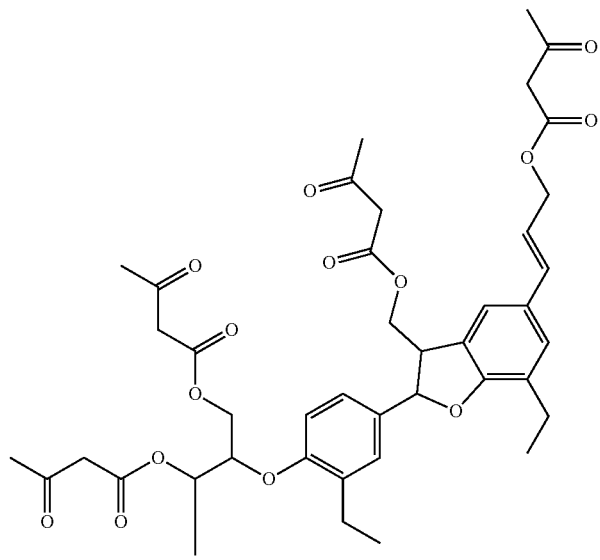
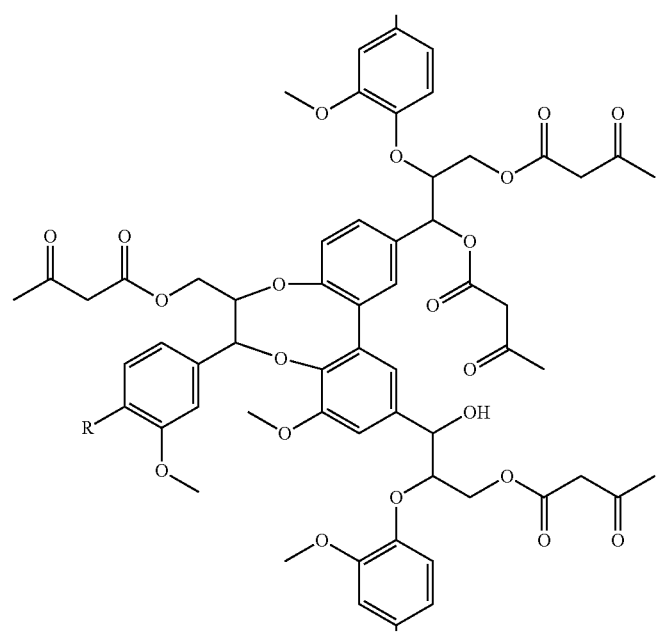

-continued

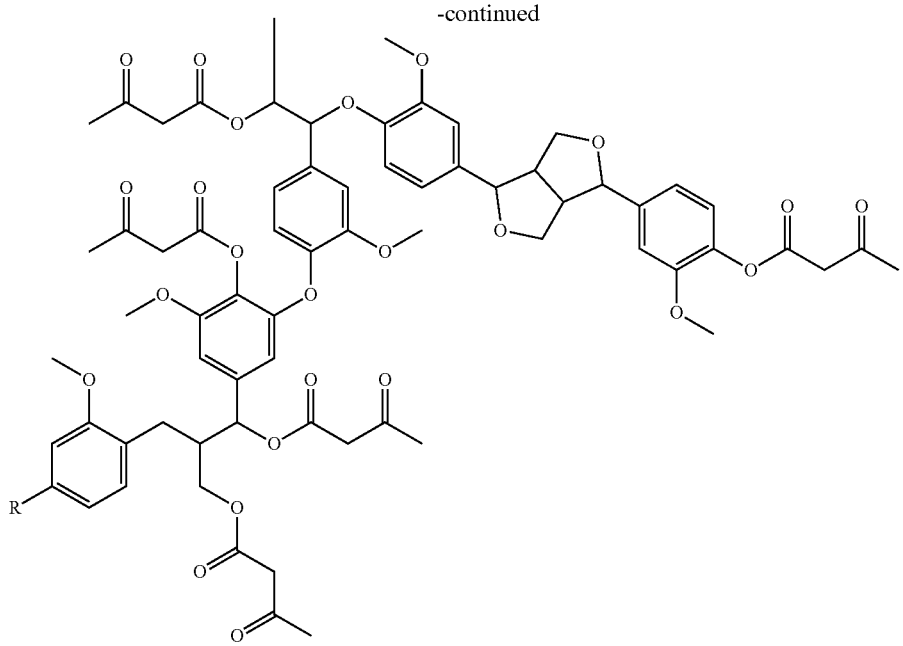

Kraft lignin is soluble in polyols. A homogeneous mixture of lignin in polyol can be prepared and the mixture readily acetoacetylated. During the acetoacetylation reaction, both the hydroxyl groups on the lignin as well as the hydroxyl groups on the polyol will be acetoacetylated. The resulting product mixture is completely reactive, does not contain volatile solvents, and can be used to prepare thermoset (crosslinked) materials. The acetoacetylated polyol remaining in the product mixture acts as a reactive diluent in the crosslinking of AAKL resins. A further advantage of this process is that a solvent is not used to solubilize the lignin that would have to be removed after the reaction is completed, thus, this process does not generate any waste.

Diols may be used as a polyol and include, but are not limited to, $C_2$-$C_{10}$ alkyl diols and $C_2$-$C_{10}$ alkylether diols. For example, exemplary diols that may be used in the invention include, but are not limited to, diethylene glycol (DEG), 2-butyl-2-ethyl-1,3-propanediol (BEPD), ethylene glycol, 1,2-propanediol, 1,3-propanediol, 2-methyl-1,3-propanediol, 1,4-butanediol, 2,3-butanediol, 1,5-pentanediol, 1,6-hexanediol, 1,4-cyclohexanedimethanol, neopentyl glycol (NPG), 2-butyl, 2-ethyl-1,3-propanediol (BEPD), and mixtures thereof.

The polyol may also be a triol compound that includes, but is not limited to, $C_3$-$C_{10}$ alkyl triols. Exemplary triols that may be used in the invention include, but are not limited to, trimethylolpropane (TMP), trimethylol ethane (TME), glycerol, and mixtures thereof. Triols may be added to introduce some branched oligomers. Mixtures of triols may be used as well as mixtures of diols and triols as the polyol component.

Like lignin, the number of acetoacetoxy groups introduced into the polyol may be varied. The polyol may be fully acetoacetylated, where all or substantially all of the hydroxyl groups are replaced with acetoacetoxy groups, or it may be partially acetoacetylated, where only a fraction of the available hydroxyl groups are replaced with acetoacetoxy groups (e.g., >50%, >60%, >70%, >80%, >90%, >95%, and >98%).

As discussed above, lignin is soluble in polyols and so a convenient method to functionalize lignin is to dissolve it in one or more polyols and then functionalize the lignin-polyol mixture. Since the chemistry used for functionalization reacts with the hydroxyl groups on the lignin as well as the hydroxyl groups on the polyol, the product is a mixture of functionalized lignin and functionalized polyol. See Scheme 7, shown above. Since everything in the mixture carries a functional group, the entire mixture may be used as is, with the functionalized polyol acting as a reactive diluent. In addition, the final product is a liquid, which allows for easy handling.

The acetoacetylated lignins of the invention may be used to prepare resins useable with multiple crosslinking chemistries for coatings, composites, and adhesives. Acetoacetylated lignin can be crosslinked by reaction with multifunctional amines, melamine-formaldehyde resins, and Michael reaction acceptors such as acrylic acid or methacrylic acid esters.

Just as with the acetoacetylated lignins described above, (meth)acrylated resins synthesized based on lignin may be prepared and are resins of the invention. These (meth)acrylated resins also are low cost bio-based thermosetting resins. Because Kraft lignin (representative structures shown above) has such an abundance of hydroxyl groups, both aromatic and aliphatic, it can easily be functionalized with (meth)acrylate groups (Scheme 8 shown below). (Meth)acrylate is used to represent either an acrylate group or a methacrylate group, or mixtures thereof. The number of (meth)acrylate groups introduced into the lignin may be varied. The lignin may be fully (meth)acrylated, where substantially all of the hydroxyl groups have been replaced with (meth)acrylate groups, or it may be partially (meth)acrylated, where only a fraction of the available hydroxyl groups has been replaced with (meth)acrylate groups. It is understood in the art that some residual hydroxyl groups may remain, even when full (meth)acrylation is desired. In some applications, as discussed below, residual hydroxyl groups may provide benefits to the resin. When substantially all of the hydroxyl groups are converted to (meth)acrylate groups, this correspond to a 1:1 ratio of hydroxyl groups to (meth)acrylate groups and where a portion of the (meth) acrylate groups is converted the ratio is less than 1:1. One embodiment of the invention is an (meth)acrylated lignin ester where only a portion of the hydroxyl groups of the polyol are replaced by (meth)acrylate groups. For example, 50%, 60%, 70%, 80%, 90%, or 100% of the hydroxyl groups of lignin may be replaced by (meth)acrylate groups.

Scheme 8

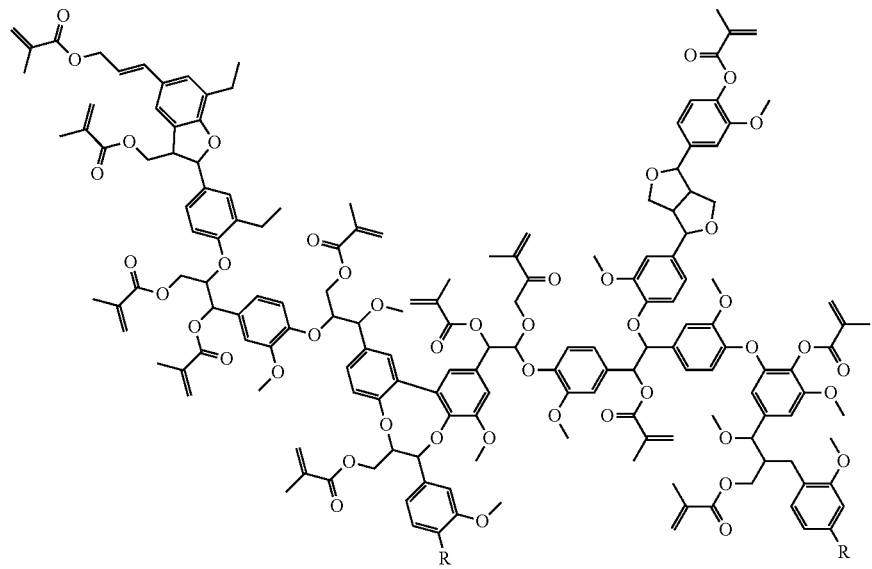

(D) Representative structure of Kraft lignin functionalized with methacrylate groups The invention also relates to (meth)acrylate functional resins derived from Kraft lignin using a novel resin synthesis technique. Kraft lignin is first solubilized in a polyol before being functionalized. Methacrylic anhydride, for example, can be used as the source of methacrylate functionality (Scheme 9). Resin synthesis yields a low viscosity resin that is successfully crosslinked using, for example, benzoyl peroxide as a free radical initiator.

Scheme 9: Resin synthesis to create methacrylate functionalized Kraft Ligin resins.

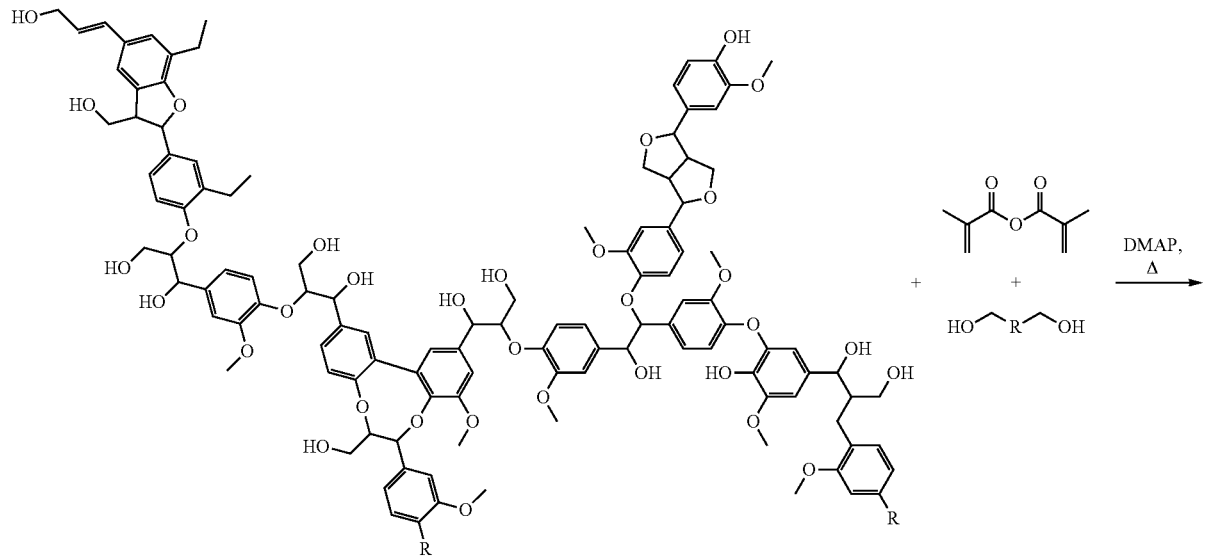

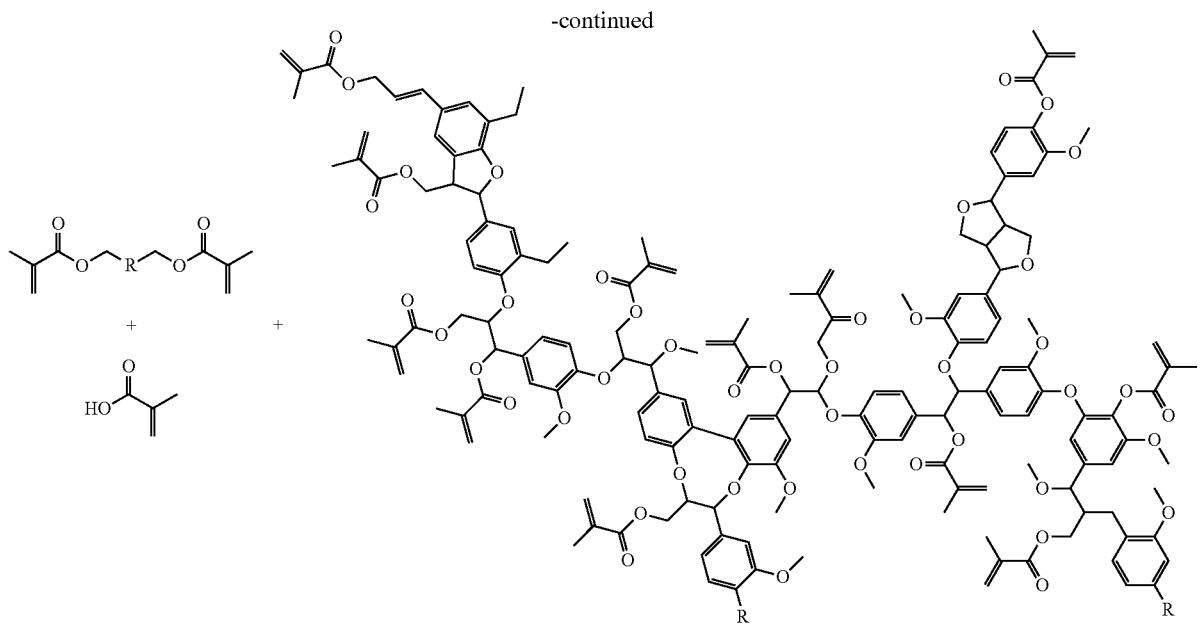

Thermoset materials from this invention, while having excellent properties such as toughness and stiffness, often have defects such as pinholes and bubbles that hinder quantitative assessment of material properties. This is likely due to the presence of the unreacted methacrylic acid, which is the byproduct of the methacrylation reaction. Under curing conditions, the methacrylic acid can volatilize and form a gas. To solve this problem, utilizing the remaining reactive material, methacrylic acid, the resin can be further modified by reacting the methacrylic acid to incorporate some materials that would help to plasticize the cured materials and reduce the amount of methacrylic acid in the resin system.

To remedy the defects in the cured methacrylated materials, the methacrylated resin may be further modified with, for example, at least one monofunctional epoxy compound. An example of a monofunctional epoxide is Cardura E-10P (Glycidyl Ester of Versatic Acid). The residual methacrylic acid in the resin reacts with the Cardura E-10P with, for example, benzyl trimethyl ammonium chloride (BTMAC) catalyst to yield a methacrylate modified Versatic Acid (Scheme 10). The long aliphatic chains of the Versatic acid help to plasticize the cured materials yielding a cured thermoset with fewer defects.

Scheme 10: Reaction of methacrylic acid with Cardura E-10P. R groups on Cardura molecule are, for example, alkyl chains.

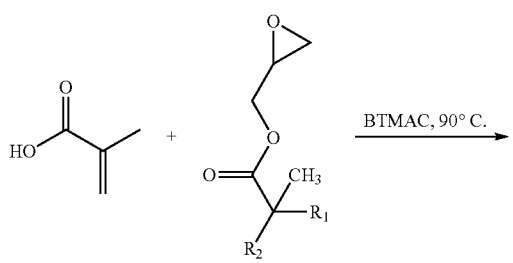

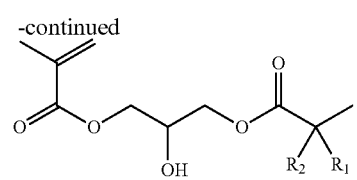

Any monofunctional epoxy compound can be reacted with the methacrylic acid including, for example, ethylene oxide, propylene oxide, butylene oxide, butyl glycidyl ether, cresyl glycidyl ether, etc.

The acetoacetylated and (meth)acrylated resin compositions of the invention are useful in various applications such as in coatings, composites, and adhesives. Accordingly, the invention also relates to curable coating compositions comprising, consisting essentially of, or consisting of the acetoacetylated and (meth)acrylated resin compositions, which may be formulated with or without solvents. A coating composition may be a solvent-free coating composition or may optionally contain a solvent such as, for example, acetone, THF, methyl ethyl ketone (MEK), xylene, etc. The coating composition may be a solution in such a solvent or mixture of solvents.

The acetoacetylated resins and (meth)acrylated resins may be cured using amine curing agents. Suitable amine curing agents are those that are soluble or at least dispersible in a coating composition of the invention. Amine curing agents known in the art include, for example, diethylenetriamine; triethylenetetramine; tetraethylene-pentamine; etc. as well as 2,2,4- and/or 2,4,4-trimethylhexamethylenediamine; 1,2- and 1,3-diaminopropane; 2,2-dimethylpropylenediamine; 1,4-diaminobutane; 1,6-hexanediamine; 1,7-diaminoheptane; 1,8-diaminooctane; 1,9-diaminononane; 1,12-diaminododecane; 4-azaheptamethylenediamine; N,N"-bis(3-aminopropyl)butane-1,4-diamine; 1-ethyl-1,3-propanediamine; 2,2(4),4-trimethyl-1,6-hexanediamine; N,N-bis(3-aminopropyl)ethylenediamine; 2,4(6)-toluenediamine; tetraethylenepentamine; 3-diethylaminopropylamine; 3,3"-iminobispropylamine; tetraethylenepentamine; 3-diethylaminopropylamine; and 2,2,4- and 2,4,4-trimethylhexamethylenediamine. Exemplary cycloaliphatic amine curing agents include, but are not limited to, 1,2- and 1,3-diaminocyclohexane; 1,4-diamino-2,5-diethylcyclohexane; 1,4-diamino-3,6-diethylcyclohexane; 1,2-diamino-4-ethylcyclohexane; 1,4-diamino-2,5-diethylcyclo-hexane; 1,2-diamino-4-cyclohexylcyclohexane; isophorone-diamine; norbornanediamine; 4,4'-diaminodicyclohexylmethane; 4,4'-diaminodicyclohexylethane; 4,4'-diaminodicyclohexylpropane; 2,2-bis(4-aminocyclohexyl)propane; 3,3'-dimethyl-4,4'-diaminodicyclohexylmethane; 3-amino-1-(4-aminocyclohexyl)propane; 1,3- and 1,4-bis(aminomethyl) cyclohexane; and 1-cyclohexyl-3,4-dimino-cyclohexane. As exemplary araliphatic amines, in particular those amines in which the amino groups are present on the aliphatic radical, include, for example, m- and p-xylylenediamine and its hydrogenation products as well as diamide diphenylmethane; diamide diphenylsulfonic acid (amine adduct); 4,4''-methylenedianiline; 2,4-bis (p-aminobenzyl)aniline; diethyltoluenediamine; and m-phenylene diamine. The amine curing agents may be used alone or as mixtures.

Suitable amine-epoxide adducts include, for example, reaction products of diamines, such as ethylenediamine, diethylenetriamine, triethylenetetramine, m-xylylenediamine, and/or bis(aminomethyl)cyclohexane with terminal epoxides, such as the polyglycidyl ethers of the polyhydric phenols listed above.

Polyamide resins can also serve as curing agents for the resins. Suitable polyamide resins include those prepared through the reaction product of multifunctional amines with diacids. Dimer fatty acids are the most commonly used diacids for the synthesis of polyamide resins.

A preferred amine curing agent used with the coating compositions of the invention is PACM (bis(para-aminocyclohexyl)methane).

The acetoacetylated resins may also be cured using aminoplast resins such as melamine formaldehyde or urea formaldehyde resins. A catalyst such as p-toluene sulfonic acid may be used.

The acetoacetylated resins may also be cured using a Michael addition reaction with Michael acceptors such as multifunctional acrylates, methacrylates, or crotonates. Suitable multifunctional (meth)acrylates include, for example, bisphenol A diglycidylether methacrylate (Bis-GMA), ethylene glycol dimethacrylate, 1,4-butanediol dimethacrylate, polyethylene glycol dimethacrylate, trimethylolpropane trimethacrylate, triethyleneglycol dimethacrylate (TEGDMA), 1,6-hexanediol diacrylate, trimethylolpropane triacrylate, pentaerythritol tetraacrylate, ethoxylated trimethylolpropane triacrylate, and acrylated epoxidized soybean oil. (Meth)acrylated resins of the present invention can also be used as Michael addition curing agents with the acetoacetylated resins. The Michael addition reaction is catalyzed by a strong base such as sodium hydroxide, potassium hydroxide, 1,8-diazabicyclo[5.4.0]undec-7-ene (DBU), 1,5-diazabicyclo[4.3.0]non-4-ene (DBN), triazabicyclodecene (TBD), and the like.

The (meth)acrylated resins of the invention can be used in various compositions, such as coatings, composites, adhesives, etc. that are cured using a free radical process. Initiators that may be used to cure the (meth)acrylated resins of the invention include, but are not limited to, Luperox-P and Luperox 10M75. The invention also relates to curable coating compositions comprising, consisting essentially of, or consisting of the (meth)acrylated resins, which may be formulated with or without solvents. A coating composition may be a solvent-free coating composition or may optionally contain a solvent such as, for example, acetone, THF, methyl ethyl ketone (MEK), xylene, etc. The coating composition may be a solution in such a solvent or mixture of solvents.

The invention also relates to a curable coating composition comprising, consisting essentially of, or consisting of at least one (meth)acrylated resin, at least one optional diluent, and at least one optional initiator. The curable coating compositions may be made by mixing at least one (meth) acrylated resin with at least one optional diluent and at least one optional initiator. The invention further relates to thermoset coatings formed from the curable coating compositions of the invention.

The invention also involves the free radical curing of the (meth)acrylated resins and coating compositions containing these oligomers. Formulations may be prepared by mixing the oligomer resin with an optional diluent, an optional solvent, and an initiator.

When a coating composition contains a polyfunctional bio-based oligomer, the diluents may be ones used in free radical or vinyl polymerizations such as, but not limited to, styrene, bisphenol A diglycidylether methacrylate (Bis-GMA), ethylene glycol dimethacrylate, 1,4-butanediol dimethacrylate, polyethylene glycol dimethacrylate, trimethylolpropane trimethacrylate, triethyleneglycol dimethacrylate (TEGDMA), isodecyl acrylate, 2-hydroxyethyl acrylate, butyl acrylate, 2-ethylhexyl acrylate, 1,6-hexanediol diacrylate, trimethylolpropane triacrylate, pentaerythritol tetraacrylate, ethoxylated trimethylolpropane triacrylate, and acrylated epoxidized soybean oil.

For free radical thermal curing, a thermally initiated free radical initiator is needed. Suitable thermally initiated free radical initiators include dialkyl peroxides, such as, for example, dicumyl peroxide, di-t-butyl peroxide, di-t-amyl peroxide, alpha, alpha' di(t-butyl peroxy diisopropyl benzenes, 2,5-dimethyl-2,5-di-(t-butyl peroxy) hexane, 2,5-dimethyl-2,5-di-(t-butyl peroxy) hexyne-3, t-butyl cumyl peroxide; diacyl peroxides, such as, for example, dibenzoyl peroxide, succinic acid peroxide, dilauryl peroxide, didecanoyl peroxide; diperoxyketals, such as, for example, 1,1-di(t-butylperoxy)-3,3,5-trimethylcyclohexane, 1,1-di(t-butylperoxy)-cyclohexane, 1,1-di(t-amylperoxy) cyclohexane, n-butyl-4,4-di(t-butylperoxy)valerate, ethyl-3, 3-di(t-amylperoxy)butyrate, ethyl-3,3-di(t-butylperoxy) butyrate; hydroperoxides, such as, for example, cumene hydroperoxide, diisopropylbenzene hydroperoxide, t-butyl hydroperoxide, t-amyl hydroperoxide; ketone peroxides, such as, for example, methyl ethyl ketone peroxide, 2,4-pentanedione peroxide; peroxydicarbonates, such as, for example, di(n-propyl) peroxydicarbonate, di(sec-butyl) peroxydicarbonate, di(2-ethylhexyl) peroxydicarbonate; peroxyesters, such as, for example, alpha-cumyl peroxy neodecanoate, t-amyl peroxy neodecanoate, t-butyl peroxy neodecanoate, t-amyl peroxypivalate, t-butyl peroxypivalate, 2,5-di(2-ethylhexanoylperoxy) 2,5-dimethylhexane, t-amyl peroxy 2-ethylhexanoate, t-butyl peroxy-2-ethylhexanoate, t-amyl peroxyacetate, t-butyl peroxyacetate, t-butyl peroxybenzoate, OO-(t-amyl) 0-(2-ethylhexyl) monoperoxycarbonate, OO-(t-butyl) O-isopropyl monoperoxycarbonate, OO-(t-butyl) 0-(2-ethylhexyl) monoperoxycarbonate, poly-t-butylperoxy carbonate; azo initiators, such, for example, as 2,2'-azobis(2,4-dimethyl-pentanenitrile), 2,2'-azobis-(2-isobutyronitrile), 2,2'-azobis(2-methylbutyronitrile), 1,1'-azodicyclohexanecarbonitrile; and the like. Mixtures of initiators can be used.

When a composition containing a (meth)acrylated resins is thermally cured, the composition may further comprise a diluent selected from, for example, styrene, bisphenol A diglycidylether methacrylate (Bis-GMA), triethyleneglycol dimethacrylate (TEGDMA), isodecyl acrylate, isodecyl methacrylate, 2-hydroxyethyl acrylate, 2-hydroxyethyl methacrylate, butyl acrylate, butyl methacrylate, 2-ethylhexyl acrylate, 2-ethylhexyl methacrylate, 1,6-hexanediol diacrylate, 1,6-hexanediol dimethacrylate, trimethylolpropane triacrylate, trimethylolpropane trimethacrylate, pentaerythritol tetraacrylate, pentaerythritol tetramethacrylate, ethoxylated trimethylolpropane triacrylate, ethoxylated trimethylolpropane trimethacrylate, acrylated epoxidized linseed oil, methacrylated epoxidized linseed oil, acrylated epoxidized soybean oil, and methacrylated epoxidized soybean oil.

The invention also relates to the use of a coating composition that may be coated onto a substrate and cured using techniques known in the art. The substrate can be any common substrate such as paper, polyester films such as polyethylene and polypropylene, metals such as aluminum and steel, glass, urethane elastomers, primed (painted) substrates, and the like. The coating composition of the invention may be cured at room temperature (ambient cure) or at elevated temperatures (thermal cure), or may be cured photochemically. The invention also relates to an article of manufacture comprising, consisting essentially of, or consisting of a thermoset coating composition of the invention.

A coating composition of the invention may further contain coating additives. Examples of such coating additives include, but are not limited to, one or more leveling, rheology, and flow control agents such as silicones, fluorocarbons, or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides and mildewcides; corrosion inhibitors; thickening agents; or coalescing agents. Specific examples of such additives can be found in Raw Materials index, published by the National Paint & Coatings Association, 1500 Rhode Island Avenue, N.W., Washington, D.C. 20005. Further examples of such additives may be found in U.S. Pat. No. 5,371,148, which is incorporated herein by reference.

The invention also relates to a foam material, comprising, consisting essentially of, or consisting of the reaction product of: a) at least one acetoacetylated resin composition; b) at least one polyamine compound; c) at least one physical blowing agent and/or at least one polysiloxane compound; d) optionally at least one surfactant; e) optionally phytic acid; and f) optionally at least one additive.

The acetoacetylated resin compositions comprise, consist essentially of, or consist of the reaction product of: a1) at least one polyol; a2) optionally lignin; and a3) at least one acetoacetate ester. For example, the acetoacetylated resin compositions may be selected from the acetoacetylated lignin resin compositions of the invention, discussed above. Alternatively, the acetoacetylated resin compositions may also be prepared using only at least one polyol and at least one acetoacetate ester-without the presence of any lignin. The polyols, lignin, and acetoacetate esters used to make the acetoacetylated lignin resin compositions of the invention may also be used to make the acetoacetylated resin compositions.

Preferably, the acetoacetylated resin composition comprises, consists essentially of, or consists of the reaction product of Kraft lignin, a polyol selected from the group consisting of 1,4-butanediol, 1,3-propanediol, diethylene glycol, ethylene glycol, and glycerol, and t-butyl acetoacetate.

The acetoacetylated resin composition may be present in the reaction mixture used to make the foams of the invention in an amount ranging from about 25-95 wt % (e.g., 30-90 wt %, 40-80 wt %, 50-70 wt %, 55-65 wt %). A preferred range is from about 50-95 wt %, and an even more preferred range is from about 70-95 wt %.

The reaction mixture used to make the foams of the invention also contains at least one polyamine compound. Any of the amine curing agents disclosed above may be used as the polyamine compound. Preferably, the polyamine compound is tris (2-aminoethyl)amine. The polyamine compound may be present in an amount ranging from about 5-75 wt % (e.g., 10-70 wt %, 20-60 wt %, 30-50 wt % 35-45 wt %). A preferred range is from about 5-50 wt %, and an even more preferred range is from about 5-30 wt %.

Physical blowing agents may be used in the preparation of the foams. Examples include dialkyl ethers, fluorinated ethers, chlorofluorocarbons, perfluorinated hydrocarbons, hydrochlorofluorocarbons, cycloalkylene ethers and ketones, hydrofluorocarbons, and hydrocarbons, water, or mixtures thereof.

Examples of suitable hydrofluorocarbons include lower aliphatic or cyclic, linear or branched hydrocarbons such as alkanes, alkenes and cycloalkanes, preferably having from 2 to 8 carbon atoms, which are substituted with at least one, preferably at least three, fluorine atom(s). Specific examples include 1,1,1,2-tetrafluoroethane (HFC 134a), 1,1,2,2-tetrafluoroethane, trifluoromethane, heptafluoropropane, 1,1, 1-trifluoroethane, 1,1, 2-trifluoroethane, 1,1,1,2,2-pentafluoropropane, 1,1,1,3-tetrafluoropropane, 1,1,1,3,3-pentafluoropropane (HFC 245fa), 1,1,3,3,3-pentafluoropropane, 1,1, 1,3,3-pentafluoro-n-butane (HFC 365mfc), 1,1,1,4,4,4-hexafluoro-n-butane, 1,1,1,2,3,3,3-heptafluoropropane (HFC 227ea) and mixtures of any of the above. Suitable hydrocarbon blowing agents include lower aliphatic or cyclic, linear or branched hydrocarbons such as alkanes, alkenes and cycloalkanes, preferably having from 4 to 8 carbon atoms. Specific examples include n-butane, iso-butane, 2,3-dimethylbutane, cyclobutane, n-pentane, iso-pentane, technical grade pentane mixtures, cyclopentane, methylcyclopentane, neopentane, n-hexane, iso-hexane, n-heptane, iso-heptane, cyclohexane, methylcyclohexane, 1-pentene, 2-methylbutene, 3-methylbutene, 1-hexene and any mixture of the above. Preferred hydrocarbons are n-butane, iso-butane, cyclopentane, n-pentane and isopentane and any mixture thereof, in particular mixtures of n-pentane and isopentane (preferred weight ratio 3:8), mixtures of cyclopentane and isobutane (preferred weight ratio 8:3), mixtures of cyclopentane and n-butane and mixtures of cyclopentane and iso- or n-pentane (preferred weight ratio between 6:4 and 8:2). Additional physical blowing agents that may be used include those disclosed in U.S. Pat. No. 9,527,976, which is incorporated herein by reference.

It is preferred to use non-halogenated blowing agents. Preferably, the physical blowing agent may be cyclopentane. The physical blowing agent may be present in an amount ranging from about 0.5-45 wt % (e.g., 1-40 wt %, 10-30 wt %, 15-25 wt %).

The polysiloxane compound has a repeating unit containing a methylhydro siloxane unit having the following structure:

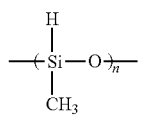

where n=1 to 100. For example, the polysiloxane compound may have an average molecular weight (Mn) between about 900-60,000 g/mol (e.g., 900-1,200, 1,400-1,800, 1,800-2,100, 2,100-2,400, 1,700-3,200, 50,000-60,000). The polysiloxane compound may be a linear homopolymer such as poly(methylhydrosiloxane) (e.g., HMS-991, HMS-992, HMS-993), or the cyclic tetramethylcyclotetrasiloxane (e.g., D'4), and mixtures thereof. It may also be a unit in a copolymer with other siloxane units such as a copolymer of poly(methylhydrosiloxane) and poly(dimethylsiloxane) (e.g., HMS-501, HMS-064). The polysiloxane compound may be present in an amount ranging from about 0.1-20 wt % (e.g., 1-15 wt %, 5-10 wt %, 7-9 wt %).

One or more surfactants may also be used. Examples include, without limitation, cell stabilizing surfactants used in rigid polyurethane and rigid polyurethane-polyisocyanurate foams such as polyorganosiloxane polyether copolymers, which are well known in the art. Additional examples of suitable surfactants include phenol alkoxylates and alkylphenol alkoxylates such as ethoxylated phenol and ethoxylated nonylphenol respectively. Other anionic or cationic surfactants may also be used. The surfactant, if present, may be AEROSOL OT-75. The surfactant may be present in an amount ranging from about 0.01-5 wt % (e.g., 0.1-3 wt %, 1-2 wt %).

The phytic acid, if present, may be present in an amount ranging from about 0.1-45 wt % (e.g., 1-40 wt %, 5-35 wt %, 10-30 wt %, 15-25 wt %). A preferred range is from about 10-45 wt %, and a more preferred range is from about 20-45 wt %.

The additive, if present, may be any of the additives mentioned above. The additive may be present in an amount ranging from about 0.1-20 wt % (e.g., 1-15 wt %, 5-10 wt %).

The foams of the invention may be fire retardant, as determined by UL-94 Standard for Safety of Flammability of Plastic Materials by Underwriters Laboratories. The UL-94 vertical burn (V) categories are as follows: (1) UL 94 V-0 Vertical Burn; Burning stops within 10 seconds, no flaming drips are allowed; (2); UL 94 V-1 Vertical Burn; Burning stops within 60 seconds, no flaming drips are allowed; or (3) UL 94 V-2 Vertical Burn; Burning stops within 60 seconds, Flaming drips are allowed. The foams of the invention may satisfy one or more of these UL-94 vertical burn (V) categories.

The invention also relates to a method for making the foams of the invention, comprising, consisting essentially of, or consisting of the step of contacting the acetoacetylated resin composition with the polyamine compound, the physical blowing agent and/or polysiloxane compound, the optional surfactant, the optional phytic acid, and the optional additive.

The invention further relates to an article of manufacture (e.g., sandwich composite, insulation for refrigeration, and spray in insulation for a building), comprising, consisting essentially of, or consisting of the foams of the invention.

EXAMPLES

1. Synthesis and Characterization of Acetoacetylated and (Meth)acrylated Lignin Resin Compositions

1.1 Materials

Reagents were used without any further purification. Indulin AT Kraft lignin was obtained from Ingevity (formerly Mead Westvaco). Tert-butyl acetoacetate was obtained from Eastman Chemical. Reactive diluents ethylene glycol, diethylene glycol and glycerol were obtained from Sigma Aldrich, while 1,4-butanediol was obtained from BioAmber and 1,3-propanediol was obtained from Dupont Tate & Lyle. Para-toluenesulfonic acid and tris-(2aminoethyl) amine were purchased from Alfa Aesar. 4-Dimethylaminopyridine was purchased from TCI America. Melamine-formaldehyde resin, Cymel 301, and trimethylopropane triacrylate were provided by Allnex. Methyl ethyl ketone, isopropyl alcohol and acetic acid were also purchased from Sigma Aldrich. Functionalizing reagent methacrylic anhydride was purchased from Sigma Aldrich. The glycidyl ester of versatic acid (Cardura E10-P) was provided courtesy of Hexion. Benzoyl peroxide (Luperox A98) was purchased from Sigma Aldrich.

1.2 Methods 1.2.1 FTIR

Fourier Transformed Infrared Spectroscopy (FTIR) was performed using a Thermo Nicolet 8700 FTIR spectrometer. Spectra acquisitions were based on 32 scans with data spacing of 1.928 $cm^1$ in the range of 4000-500 $cm^{-1}$.

1.2.2 Molecular Weight

Molecular weight was determined by Gel Permeation Chromatography (GPC) using a GPC system (EcoSEC HLC-8320GPC, Tosoh Bioscience, Japan) with a differential refractometer detector. Separations were performed with two TSKgel SuperH3000 6.00 mm ID×15 cm columns with an eluent flow rate of 0.35 ml $min^{-1}$. The columns and detectors were thermostated at 40° C. Tetrahydrofuran was used as the eluent. Samples were prepared by dissolving 1 mg $ml^{-1}$ in the eluent (THF) and dissolved at ambient temperature for several hours. The injected volume was 20 μL for each sample. The system was calibrated using a PS standard (Aligent EasiVial PS—H 4 ml).

1.2.3 Viscosity

Viscosity measurements were done using a TA Instruments ARES rheometer. Viscosity measurements were made at a frequency of 100 Hz using parallel plate geometry.

1.2.4 Resin Synthesis

Example 1: Partial Depolymerization of Kraft Lignin

The partial depolymerization of Kraft Lignin (Indulin AT product obtained from Mead Westvaco) was done in a 500 ml Parr reactor. Kraft Lignin (20 g), sodium hydroxide (10 g), and methanol (250 ml) were combined in the reaction vessel. The vessel was tightened and purged with hydrogen gas. Once purging was complete, the reaction vessel was filled with hydrogen gas (1200 psi) and began heating to 250° C. An overhead stirrer was used to mix the reactants. The reaction was run for 90 minutes once temperature reached 250° C. After 90 minutes the reaction mixture was placed in jars for later work up. Scheme 11, below, shows the reaction conditions used for the partial depolymerization of Kraft lignin.

Scheme 11

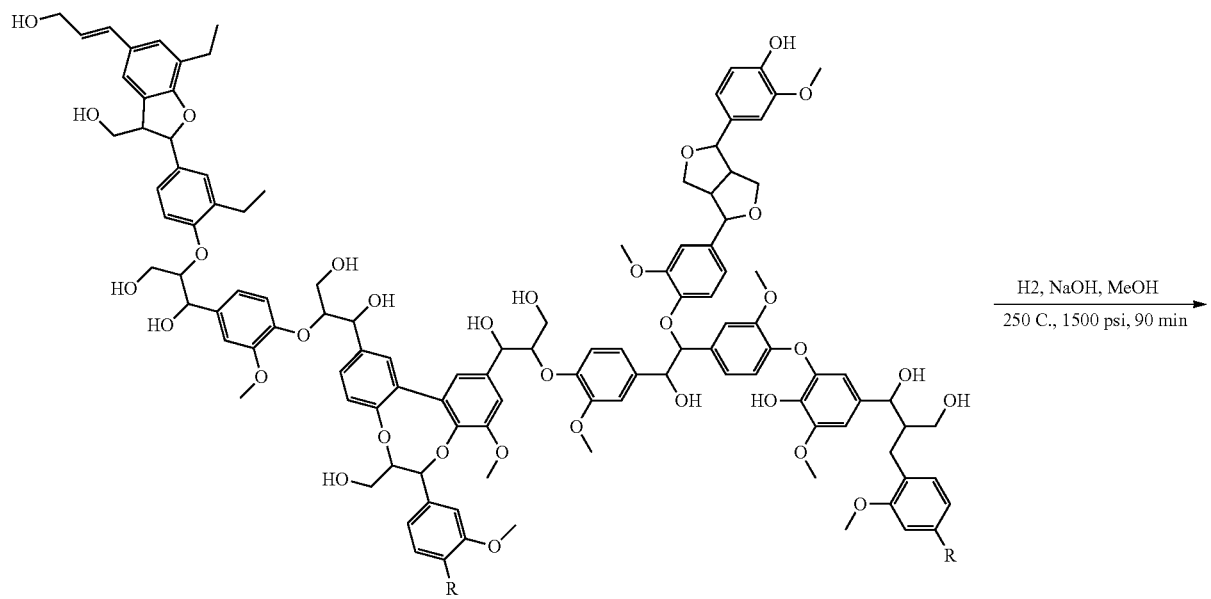

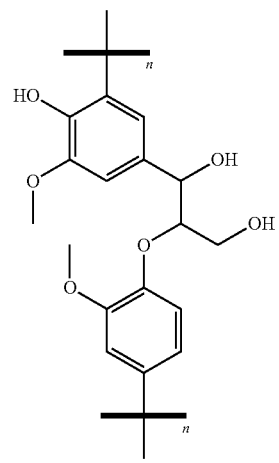

To work up partially depolymerized lignin, the reaction mixture first was neutralized using 37% hydrochloric acid solution. The solution's pH was monitored using a pH meter. Next, the neutralized reaction mixture was filtered using vacuum filtration and then washed with additional methanol to further extract the partially depolymerized Kraft lignin. The methanol filtrate was placed in a round bottom and the methanol was removed using a rotary evaporator. The remaining material, after removal of methanol, was then extracted using acetone. The acetone was then vacuum filtered to remove any remaining high molecular weight material. Acetone was then removed using a rotary evaporator and the remaining material was used as partially depolymerized Kraft lignin (PDL). The color of the PDL was a dark brown color and ranged from liquid to solid. Table 1 reports the results of the depolymerization reactions 1-1 through 1-8 to form PDL and their yield.

TABLE 1

Depolymerization Reactions.

Depolymerization of Kraft Lignin

| Reaction | Kraft Lignin (g) | NaOH (g) | Methanol (ml) | Amount of PDL | % Yield |
|---|---|---|---|---|---|
| 1-1 | 20 g | 10 g | 250 ml | 0.99 g | 4.95 |
| 1-2 | 20 g | 10 g | 250 ml | NA | 0.00 |
| 1-3 | 20 g | 10 g | 250 ml | NA | 0.00 |
| 1-4 | 20 g | 10 g | 250 ml | 1.05 g | 5.25 |
| 1-5 | 20 g | 10 g | 250 ml | 0.22 g | 1.10 |
| 1-6 | 20 g | 10 g | 250 ml | 3.16 g | 15.80 |
| 1-7 | 20 g | 10 g | 250 ml | 4.61 g | 23.05 |
| 1-8 | 20 g | 10 g | 250 ml | 0.49 g | 2.45 |

As shown in Table 1, some depolymerization reactions were able to yield a partially depolymerized version of Kraft Lignin, however the reaction yields were generally very low. Fourier Transformed Infrared Spectroscopy (FTIR) was performed on each of the samples that yielded PDL. The FTIR spectra showed inconsistencies in the spectra, especially in the C=C stretching region, as well as the C—H stretching region. See FIG. 1A-D, for reactions 1-1, 1-3, 1-4, and 1-6. The hydroxyl groups can easily be seen in the FTIR spectra. The molecular weight of the PDL was determined by Gel Permeation Chromatography (GPC). Table 2 shows the results.

TABLE 2

Molecular weight analysis of the partially depolymerized Kraft lignin.

| Reaction | Number Average MW | Weight Average MW | Polydispersity index |
|---|---|---|---|
| 1-1 | 538 | 1503 | 2.8 |
| 1-4 | 275 | 382 | 1.4 |
| 1-5 | 352 | 431 | 1.2 |
| 1-6 | 288 | 425 | 1.5 |
| 1-7 | 342 | 569 | 1.7 |

Example 2: Acetoacetylation of Kraft Lignin

Kraft Lignin and tert-butyl acetoacetate were reacted together under a variety of reaction conditions. Reactions in solvent and heat as well as with and without catalyst were all attempted. The use of an optional acid catalyst is known to possibly increase the rate of acetoacetylation. Scheme 12 shows the general reaction.

Scheme 12: Acetoacetylation of Kraft lignin.

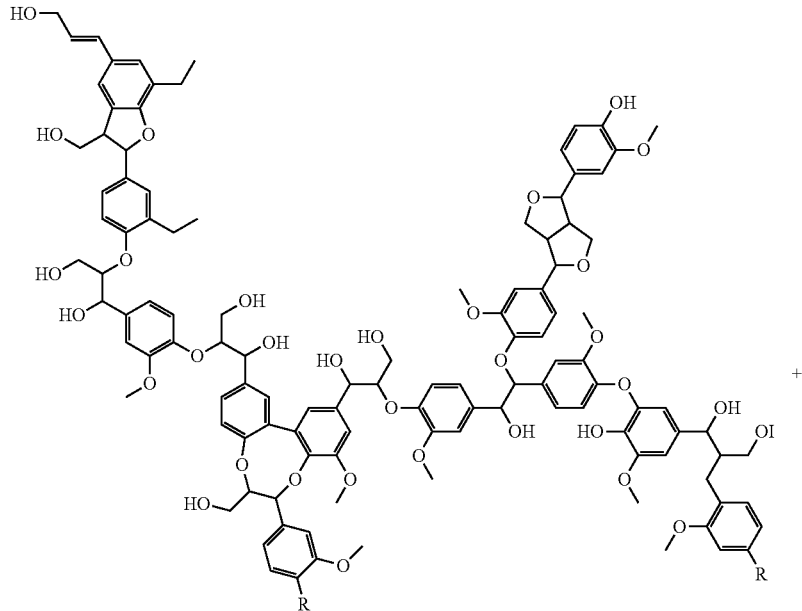

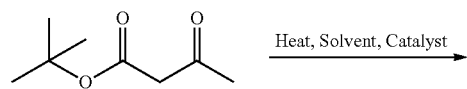

-continued

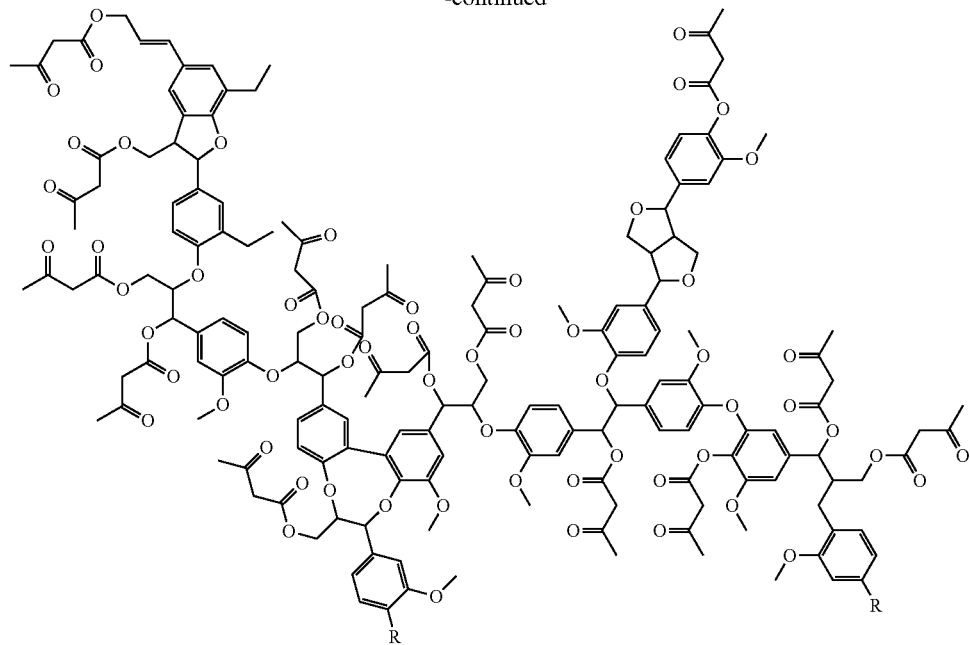

For each reaction an amount of Kraft lignin and tert-butyl acetoacetate (tBAA) were measured out into the reaction flask. Solvents used in the reactions were varied as indicated below. The solvents used in the acetoacetylation reactions varied between ethyl 3-ethoxypropionate, water, tetra hydrofuran, pyridine, and 1,4 dioxane. Hydrochloric acid was used in catalytic amounts in select reactions. All reaction mixtures were dried using a rotary evaporator to remove any excess solvent and unreacted tBAA. Table 3 below summarizes all of the reactions of the direct acetoacetylation of Kraft Lignin.

TABLE 3

Reaction Conditions for Acetoacetylation of Kraft lignin.
Direct functionalization of Kraft Lignin

| Reaction | Kraft Lignin (g) | tBAA (g) | Solvent | Amount of Solvent (ml) | HCl Catalyst | Temp. (° C.) | Time (hr) |
|---|---|---|---|---|---|---|---|
| 2-1 | 10 g | 11.86 g | EEP | 100 ml | * | 140° C. | 48 |
| 2-2 | 10 g | 9.9 g | EEP | 100 ml | * | 140° C. | 24 |
| 2-3 | 8.2 g | 95.4 g | * | * | * | 140° C. | 48 |
| 2-4 | 1 g | 1.3 g | $H_2O$ | 100 ml | * | 130° C. | 3 |
| 2-5 | 10 g | 11.86 g | $H_2O$ | 100 ml | 1 ml | 95° C. | 2 |
| 2-6 | 10 g | 11.86 g | 1,4 Dioxane | 100 ml | * | 90° C. | 48 |
| 2-7 | 10 g | 11.86 g | $H_2O$/Dioxane | 50 ml/50 ml | 1 ml | 90° C. | 47 |
| 2-8 | 10 g | 11.86 g | $H_2O$ | 100 ml | 1 ml | 90° C. | 45 |
| 2-9 | 10 g | 11.86 g | $H_2O$ | 100 ml | 1 ml | 90° C. | 4 |
| 2-10 | 10 g | 11.86 g | $H_2O$ | 100 ml | 1 ml | 85° C. | 24 |
| 2-11 | 10 g | 11.86 g | $H_2O$ | 100 ml | 1 ml | 80° C. | 24 |
| 2-12 | 10 g | 11.86 g | $H_2O$/Dioxane | 50 ml/50 ml | 1 ml | 80° C. | 24 |
| 2-13 | 10 g | 11.86 g | 1,4 Dioxane | 100 ml | * | 100° C. | 24 |
| 2-14 | 8.2 g | 97 g | * | * | * | 120° C. | 95 |
| 2-15 | 8.2 g | 97 g | * | * | * | 130° C. | 144 |
| 2-16 | 10 g | 11.86 g | $H_2O$ | 100 ml | * | 90° C. | 24 |
| 2-17 | 10 g | 11.86 g | 1,4 Dioxane | 100 ml | * | 90° C. | 25 |
| 2-18 | 10 g | 11.86 g | Pyridine | 100 ml | * | 90° C. | 25 |
| 2-19 | 10 g | 11.86 g | THF | 100 ml | * | 55° C. | 24 |
| 2-20 | 10 g | 11.86 g | $H_2O$ | 100 ml | * | 90° C. | 24 |
| 2-21 | 10 g | 11.86 g | $H_2O$ | 100 ml | 0.2 ml | 90° C. | 24 |
| 2-22 | 10 g | 11.86 g | 1,4 Dioxane | 100 ml | 0.2 ml | 90° C. | 24 |
| 2-23 | 10 g | 11.86 g | Pyridine | 100 ml | 0.2 ml | 90° C. | 24 |
| 2-24 | 10 g | 11.86 g | THF | 100 ml | 0.2 ml | 55° C. | 25 |

Figure 2:
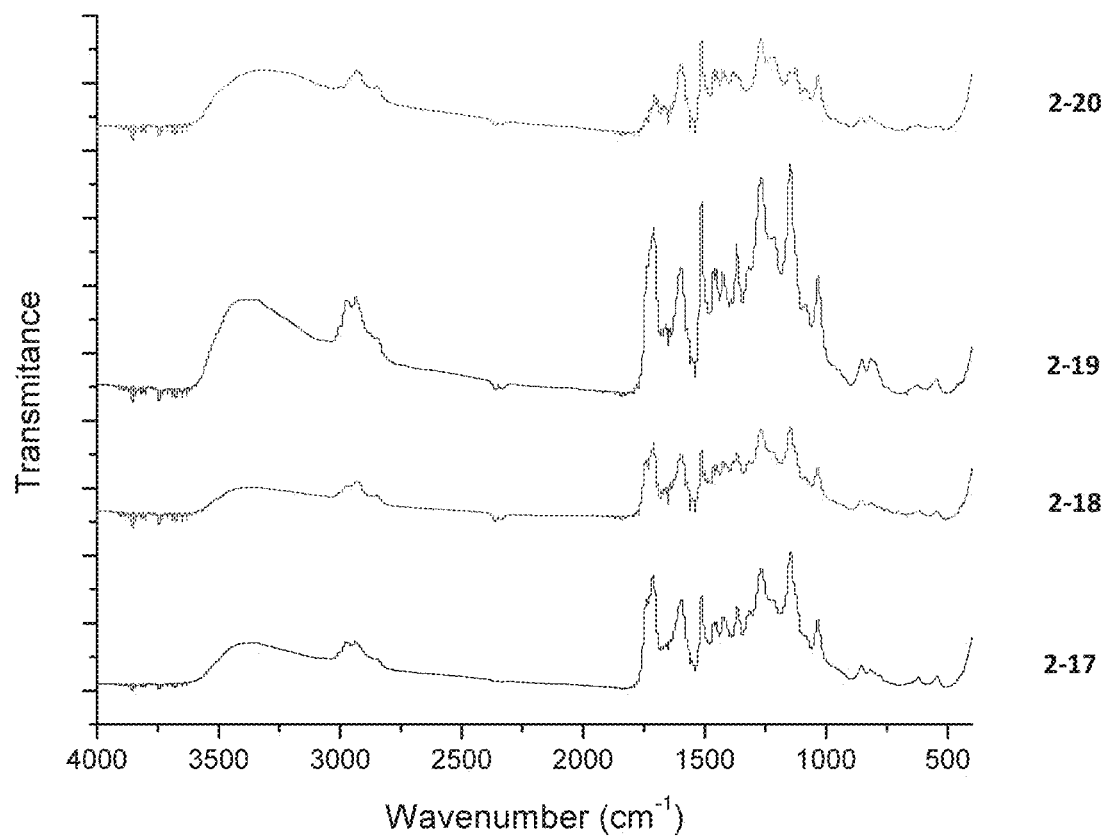
FIG. 2 shows the FTIR spectra of the acetoacetylation products described in Example 2 from reactions 2-20, 2-19, 2-18, and 2-17, top to bottom, respectively

As shown in Table 3, a variety of reactions were conducted to achieve an Acetoacetylated Kraft Lignin (AAKL) resin of the invention. FTIR analysis shows a band in the region of C=O stretching at 1700-1750 cm$^{-1}$. This suggests the presence of the ester group. See FIG. 2, which shows the FTIR spectra of the acetoacetylation products from reactions 2-20, 2-19, 2-18, and 2-17, top to bottom, respectively. Also observing a strong band in the hydroxyl region of these spectra, it is unclear if the resulting ester peak is coming from an AAKL or from unreacted tBAA.

The AAKL resins obtained from the direct acetoacetylation of Kraft lignin is a dark brown solid that has increased solubility in acetone when compared to unmodified Kraft lignin. To assess the crosslinking ability of AAKL, an AAKL was dissolved in acetone before adding a crosslinking agent. Initial tests with the following curing agents were done: ethylene diamine, an amine curing agent; Sartomer 259 (DBU catalyst, polyethylene glycol diacrylate curing agent used for Michael addition crosslinking), and Cymel 301 (pTSA catalyst, a fully alkylated melamine-formaldehyde curing agent). These initial tests suggested that all of these crosslinking mechanisms would successfully crosslink and cure an AAKL of the invention.

Example 3: Acetoacetylation of Kraft Lignin in Polyol Solvents

Using a 250 ml three neck round bottom flask, the three necks of the reaction flask were equipped with an overhead mechanical stirrer, a thermocouple and an outlet with a condenser and Erlenmeyer flask to collect tert-butanol byproduct. Kraft Lignin, polyol, and tert-butyl acetoacetate (tBAA) were measured into the reaction flask. Once the reactants were added the mechanical stirrer, thermocouple, and condensing arm were attached. The mixture was then stirred and heated (130° C.). Tert-butanol was collected in the Erlenmeyer flask attached to the condensing arm. Reactions were considered to be complete when the production of excess t-butanol had stopped and no bubbles were being produced inside the reaction flask. Once the reaction had reached completion, the resin was allowed to cool to room temperature before being characterized. Each resin was characterized by FTIR analysis and viscosity measurements on the ARES rheometer. A variety of polyols were used to synthesize the AAKLP resins: 1,4 butanediol (1,4 BD); diethylene glycol (DG); ethylene glycol (EG); and glycerol (G). The reaction conditions used are described in Table 4.

TABLE 4

Reaction Conditions for Acetoacetylation of Lignin in a Polyol.

| Reaction | Weight percentage of Kraft Lignin | Kraft Lignin (g) | Polyol | Weight Percentage of Polyol | Polyol (g) | tBAA (g) |
|---|---|---|---|---|---|---|
| 3-1 | 9.1 | 2-5 g | 1,4 Butanediol | 90.9 | 25 g | 91.1 g |
| 3-2 | 0 | 0 g | 1,4 Butanediol | 100 | 25 g | 90.01 g |
| 3-3 | 16.67 | 5.09 g | 1,4 Butanediol | 83.33 | 25 g | 95.05 g |
| 3-4 | 23.07 | 7.51 g | 1,4 Butanediol | 76.93 | 25 g | 100 g |
| 3-5 | 30 | 10 | 1,4 Butanediol | 70 | 23.33 g | 100.6 g |
| 3-6 | 40 | 15 g | 1,4 Butanediol | 60 | 22.5 g | 103.2 g |
| 3-7 | 50 | 20 g | 1,4 Butanediol | 50 | 20 g | 98.9 g |
| 3-8 | 60 | 25 g | 1,4 Butanediol | 40 | 16.67 g | 91.67 g |
| 3-9 | 70 | 30 g | 1,4 Butanediol | 30 | 12.86 g | 82.35 g |
| 3-10 | 10 | 2.5 g | 1,4 Butanediol | 90 | 22.5 g | 89.62 g |
| 3-11 | 20 | 5 g | 1,4 Butanediol | 80 | 20 g | 82.58 g |
| 3-12 | 0 | 0 | Diethylene Glycol | 100 | 80 g | 238.52 g |
| 3-13 | 50 | 40 g | Diethylene Glycol | 50 | 40 g | 174.69 g |
| 3-14 | 80 | 20 g | 1,4 Butanediol | 20 | 5 g | 41.05 g |
| 3-15 | 0 | 0 | Ethylene Glycol | 100 | 25 g | 140.17 g |
| 3-16 | 40 | 16.67 g | Ethylene Glycol | 60 | 25 g | 158.3 g |
| 3-17 | 0 | 0 | Glycerol | 100 | 25 g | 141.72 g |
| 3-18 | 40 | 16.67 g | Glycerol | 60 | 25 g | 159.85 g |
| 3-19 | 40 | 16.67 g | Diethylene Glycol | 60 | 25 g | 91.01 g |

An FTIR spectra was taken for each of the resins and viscosity was measured at room temperature and 100 Hz FTIR. The FTIR spectra confirmed the expected structure of the resins.

Figure 3:
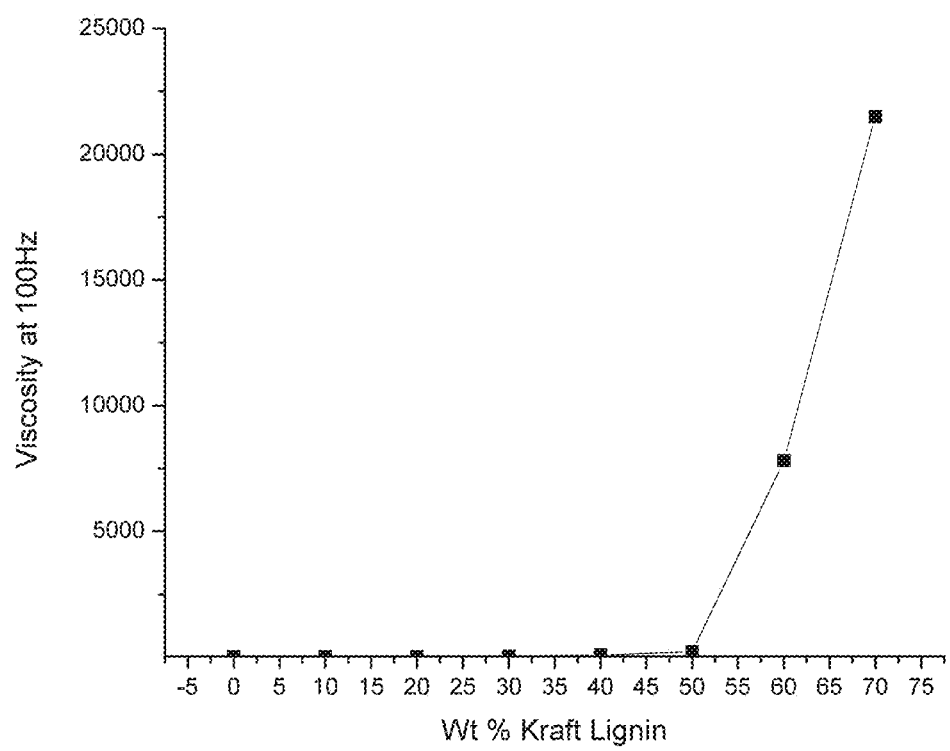
FIG. 3 is a graph comparing the weight percentage of Kraft Lignin in an acetoacetylated lignin resin prepared in 1,4-butaniediol (Example 3) to its viscosity at 100 Hz.
Figure 4:
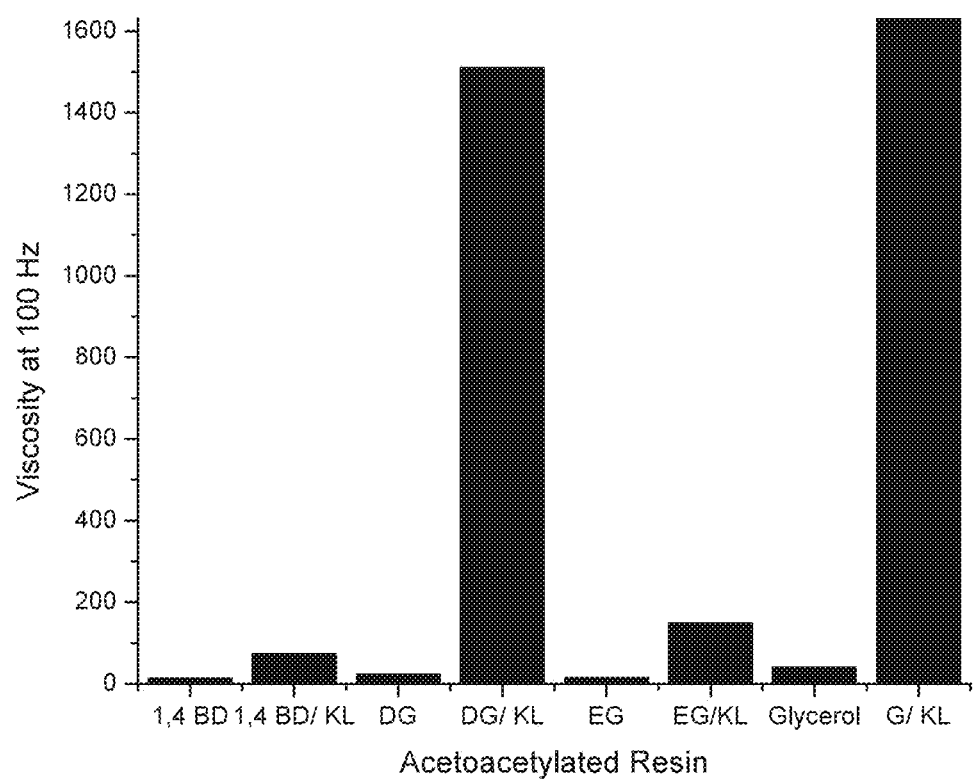
FIG. 4 shows the viscosity taken at 100 Hz. for acetoacetylated polyols and those polyols with 40 wt. % Kraft lignin in Example 3.

The viscosity of the resins prepared using 1,4-butanediol is reported in Table 5 and shown in FIG. 3. The resin viscosity was measured on the ARES rheometer at room temperature and 100 Hz. FIG. 3 is a graph of the weight percentage of Kraft Lignin in the resin compared to its viscosity at 100 Hz. FIG. 4 shows the viscosity taken at 100 Hz. for acetoacetylated polyols and those polyols with 40 wt. % Kraft Lignin (KL). There is a clear trend in the viscosity data that shows that increasing the weight percentage of Kraft Lignin will increase the viscosity of the system. It is clear that, by exceeding 50 weight percent of Kraft Lignin, the viscosity of the system increases drastically and continues to increase until the system become solid at 80% by weight Kraft Lignin. Varying the amount of Kraft Lignin in the resin permits control and optimization of resin properties and process conditions by balancing the amount of Kraft lignin in the resin and the resin viscosity.

TABLE 5

1,4 Butanediol/Kraft Lignin Resin Viscosity.
1,4 Butanediol/Kraft Lignin Resins.

| Wt % Kraft Lignin | Viscosity in centipoise |
|---|---|
| 0 | 13.9 |
| 10 | 12 |
| 20 | 15.4 |
| 30 | 33.1 |
| 40 | 74.2 |
| 50 | 216.9 |

TABLE 5-continued 1,4 Butanediol/Kraft Lignin Resin Viscosity.
1,4 Butanediol/Kraft Lignin Resins.

| Wt % Kraft Lignin | Viscosity in centipoise |
|---|---|
| 60 | 7819.6 |
| 70 | 21489.3 |
| 80 | Solid, could not measure |

Coating compositions were prepared by curing AAKLP resins with Cymel 301 (available from Allnex). See Reaction 5, shown below. Cymel 301 is a fully alkylated melamine formaldehyde resin that uses para-toluenesulfonic acid (pTSA) as a catalyst. Catalyst was dissolved in an appropriate amount of methanol to create a 40% solution. Additionally, BYK 370 0.5%, a silicone surface additive available from BYK, was added to help the coating wet the steel substrate. The steel substrate was cleaned with isopropyl alcohol before the coatings were applied. All coatings were applied at a wet film thickness of 4 mils. Formulations with Cymel 301 were made at 20, 25, and 30% by weight, Cymel 301 with 0.05% catalyst, and 0.5% BYK 370. Coatings were cured at 130° C. for 10 minutes and 160° C. for 30 minutes. Coatings were allowed to rest for 24 hours before being tested.

Reaction 5: crosslinking reaction between a melamine and acetoacetate functional groups.

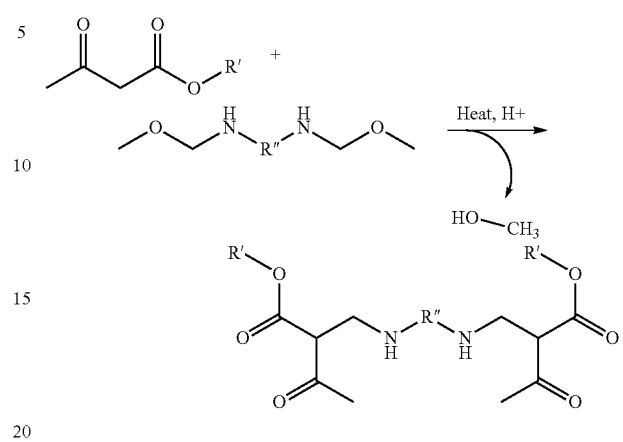

Coatings analysis was performed following the procedure outlined in the ASTM standards: Average Film Thickness, ASTM D6132-13; Konig Pendulum Hardness, ASTM D4366; Pencil Hardness, ASTM D3363; Crosshatch Adhesion, ASTM D3359-09; MEK Double Rubs, ASTM D5402; Reverse Impact, ASTM D6905; and Mandrel Bend ASTM D522/D522M-13. Table 6 shows the results.

TABLE 6

Acetoacetylated Kraft Lignin, 1,4 Butanediol Coatings Cured with Cymel 301.

| Coating | % MF | Wt. % Lignin | Avg. Film Thickness | Konig Pendulum Hardness | Pencil Hardness | Crosshatch Adhesion | MEK Double Rubs | Reverse Impact | Mandrel Bend |
|---|---|---|---|---|---|---|---|---|---|
| 3a | 20 | 0 | 9.1 | 60 | B | 5B | 142 | 12 in lbs. | 0 |
| 3b | 25 | 0 | 18.1 | 58.7 | H | 5B | 232 | 12 in lbs. | 0 |
| 3c | 30 | 0 | 18.5 | 111.3 | 2H | 5B | 400+ | 8 in lbs. | 0 |
| 3d | 20 | 10 | 8.7 | 134.3 | H | 5B | 289 | 8 in lbs. | 6 cm |
| 3e | 25 | 10 | 15.7 | 77.3 | H | 5B | 400+ | 8 in lbs. | 8 cm |
| 3f | 30 | 10 | 19.2 | 80.3 | 3H | 5B | 400+ | 12 in lbs. | 10.5 cm |
| 3g | 20 | 20 | 13.9 | 166 | 3H | 5B | 400+ | 8 in lbs. | 0 |
| 3h | 25 | 20 | 15.2 | 156.7 | 3H | 5B | 400+ | 8 in lbs. | 0 |
| 3i | 30 | 20 | 17.5 | 169.7 | 4H | 4B | 400+ | 8 in lbs. | 0 |
| 3j | 20 | 30 | 17.6 | 170 | HB | 1B | 130 | 8 in lbs. | 6.1 cm |
| 3k | 25 | 30 | 17.5 | 137 | 2H | 5B | 400+ | 8 in lbs. | 10 cm |
| 3l | 30 | 30 | 23.4 | 185 | H | 0B | 400+ | 32 in lbs. | 0 |
| 3m | 20 | 40 | 23.8 | 133.3 | H | 0B | 400+ | 4 in lbs. | 10.4 cm |
| 3n | 25 | 40 | 14.4 | 164.7 | 2H | 5B | 400+ | 8 in lbs. | 0 |
| 3o | 30 | 40 | 36.7 | 172.6 | 2H | 1B | 400+ | 0 in lbs. | 0 |
| 3p | 20 | 50 | 34.2 | 164 | 2H | 1B | 400+ | 8 in lbs. | 0 |
| 3q | 25 | 50 | 17.9 | 189.7 | 3H | 4B | 400+ | 0 in lbs. | 0 |
| 3r | 30 | 50 | 38.9 | 199 | 2H | 0B | 400+ | 4 in lbs. | 0 |
| 3s | 20 | 60 | 16.4 | 179.7 | 2H | 4B | 400+ | 2. in lbs. | 0 |
| 3t | 25 | 60 | 20.7 | 209.3 | 2H | 3B | 400+ | 0 in lbs. | 0 |
| 3u | 30 | 60 | 24.3 | 215.9 | 3H | 0B | 400+ | 0 in lbs. | 0 |
| 3v | 20 | 70 | 22.8 | 210.7 | 4H | 3B | 400+ | 2 in lbs. | 0 |
| 3x | 25 | 70 | 21.3 | 199 | 2H | 0B | 400+ | 2 in lbs. | 0 |
| 3y | 30 | 70 | 26 | 206 | 2H | 0B | 400+ | 0 in lbs. | 0 |

Initial amine-curing evaluations to make coatings were done by mixing in the amine functional resin, Amicure PACM (4,4'-Methylenebiscylcohexylamine), with the AAKLP resin, EK-102-1. The mixture heated up immediately and began to off-gas water vapor as a byproduct of the curing reaction. The mixture was immediately coated onto steel panels. However, the viscosity would increase so much that complete coatings could not be made. Because of the speed of this crosslinking reaction the amines were blocked using a stoichiometric amount of acetone. However, the resulting coatings had a low value of MEK double rubs (<50), which indicated little crosslinking had occurred.

Example 4

Acetoacetylated Kraft Lignin and Polyol (AAKLP) resins were made by varying the polyol using the procedure in Example 3. There is a clear change in the viscosity of the resins based on the polyol component of the resins. See Table 7.

TABLE 7

Viscosity data in centipoise recorded at a rate of 100 Hz and 23° C.

| Lignin (Wt %) | Ethylene Glycol | Diethylene Glycol | Glycerol |
|---|---|---|---|
| 0 | 14.73 | 23.23 | 41.03 |
| 40 | 148.31 | 276.8 | 439.37 |

From these new AAKLP resins a variety of thermoset coatings have been made. The first group of thermosets made used the AAKLP resins listed above and Cymel 301, fully alkylated melamine formaldehyde crosslinker and para-toluenesulfonic acid as a catalyst. These thermoset coatings were cured using the following curing schedule: 130° C. for 10 minutes, ramp temperature up to 160° C. and cure at 160° C. for 30 minutes. After the curing schedule was completed the coatings were taken out of the oven and allowed to cool in ambient conditions for at least 24 hours before being tested. Coatings analysis was performed following the procedures outlined in the ASTM standards: Average Film Thickness, ASTM D6132-13; Konig Pendulum Hardness, ASTM D4366; Pencil Hardness, ASTM D3363; Crosshatch Adhesion, ASTM D3359-09; MEK double rubs, ASTM D5402; Impact Flexibility, ASTM D6905-03; and Mandrel bend, ASTM D522/D522M-13. Table 8 summarizes the results from the coatings characterization of the melamine formaldehyde coatings.

TABLE 8

Results from coatings characterization from AAKLP resins cured with Cymel 301 and 2% wt. pTSA as a catalyst. Coatings Characterized of diol/Kraft Lignin resins

| Coating | % MF | Polyol used | Weight Percent Lignin | Film Thickness | Konig Pendulum Hardness | Pencil Hardness | Crosshatch Adhesion | MEK Double Rubs | Reverse Impact | Mandrel Bend |
|---|---|---|---|---|---|---|---|---|---|---|
| 4-1 | 20 | Ethylene Glycol | 0 | 3.91 | 91.6 | Gouge 6H | 0B | 400+ | 1 | fail |
| 4-2 | 25 | Ethylene Glycol | 0 | 22.17 | 194 | Scratch 9H | 0B | 400+ | 0 | fail |
| 4-3 | 30 | Ethylene Glycol | 0 | 13.94 | 112 | % scratch 9H | 0B | 400+ | 0 | fail |
| 4-4 | 20 | Ethylene Glycol | 40 | 9.83 | 132.67 | Scratch 9H | 0B | 400+ | 1 | fail |
| 4-5 | 25 | Ethylene Glycol | 40 | 22.42 | 206.67 | 9H Pass | 2B-1B | 400+ | 0 | fail |
| 4-6 | 30 | Ethylene Glycol | 40 | 23.5 | 197.33 | 9H Pass | 0B | 400+ | 1 | fail |
| 4-7 | 20 | Glycerol | 0 | 23.94 | 96 | 7H | 0B | 400+ | 3 | pass |
| 4-8 | 25 | Glycerol | 0 | 27.7 | 177.33 | 0 | 0B | 290 | 5 | fail |
| 4-9 | 30 | Glycerol | 0 | 19.68 | 196.67 | 0 | 0B | 400+ | 1 | fail |
| 4-10 | 20 | Glycerol | 40 | | | | | | | |
| 4-11 | 25 | Glycerol | 40 | 22.82 | 218 | 9H Pass | 0B | 600+ | 1 | fail |
| 4-12 | 30 | Glycerol | 40 | | | | | | | |
| 4-13 | 20 | Diethylene Glycol | 0 | | | | | | | |
| 4-14 | 25 | Diethylene Glycol | 0 | 18.66 | 66 | Gouge 8H | 0B | 400+ | 0 | fail |
| 4-15 | 30 | Diethylene Glycol | 0 | 19.14 | 65 | Gouge 7H | 0B | 400+ | 1.75-2 | fail |
| 4-16 | 20 | Diethylene Glycol | 40 | 29.07 | 166.67 | 9H Pass | 0B | 400+ | 1 | fail |
| 4-17 | 25 | Diethylene Glycol | 40 | 33.01 | 156.67 | 9H Pass | 0B | 400+ | 1 | fail |
| 4-18 | 30 | Diethylene Glycol | 40 | 25.46 | 179.99 | 9H Pass | 0B | 400+ | 1 | fail |

Example 5: Curing with Diamines

Amine functional groups will readily react with the enolic hydroxyl group of the acetoacetate at room temperatures to form an enamine structure (Reaction 6, where the group P represents the base polymer, in this case lignin, and the group R represents the internal structure of a diamine). Because this crosslinking reaction occurs so quickly at room temperature, the polymer can have a short working pot life making it difficult to make coatings. In order to extend out the pot life we have explored using acetone to block the amine functional groups and slow the rate of reaction.

Reaction 6: crosslinking reaction between a diamine and acetoacetate functional groups.

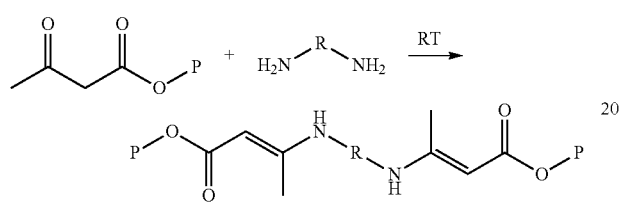

Amicure PACM (4,4'-Diaminodicyclohexyl methane) was used as a diamine to cure the resins. The PACM could be replaced by any primary diamine. For these coatings, PACM and acetone were mixed together before adding in the appropriate AAKL resin. Coatings were made on steal panels that had been cleaned using isopropyl alcohol. Coatings were made and allowed to cure at 80° C. for 1 hour to force the curing reaction to go to completion. Table 9 reports the results and characterization of these coatings.

TABLE 9

Coatings characterization testing for AAKLP resins made with 1,4 butanediol as the reactive diluent.

| Amine | Weight Percent Lignin | Average Film Thickness | Konig Pendulum Hardness | Pencil Hardness | Crosshatch Adhesion | MEK Double Rubs | Reverse Impact | Mandrel Bend |
|---|---|---|---|---|---|---|---|---|
| PACM | 0 | 56.4 | 14.7 | 6B | 0B | 10 | 168.6 in/lbs | pass |
| PACM | 10 | 41.8 | 14.7 | 5B | 0B | 8 | 168.6 in/lbs | pass |
| PACM | 20 | 34.9 | 33.7 | 4B | 0B | 15 | 23.5 in/lbs | pass |
| PACM | 30 | 33.7 | 47.3 | B | 0B | 8 | 23.5 in/lbs | pass |
| PACM | 40 | 39.3 | 51.7 | B | 0B | 10 | 11.9 in/lbs | pass |
| PACM | 50 | 14.7 | 23.3 | HB | 0B | 9 | 11.9 in/lbs | pass |
| PACM | 60 | 31.4 | 89 | HB | 0B | 23 | 15.7 in/lbs | 1 cm |

In addition to force curing the acetoacetate/amine coatings the resins were also cured under ambient conditions to improve coatings properties by allowing the polymer a longer time to cure at a lower temperature. Properties were improved, though marginally, when this new curing schedule was implemented. Table 10 reports the results.

TABLE 10

Coatings characterization results from Amine cured AAKLP resins made with Ethylene glycol (EG), Diethylene Glycol (DEG), and Glycerol as reactive diluents and cured under ambient conditions.

| Amine | Coating | AAKL resin | Amine/AA molar ratio | Average film thickness | Konig Pendulum Hardness | Pencil Hardness | Crosshatch Adhesion | MEK Double Rubs | Reverse Impact | Mandrel Bend |
|---|---|---|---|---|---|---|---|---|---|---|
| PACM | 5-1 | 0% KL in DEG | 1:1 | 38.1 | 219.7 | F | 5B Pass | 11 | 7.84 in/lbs | Fail |
| PACM | 5-2 | 40% KL in DEG | 1:1 | 143.7 | 80 | 2B | 2B | 16 | 7.84 in/lbs | 0 Pass |

TABLE 10-continued

Coatings characterization results from Amine cured AAKLP resins made with Ethylene glycol (EG), Diethylene Glycol (DEG), and Glycerol as reactive diluents and cured under ambient conditions.

| Amine | Coating | AAKL resin | Amine/AA molar ratio | Average film thickness | Konig Pendulum Hardness | Pencil Hardness | Crosshatch Adhesion | MEK Double Rubs | Reverse Impact | Mandrel Bend |
|---|---|---|---|---|---|---|---|---|---|---|
| PACM | 5-3 | 0% KL in EG | 1:1 | 60.5 | 185 | H | 0B | 15 | 0 | Fail |
| PACM | 5-4 | 40% KL in EG | 1:1 | 54.5 | 162.7 | 2H | 1B | 14 | 3.92 in/lbs | Fail |
| PACM | 5-5 | 0% KL in Glycerol | 1:1 | 39.9 | 147 | 8B | 2B | 105 | 0 | Fail |
| PACM | 5-6 | 40% KL in Glycerol | 1:1 | 29.4 | 171 | 3H | 1B | 160 | 0 | Fail |

Example 6: Michael Addition Curing

Curing of acetoacetate resins can also readily occur at room temperature through curing with electron deficient olefins. This curing reaction happens under basic conditions (Reaction 7, where R' represents lignin/reactive diluent and R" represents any group to which acrylate can be reacted including any simple polyol (diol triol, etc.), a polymer or oligomer (such as a polyether or polyester, polyurethane or epoxy)), which means that catalyst selection can play a role in pot life and curing speed.

Reaction 7: Michael reaction between an electron deficient olefin (diacrylate) and the acetoacetate functionalized polymer/reactive diluent.

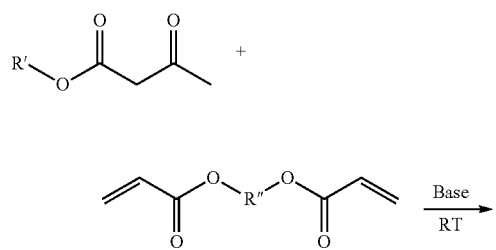

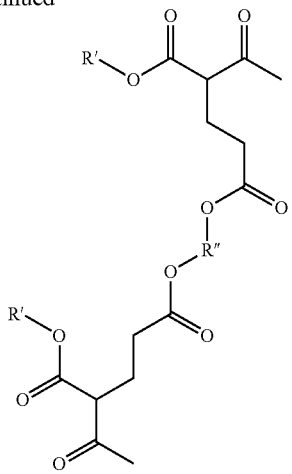

Coatings have been made by curing a variety of AAKLP resins with Sartomer SR 415 (Ethoxylated(20) trimethylolpropane triacrylate). The catalyst that we are currently using is 1,8-Diazabicyclo[5.4.0]undec-7-ene (DBU) at a catalyst loading of 0.5% by weight. At this catalyst loading, coatings have taken longer than 48 hours to cure completely, so we are testing the effects of increasing the catalyst loading. Table 11 lists the results from the coatings.

TABLE 11

Result from coatings characterization of AAKLP resins cured with Sartomer SR 415 and DBU as a catalyst.

| Coating | AAKL resin | Acrylate | MEK Double Rubs | Konig Pendulum Hardness | Mandrel Bend | Reverse Impact | Film Thickness | Gloss | Pencil Hardness | Adhesion |
|---|---|---|---|---|---|---|---|---|---|---|
| 6-1 | 0% KL in DEG | SR415 | 20 | 18 | 0 in Pass | >168 in/lbs | 60.5 | 20° - 67.7 60° - 85.5 85° - 98.8 | 8B | 1B |
| 6-2 | 40% KL in DEG | SR415 | | | | | | 20° - 60° - 85° - | | |
| 6-3 | 0% KL in EG | SR415 | 7 | 22.3 | 0 in Pass | >168 in/lbs | 17.2 | 20° - 75.7 60° - 86.3 85° - 98.2 | 8B | 1B |

TABLE 11-continued

Result from coatings characterization of AAKLP resins cured with Sartomer SR 415 and DBU as a catalyst.

| Coating | AAKL resin | Acrylate | MEK Double Rubs | Konig Pendulum Hardness | Mandrel Bend | Reverse Impact | Film Thickness | Gloss | Pencil Hardness | Adhesion |
|---|---|---|---|---|---|---|---|---|---|---|
| 6-4 | 40% KL in EG | SR415 | | | | | | 20° -<br>60° -<br>85° - | | |
| 6-5 | 0% KL in Glycerol | SR415 | | | | | | 20° -<br>60° -<br>85° - | | |
| 6-6 | 40% KL in Glycerol | SR415 | | | | | | 20° -<br>60° -<br>85° - | | |

Example 7: Methacrylated Lignins

The synthesis of methacrylated Kraft Lignin resin is carried out as follows: Kraft lignin (Indulin AT from MeadWestvaco), polyol, methacrylic anhydride, and 4-Dimethylaminopyridine (DMAP) were all measured out into a 1-liter resin kettle. A mechanical stirrer with a stirring rod and a thermocouple were attached to the top of the resin kettle. The loaded resin kettle was placed in a heating mantle. The methacrylation reaction was run at 45° C. for a set amount of time. Reactions were tracked for completion using acid number titration. The acid number would increase over the course of the reaction until it reached a plateau, which indicated that the hydroxyl groups had all been reacted with the methacrylic anhydride and no additional methacrylic acid is being produced. The ratio of Kraft Lignin to polyol was varied systematically to better understand how the addition of more Kraft lignin would affect the resulting properties of the cured material. The amount of Kraft lignin was varied from 0-40% by weight compared to the polyol, which were varied from 60-100% by weight.

When the synthesis was complete the methacrylated lignin resin was allowed to cool to room temperature before being thoroughly washed using a saturated sodium bicarbonate solution to remove the excess methacrylic acid. The resin was washed 3 times to be certain that all of the excess acid had been removed. Washing the excess methacrylic acid often became problematic because the organic resin did not separate well from the sodium bicarbonate solution. Water would often get trapped within the washed resins which made poor samples when they were polymerized. The "crude" resin mixture still contained the methacrylic acid. Both the crude resin and the washed resins were used in the polymerization (curing) reactions. Table 12 summarizes the synthesis reactions carried out of the methacrylated Kraft lignin and polyols.

TABLE 12

List of reactions carried out to create methacrylated Kraft lignin and polyol resins.

| Experiment | Diol | Diol (wt %) | Diol (g) | Solvent | Lignin (wt %) | Lignin (g) | Catalyst (g) | Methacrylic Anhydride (g) | Reaction Time (hr) |
|---|---|---|---|---|---|---|---|---|---|
| 1 | Ethylene Glycol | 100 | 25 | None | 0 | 0 | 0.98 | 136.22 | 24 |
| 2 | Diethylene Glycol | 100 | 42.42 | None | 0 | 0 | 0.99 | 136.49 | 22 |
| 3 | Diethylene Glycol | 90 | 31.18 | None | 10 | 3.38 | 0.69 | 103.39 | 24 |
| 4 | Ethylene Glycol | 90 | 30 | None | 10 | 3.34 | 1.18 | 167.42 | 26 |
| 5 | Diethylene Glycol | 80 | 24.05 | None | 20 | 6.05 | 0.56 | 83.16 | 22 |
| 6 | Ethylene Glycol | 80 | 24.15 | None | 20 | 6.01 | 0.94 | 137.52 | 26 |
| 7 | Diethylene Glycol | 90 | 27.17 | None | 10 | 3.04 | 0.62 | 91.54 | 26 |
| 8 | Diethylene Glycol | 70 | 21.03 | None | 30 | 9.02 | 0.59 | 76.71 | 26 |
| 9 | Ethylene Glycol | 70 | 21.51 | None | 30 | 9.07 | 0.6 | 124.29 | 25 |
| 10 | Diethylene Glycol | 60 | 18.04 | None | 40 | 12.04 | 0.61 | 70.8 | 19 |
| 11 | Ethylene Glycol | 60 | 18.03 | None | 40 | 12 | 0.59 | 111.44 | 19 |
| 12 | 1,4 Butanediol | 70 | 21.1 | None | 30 | 9.06 | 0.61 | 88.69 | 21 |
| 13 | 1,5 Pentanediol | 70 | 21.15 | None | 30 | 9.07 | 0.61 | 78.16 | 19 |
| 14 | 1,6 Hexanediol | 70 | 21.37 | MEK (200 ml) | 30 | 9.02 | 0.6 | 69.93 | 23 |
| 15 | 1,6 Hexanediol | 70 | 21.07 | MEK (200 ml) | 30 | 9.01 | 0.6 | 64.44 | 24 |

TABLE 12-continued

List of reactions carried out to create methacrylated Kraft lignin and polyol resins.

| Experiment | Diol | Diol (wt %) | Diol (g) | Solvent | Lignin (wt %) | Lignin (g) | Catalyst (g) | Methacrylic Anhydride (g) | Reaction Time (hr) |
|---|---|---|---|---|---|---|---|---|---|
| 16 | 1,6 Hexanediol | 80 | 24.09 | MEK (200 ml) | 20 | 6.07 | 0.6 | 68.99 | 24 |
| 17 | Diethylene Glycol | 70 | 42 | MEK 28.78 g | 30 | 18.03 | 1.27 | 82.05 | 96 |
| 18 | 1,6 Hexanediol | 60 | 18.1 | MEK (200 ml) | 40 | 12.04 | 0.61 | 60.4 | 96 |
| 19 | 1,6 Hexanediol | 90 | 27 | MEK (200 ml) | 10 | 3.07 | 0.62 | 73.8 | 47 |
| 20 | Diethylene Glycol | 70 | 42 | MEK 28.59 g | 30 | 17.97 | 1.26 | 80.23 | 72 |

Example 8: Methacrylated Polyol-Kraft Lignin-Versatic Acid Resins

Methacrylated polyol-Kraft lignin-versatic acid resins were synthesized using a two step process. First, Kraft lignin was solubilized in a chosen polyol (e.g., diethylene glycol). Next, an appropriate amount of methacrylic anhydride was added to functionalize all hydroxyl groups present in the Kraft lignin-polyol mixture. Dimethylaminopyridine (DMAP) was used as a catalyst for the functionalization step (Reaction 3). This reaction was carried out at 45° C. for 24 hours. Potentiometric acid number titration was used to monitor the production of methacrylic acid in the reaction mixture. The acid number of the reaction mixture after 24 hours was used to calculate the amount of Cardura E-10P that would be added to the reaction mixture for the second step of the resin synthesis.

Once the amount of methacrylic acid in the resin was determined, an appropriate (stoichiometric) amount of Cardura E-10P was added to the reaction mixture along with benzyl trimethyl ammonium chloride (BTMAC) as catalyst at 1% weight percent. The methacrylic acid reacts with the pendent epoxy group of the Cardura E-10P to form a methacrylated versatic acid (Reaction 4). The second step of the reaction was run at 90° C. for an additional 24 hours. Acid number titration was performed after 24 hours to ensure that all the excess methacrylic acid had been consumed. The final resin was then characterized using an ARES Rheometer to measure viscosity and FTIR to confirm the functionality of the resin.

1.3 Characterization of Resin

A variety of techniques characterized each of the resins after synthesis. FTIR was used to characterize the functional groups present in the resin (note that resins that contained residual water from being washed were not analyzed with FTIR). In addition to FTIR, the resins were also characterized using NMR, GPC, and the ARES rheometer. NMR spectra were obtained and used to confirm the structure. GPC was used to help understand more about the size of the modified lignin. Because GPC compares the sample to linear polystyrene standards, it is difficult to tell the exact molecular weight of the nonlinear methacrylated lignin. After characterization of the resins, the resins were cured using thermal free radical initiators to polymerize.

Figure 5:
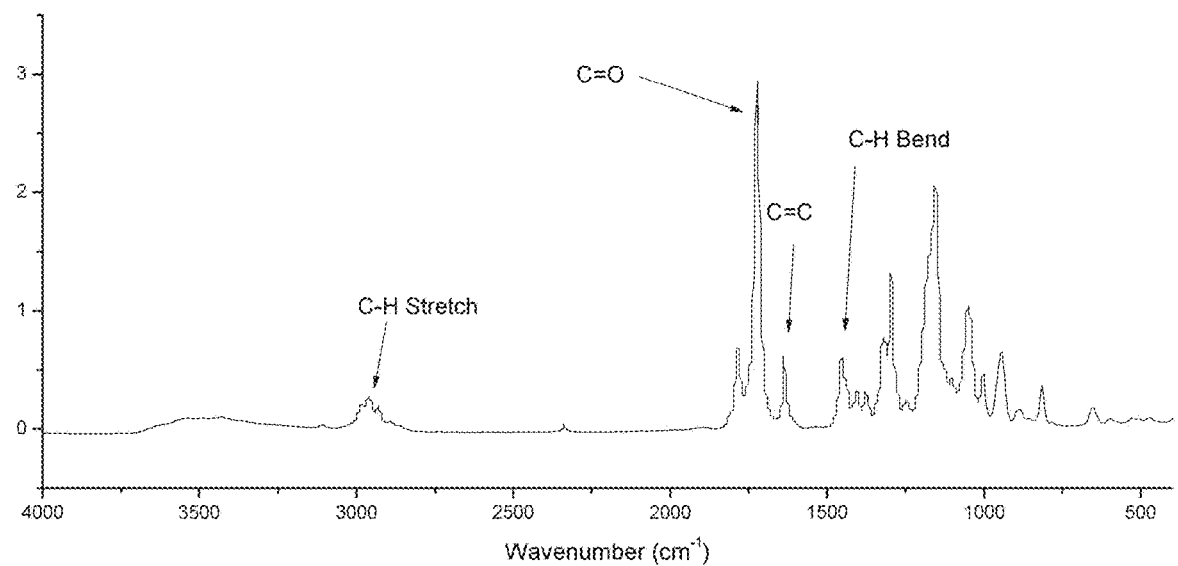
FIG. 5 depicts the FTIR spectrum of methacrylated ethylene glycol.

FTIR spectra of all synthesized resins (which did not contain residual water) were taken. All spectra show strong C=O stretching around 1715 $cm^{-1}$, and C=C stretching near 1670 $cm^{-1}$. Finally, there is a band just below 3000 $cm^{1}$, which is indicative of C—H stretching as well as C—H bending at 1470 $cm^{-1}$. These bands suggest that methacrylate groups are present. The reduction of the OH band suggest that the majority of the hydroxyl groups have been functionalized. FIG. 5 shows an example FTIR spectrum of methacrylated ethylene glycol.

Figure 6:
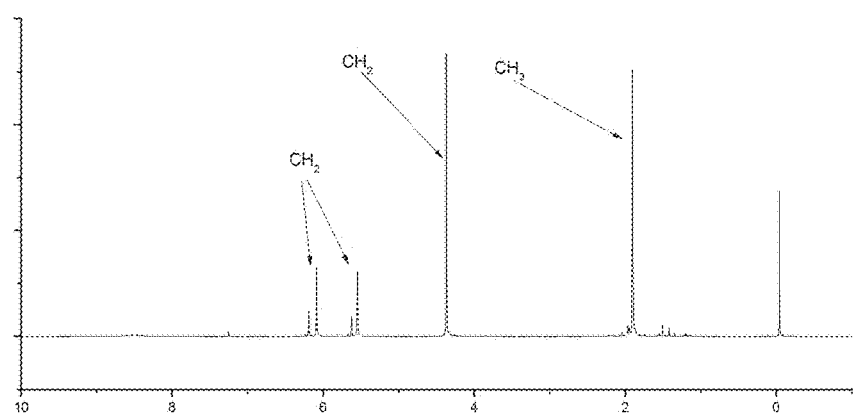
FIG. 6 depicts the proton NMR of methacrylated ethylene glycol with $CDCl_3$ as a solvent.

The proton NMR spectrum of the methacrylated ethylene glycol (FIG. 6) shows some very distinct peaks. The peak that is at 1.9 ppm is the methyl group on the acrylate functionality. At 4.2 ppm there is a peak which corresponds to the alkene $CH_2$ of the methacrylate groups. Finally, there are two peaks that correspond to the alkyl $CH_2$ groups at 5.7 ppm and 6.1 ppm. This spectrum along with the FTIR spectra helps us confirm that we have successfully made methacrylated ethylene glycol. The FTIR and NMR spectra of the lignin-containing materials show similar characteristic peaks, but have additional peaks and are more complex due to the complex nature of the lignin.

Figure 7:
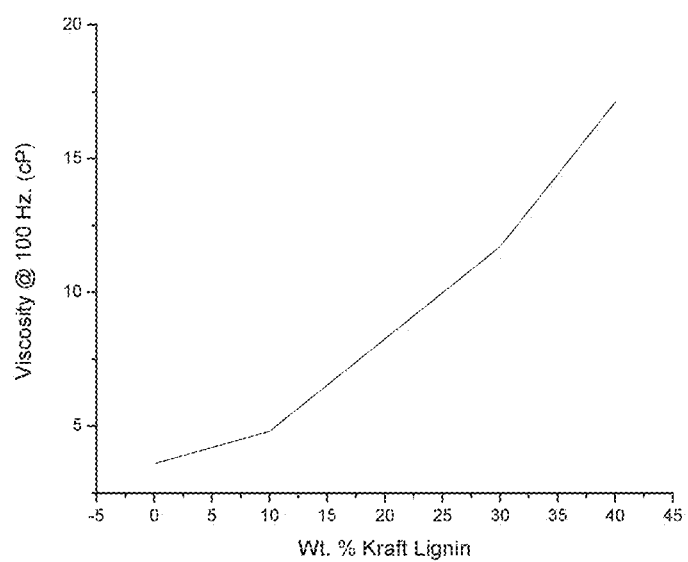
FIG. 7 is a graph of the viscosity in centipoise of the methacrylated diethylene glycol and Kraft lignin resins as a function of the weight percentage of Kraft lignin.

Characterization of these resins also included viscosity measurements that were performed on an ARES rheometer. All viscosity measurements were recorded at room temperature (approximately 22° C.). Viscosity measurements were taken at a rate of 100 Hz. in pascal seconds, which were then converted to centipoise. FIG. 7 shows how the viscosity of the methacrylated diethylene glycol and Kraft lignin resins (crude) changed as the weight percentage of Kraft lignin was increased. The viscosity increased as we incorporated a greater fraction of Kraft lignin into the methacrylated resin synthesis.

1.4 Curing of Methacrylated Kraft Lignin and Methacrylated Polyol Resins

In order to cure the methacrylated Kraft lignin and polyol resins, the resins were mixed with a thermal free radical initiator. In the initial stages of making samples for dynamic mechanical analysis, the initiator was varied between Trigonox 239, Luperox P, and Luperox A98. In addition to varying the type of initiator catalyst, the catalyst loading was also varied from 1, 2, 5, and 10 weight % of the formulation. Both the crude reaction mixtures (still contains the methacrylic acid) and the washed reaction mixtures (methacrylic acid washed out) were cured. The resins were cured for 4 hours at 80° C. and 2 hours at 110° C. The materials could be cured to hard glassy thermosets.

1.5 Characterization of Methacrylated Polyol-Kraft Lignin-Versatic Acid Resin

Figure 8:
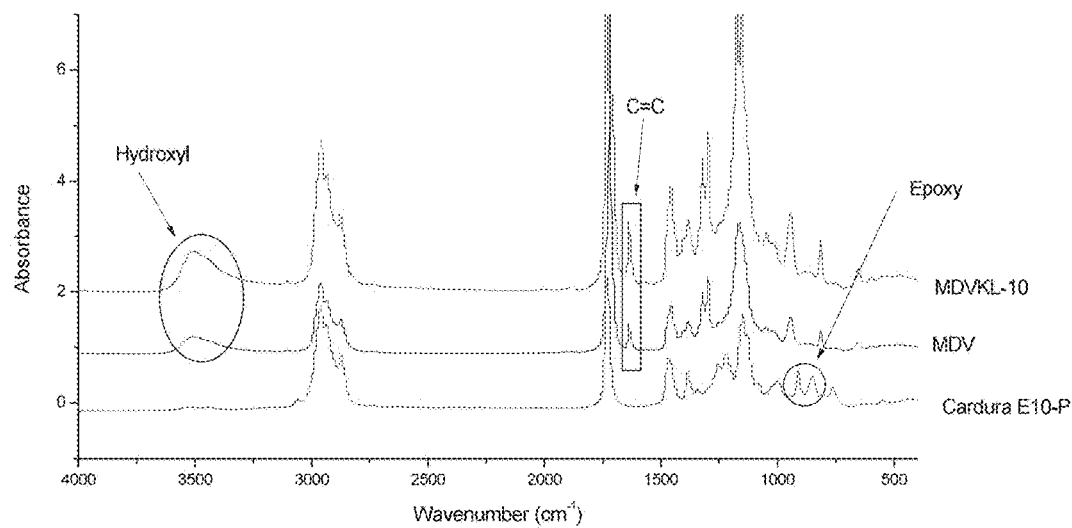
FIG. 8 shows the FTIR spectra of Cardura E-10P and Versatic acid modified resins: methacrylated diethylene glycol and methacrylated versatic acid (MDV) and methacrylated diethylene glycol, methacrylated Kraft lignin, and methacrylated versatic acid (MDVKL-10).

The final resin, comprised of methacrylated polyol-Kraft lignin-versatic acid mixture, was characterized by FTIR analysis. IR spectroscopy allows us to see different functional groups present in a material. FIG. 8 shows the IR absorbance of the starting material Cardura E-10P along with the final resins with 0% and 10% Kraft lignin respectively. It is clearly shown that the epoxy group present in the Cardura E-10P is consumed after it has been reacted with the methacrylated Kraft lignin-polyol mixture. The hydroxyl band that is present in the FTIR of the resin also suggest that the epoxy has successfully reacted with the methacrylic acid to form a methacrylated versatic acid. It is also shown that the alkene functionality of the resin is preserved in the final resin because this is where polymerization takes place.

Figure 9:
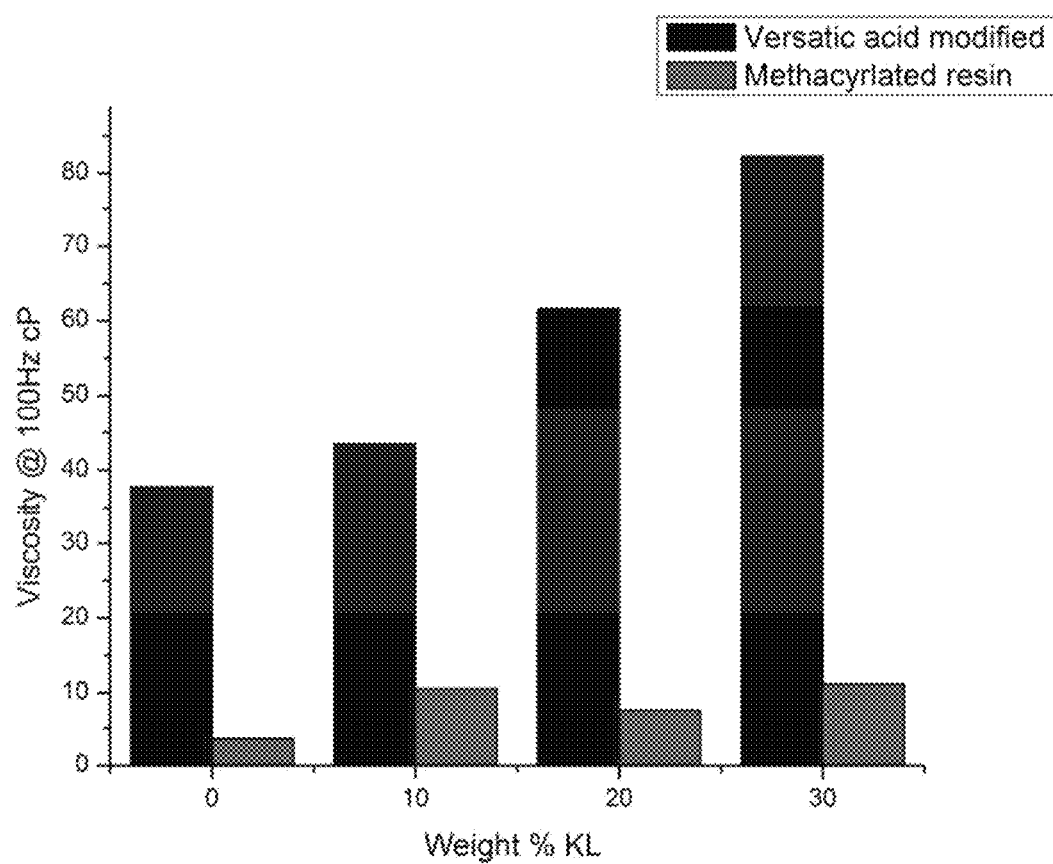
FIG. 9 shows a comparison of the viscosity of methacrylated Kraft lignin (red) and of the Versatic acid modified Kraft lignin resin (black) measured using the parallel plate geometry of the ARES viscometer at a rate of 100 Hz.

The final resin was also characterized using an ARES rheometer. Parallel plate geometry was used for all viscosity calculations and all viscosity measurements were taken at room temperature at a rate of 100 Hz; FIG. 9 shows the data. There is a clear trend of increasing viscosity with an increase in the weight percentage of Kraft lignin present in the resin. Viscosity of the final resin was also much greater than the viscosity of methacrylated Kraft lignin-polyol and methacrylic acid resin.

1.6 Curing of Methacrylated Polyol-Kraft Lignin-Versatic Acid Resin

The final resin mixture of methacrylated Kraft lignin-polyol-versatic acid (MKLPVA) was cured using a free radical initiator. The most ideal conditions for curing used benzoyl peroxide as a thermal initiator and a curing schedule of 7° C. for 1 hour, 90° C. for 1 hour, and 150° C. for 2 hours. Benzoyl peroxide was first dissolved in the resin using a Flacktek highspeed mixer. Resin was then transferred to molds to be cured. The cured MKLPVA materials were tested for a variety of materials properties. A modified version of percent solids was used to characterize the amount of resin that ends up in the cured materials. Sol-gel extraction and ATR-FTIR were used to track the extent of polymerization. The glass transition temperature of the cured materials was assessed using both Thermal Mechanical Analysis (TMA) and Dynamic Mechanical Analysis (DMA).

Figure 10:
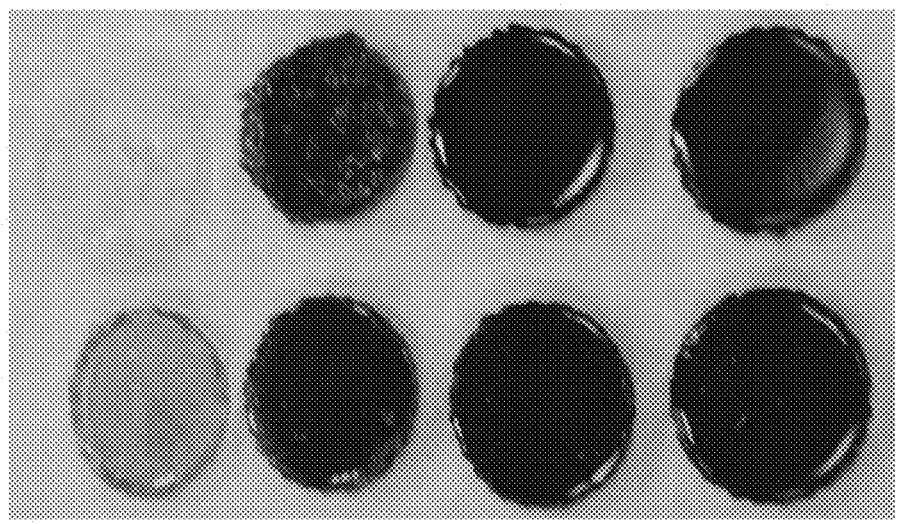
FIG. 10 shows cured methacrylate materials: cured methacrylated Kraft lignin-diethylene glycol-methacrylic acid materials (MKLDEGVA) (top row) with increasing lignin content 0%, 10%, 20%, and 30% from left to right, and cured methacrylated Kraft lignin-diethylene glycol-versatic acid (bottom row) with increasing lignin content 0%, 10%, 20%, and 30% from left to right.

1.7 Characterization of Cured Methacrylated Polyol-Kraft Lignin-Versatic Acid Resin Cured materials (FIG. 10) formed more uniform samples with fewer defects when compared to the resins that were not modified with Cardura E-10P. A modified percent solids experiment as used to assess the amount of resin that is incorporated into the final cured materials. Because this resin is comprised of all methacrylate functional materials, theoretically materials should be 100% solids.

For the modified percent solids experiment benzoyl peroxide (5% by weight) was first dissolved in each resin. Next, a set amount of resin (approx. 2 g) was measured out into small aluminum pans. Resins were cured using the following curing schedule 70° C. for 1 hour, 90° C. for 1 hour, and 150° C. for 2 hours. The weight of uncured resin in each pan was recorded and the final weight of the cured material was recorded. These weights were used to determine the percentage of uncured resin that was incorporated into the final cured material. Table 13 shows the results from the modified percent solids experiment. All materials show a high conversion of resin to thermoset.

TABLE 13

Results from the modified percent solids experiment.

| Trial | 0% KL | 10% KL | 20% KL | 30% KL |
|---|---|---|---|---|
| 1 | 95.12% | 96.14% | 95.07% | 87.62% |
| 2 | 96.52% | 97.06% | 95.59% | 89.71% |
| 3 | 96.86% | 96.59% | 95.07% | 90.15% |
| 4 | 96.59% | 96.08% | 95.05% | 90.56% |
| 5 | 95.00% | 94.92% | 94.38% | 88.24% |
| Average | 96.02% | 96.15% | 95.03% | 89.25% |

Figure 11:
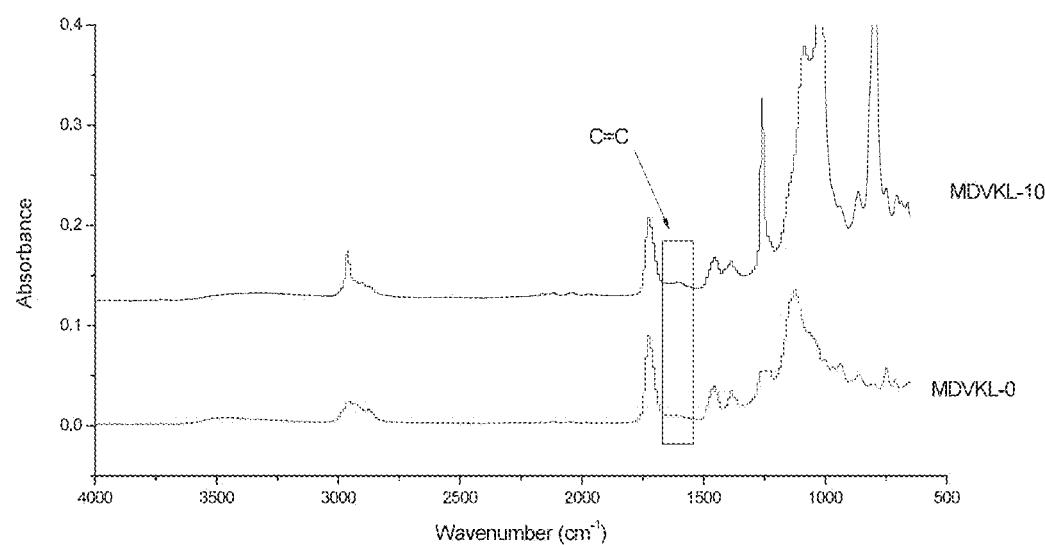
FIG. 11 shows the ATR-FTIR of cured MKLPVA resins, which show the absence of alkene carbon-carbon stretching.

Cured MKLDEGVA resins were also assessed using ATR-FTIR to see what functional groups are present in the final cured materials. FIG. 11 shows the ATR-FTIR, which shows a significant reduction in the alkene (C=C) groups present. This reduction in the alkene band suggests polymerization through the alkene creating an alkyl chain.

Sol-gel extraction was performed on the cured materials to assess what fraction of the material is incorporated into the thermoset network and what portion is still soluble. Cured samples were weighed and wrapped in filter paper, before being placed in Soxhlet extraction thimbles. Extractions were done in a Soxhlet extractor for 24 hours using dichloromethane as the solvent. After extraction, the samples were taken out of the filter paper and allowed to dry for 72 hours before being re-weighed. The weight of the samples after extraction was then used as the percentage of the cured materials that was incorporated into the thermoset network (% gel). Table 14 shows a summary of the results from this experiment. Results suggest that the resin is highly crosslinked by the chosen curing schedule.

TABLE 14

Results from sol-gel extraction experiments performed on the MKLPVA cured materials.

| Methacrylated kraft lignin resin | % Gel |
|---|---|
| 0% | 97.1% |
| 10% | 97.2% |
| 20% | 93.0% |
| 30% | 87.5% |

Figure 12:
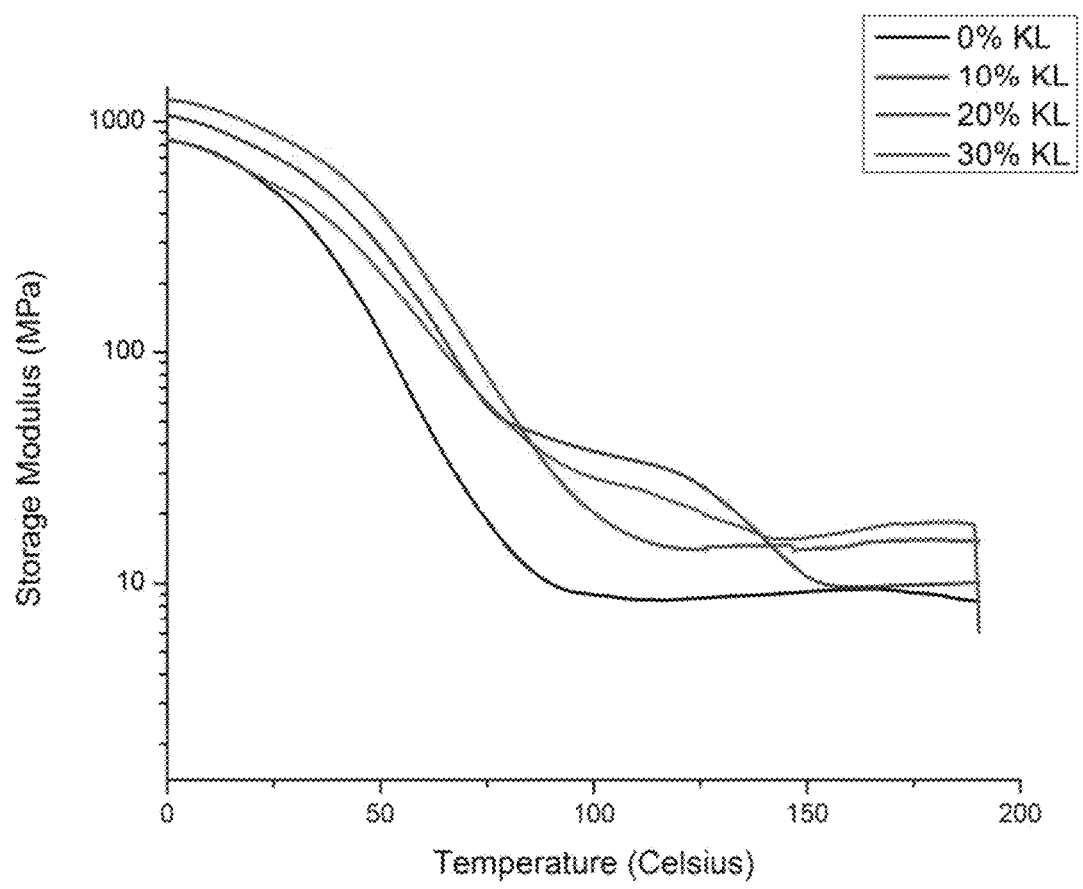
FIG. 12 shows the storage modulus graph of cured MKLDEGVA resins. DMA experiments were conducted using a dual cantilever experiments.
Figure 13:
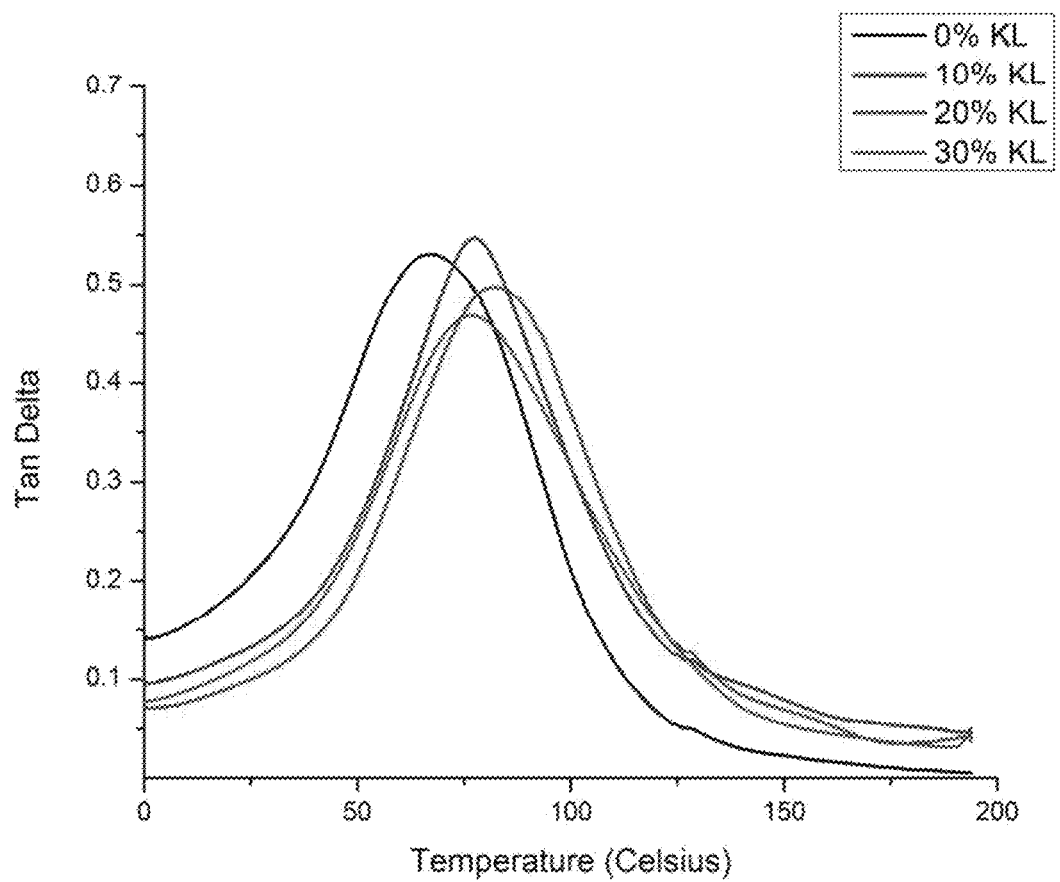
FIG. 13 shows the tan delta curve of MKLDEGVA cured materials. The peak of tan delta curves were used to calculate the glass transition temperatures of the materials.

Thermal analysis of the cured MKLDEGVA was done both with DMA and TMA to calculate the glass transition temperature of the cured materials. From the DMA results the crosslink density (XLD) can also be calculated. Table 15 shows a summary of the results from the thermal analysis. FIG. 12 and FIG. 13 show the storage modulus and tan delta curves produced during DMA analysis. DMA experiments were done in a dual cantilever experimental setup. All DMA samples were cured in poly-dimethylsiloxane (PDMS) molds. Samples made for TMA were cured in small aluminum pans.

TABLE 15

Summary of the results for DMA and TMA experiments.

| DMA results MKLDEGVA KL:DEG | TMA Tg (Celcius) | DMA Tg (Celcius) | Young's Modulus @ $T_g$ + 60° C. (MPa) | XLD (mol/m$^3$) |
|---|---|---|---|---|
| 0:100 | 91.21 | 67.40 | 8.73 | 874.70 |
| 10:90 | 96.93 | 81.30 | 14.60 | 1413.40 |
| 20:80 | 88.88 | 77.10 | 16.31 | 1594.30 |
| 30:70 | 90.43 | 76.80 | 14.68 | 1436.20 |

The methacrylated kraft lignin/polyol/versatic acid resins synthesized show that as a greater weight percentage of lignin is incorporated into the resin the viscosity of the uncured materials increases. These resins have also been cured using benzoyl peroxide as a free radical initiator and a curing schedule of 70° C. for 1 hour, 90° C. for 1 hour, and 150° C. for 2 hours. The resin showed a low VOC content and a high degree of crosslinking. Cured materials also showed a high $T_g$. The incorporation of additional lignin did not have an apparent effect on the $T_g$ or degree of polymerization.

2 Synthesis and Characterization of Foams Derived from Acetoacetylated Resin Compositions

2.1 Materials

Indulin AT Kraft lignin was obtained from Ingevity (formerly Mead Westvaco). Bio-based 1,4-butane diol was provided by BioAmber and bio-based 1,3-propanediol was provided by duPont Tate & Lyle. Cyclopentane, ethylene glycol, diethylene glycol, and glycerol were all purchased from Sigma Aldrich. Tris-(2-aminoethyl) amine was purchased from Alfa Aesar. Eastman Chemical provided the tert-butyl acetoacetate while Solvay (formerly CYTEC) provided the AEROSOL OT-75. Chemicals were used directly as received without any further purification.

2.2 Methods 2.2.1 FTIR

Fourier transformed infrared spectroscopy was used to characterize the functional groups found in the acetoacetylated resins. Spectra were obtained using a Thermo Scientific Nicolet 8700 FTIR spectrometer. One drop of resin was sandwiched between two potassium bromide salt crystals. Thirty-two scans were taken for each spectral acquisition at a data sampling interval of 4.0 cm$^{-1}$. Spectral readings were taken from 4000-500 cm$^{-1}$.

2.2.2 Viscosity

Viscosity measurements for each resin was obtained using an ARES Rheometer equipped with a parallel plate geometry. All measurements were obtained at room temperature (approximately 23° C.).

2.2.3 Thermal Stability

Thermal stability was tested using a TA Instruments Q500 Thermogravimetric Analyzer. Approximately 10 mg of sample was placed in the platinum sample pans. Samples were heated from room temperature (~22° C.) to 800° C. at a heating rate of 10° C. per minute. Experiments were run in both nitrogen atmosphere as well as in air. All data was analyzed using TA Universal Analysis software.

2.2.4 Density

Density was measured using the weight of each sample and the formula $V=\pi r^2 h$ to obtain the volume of each sample. Height (h) and diameter measurements for each sample were taken using a caliper, while the weight of each sample was measured on an analytical balance.

2.2.5 microCT

Samples were scanned in a GE Phoenix v|tome| x s X-ray computed tomography system (microCT) with a 180 kV nanofocus X-ray tube and a high-contrast GE DXR250RT flat-panel detector (GE Sensing & Inspection Technologies GmbH, Wunstorf, Germany). Using a voltage of 60 kV and a current of 300 µA with a molybdenum target, 1500 X-ray projections were obtained at a detector timing of 500 ms. Voxel size was 26.70 µm. Acquired images were reconstructed into a volume using GE datos|x 3D computer tomography software version 2.2. The reconstructed volume was then viewed and manipulated using VGStudio Max (Volume Graphics, Inc., Charlotte, North Carolina USA).

2.2.6 SEM

For scanning electron microscopy, foam cylinders were broken to expose the interior. Portions were attached to cylindrical aluminum mounts with silver paint (SPI Supplies, West Chester, Pennsylvania) and sputter coated with gold (Cressington 108auto, Ted Pella Inc., Redding, California USA). Images of the interior were obtained using a JEOL JSM-6490LV scanning electron microscope (JEOL USA Inc., Peabody, Massachusetts USA) operating at an accelerating voltage of 15 kV.

2.2.7 Compression Testing

Compression testing was performed on an Instron equipped with a compression set up on the load cell. Five foam cylinders were evaluated for each of the foam compositions. Samples had a radius of 1-1.5 cm and a height between 2-5 cm. Compression test was run at a compression rate of 1 cm/minute. The force and distance were recorded and the maximum yield force was used for the test.

2.2.8 Fire Retardancy

Fire retardancy tests were performed following UL-94 standard test method for flammability of plastic materials for parts in devices and appliances. Sample dimensions were modified slightly to fit the cylindrical samples made. An additional containment apparatus was constructed to contain any burning materials and prevent the spread of burning materials or embers.

2.2.8 Resin Synthesis

Acetoacetylated Kraft lignin resins were synthesized with varying amounts of Kraft lignin and using different reactive diluents during the synthesis. First an appropriate ratio of reactive diluent (1,4-butanediol, 1,3-propanediol, ethylene glycol, diethylene glycol, and glycerol) and Kraft lignin were measured out into a 4 neck, 500 ml round bottom flask. Next, enough tert-butyl acetoacetate (tBAA) was measured into the flask to functionalize all the hydroxyl groups of both the Kraft lignin and the chosen reactive diluent. The round bottom flask was equipped with overhead mechanical stirring, nitrogen sparge, and a condensing arm that was fitted with a collection flask submerged in an ice bath. The reaction was run at 130° C. for approximately 20 hours to help overcome steric hindrance of the large lignin macromolecules. T-butyl alcohol began evolving as the reaction temperature reach approximately 100° C. When the reaction was complete the resin was allowed to cool to room temperature before being characterized and used to make foams.

Foams were made by crosslinking acetoacetylated Kraft lignin resins with tris(2-aminoethyl) amine (TAEA) in the presence of a blowing agent (cyclopentane), surfactant (AEROSOL OT-75), and water. First, 5 g of the appropriate acetoacetylated Kraft lignin resin was measured out into a 40 ml glass vial. 2 g of cyclopentane and 1 g of deionized water and 0.05 g of surfactant were measured out into the vial. This mixture was mixed using a vortex mixer on high for about 20 seconds until it became homogeneous. Once the mixture was homogeneous, a stoichiometric amount of TAEA (1:1 primary amine: acetoacetate) was measured out. The cap was then placed on the vial and the formulation was mixed using the vortex mixer for 30 seconds after which the vial was vented. After the pressure was released, the mixture was mixed for an additional 30 seconds. After the second mixing cycle the cap of the vial was removed, and the foam was allowed to cure for 24 hours before being removed from the vial. Foams were allowed to cure for 1 week before being tested.

Acetoacetylated resins were examined for their spectroscopic and rheological properties. The rheological properties exhibited by each resin was dependent on two major factors; the amount of Kraft lignin used to make the resin, and the reactive diluent used (Table 16). In the 1,4-butanediol resins where the amount of lignin was increased, the resin viscosity increased as the amount of lignin was increased. Because of the bulkiness of lignin, the addition of more lignin increases the viscosity. In addition to the amount of lignin, the reactive diluent that was chosen also greatly affected the viscosity. It was expected that the greater molecular weight diluents would result in an increase in viscosity. In general, the resins followed this trend, except for the 1,4-butanediol 40% Kraft lignin resin which had the lowest viscosity of all the 40% Kraft lignin resins.

TABLE 16

Resins synthesized and their respective viscosity (measured at 100 Hz at room temperature). Also shown is the resins that were low enough viscosity to be made into foams.

| Reactive Diluent | Weight % Kraft lignin | Resin Viscosity (cP) | Foam Synthesized |
|---|---|---|---|
| 1,4-butanediol | 0 | 14 | Yes |
| 1,4-butanediol | 20 | 15 | Yes |
| 1,4-butanediol | 40 | 74 | Yes |
| 1,4-butanediol | 60 | 7820 | No |
| 1,3-propanediol | 40 | 153 | Yes |
| ethylene glycol | 40 | 148 | Yes |
| diethylene glycol | 40 | 277 | Yes |
| glycerol | 40 | 439 | Yes |

2.3 Results 2.3.1 FTIR

FTIR was used to identify the functional groups found in the resin. All of the resins clearly show a strong absorbance at 1740 cm$^1$ and 1700 cm$^1$ which suggest the presence of two unique carbonyl groups (FIGS. 14 A & B). The two carbonyls are indicative of acetoacetate moieties becoming part of the resin. It was expected that the hydroxyl band found at 3500 cm$^1$ would disappear as the tBAA reacted with the hydroxyls of lignin and the respective polyol. Acetoacetate groups, however, will tautomerize which makes it difficult to know if the hydroxyl band is coming from unreacted hydroxyl groups or if it is coming from the tautomerization (Scheme 13)

Scheme 13: Keto-enol tautomerization of acetoacetate groups

Figure 15:
FIG. 15 shows foam samples made from Kraft lignin resins and TAEA (from left to right: 1,4-butanediol 0% Kraft lignin, 1,4-butanediol 20% Kraft lignin, 1,4-butanediol 40% Kraft lignin, ethylene glycol 40% Kraft lignin, 1,3-propanediol 40% Kraft lignin, diethylene glycol 40% Kraft lignin, and glycerol 40% Kraft lignin).

Acetoacetate resins will react very rapidly at room temperature with primary amine functionalized resins. The reaction between the acetoacetate and the amine is extremely exothermic. Because of the exothermic nature of the reaction, it was conceivable that the heat could be used to evaporate a blowing agent, thereby generating a polymeric foam material (FIG. 15). The foams generated used TAEA as the amine functional resin, cyclopentane as the blowing agent, and a water surfactant (AEROSOL OT-75) to help regulate porosity.

2.3.2 Density Measurements

Foams synthesized where shown to all have very similar densities (Table 17). It was expected that the viscosity of the resins would play a major role in the density of the foam formed. This, however, was not the case. No correlation was shown between viscosity of the resin and the density of the foams. The resin with the highest viscosity, glycerol 40% Kraft lignin, had the lowest density. Of the 40% Kraft lignin resins, the resins that had the lowest viscosity, 1,4-butanediol 40% Kraft lignin, had the second lowest density.

TABLE 17

Density measurements for each of the foams made from Kraft lignin resins and TAEA.

| Resin | Weight % Kraft lignin | Height (cm) | Diameter (cm) | Radius (cm) | Volume (cm$^3$) | Weight (g) | Density (g/cm$^3$) |
|---|---|---|---|---|---|---|---|
| 1,4-butanediol | 0 | 3.95 | 2.36 | 1.18 | 17.31 | 7.08 | 0.41 |
| 1,4-butanediol | 20 | 3.93 | 2.39 | 1.20 | 17.69 | 8.26 | 0.47 |
| 1,4-butanediol | 40 | 4.56 | 2.43 | 1.22 | 21.15 | 7.95 | 0.38 |
| 1,3-propanediol | 40 | 4.27 | 2.42 | 1.21 | 19.61 | 9.57 | 0.49 |
| Ethylene glycol | 40 | 4.02 | 2.48 | 1.24 | 19.47 | 8.68 | 0.45 |
| Diethylene glycol | 40 | 3.27 | 2.48 | 1.24 | 15.82 | 7.61 | 0.48 |
| Glycerol | 40 | 2.21 | 2.42 | 1.21 | 10.17 | 3.69 | 0.36 |

2.3.3 Micro CT Measurements

Figure 16A:
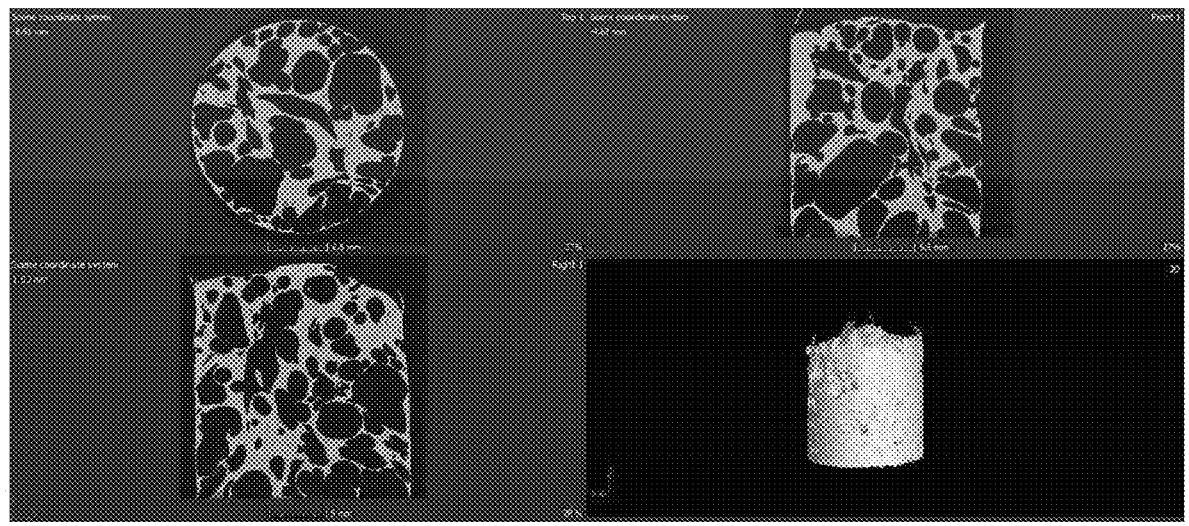
FIG. 16 shows micro CT scans of foam samples made from Kraft lignin resins and TAEA (FIG. 16A) 1,4-butanediol 0% Kraft lignin, FIG. 16B) 1,4-butanediol 20% Kraft lignin, FIG. 16C) 1,4-butanediol 40% Kraft lignin, FIG. 16D) diethylene glycol 40% Kraft lignin, FIG. 16E) ethylene glycol 40% Kraft lignin, FIG. 16F) 1,3-propanediol 40% Kraft lignin, FIG. 16G) glycerol 40% Kraft lignin).
Figure 16B:
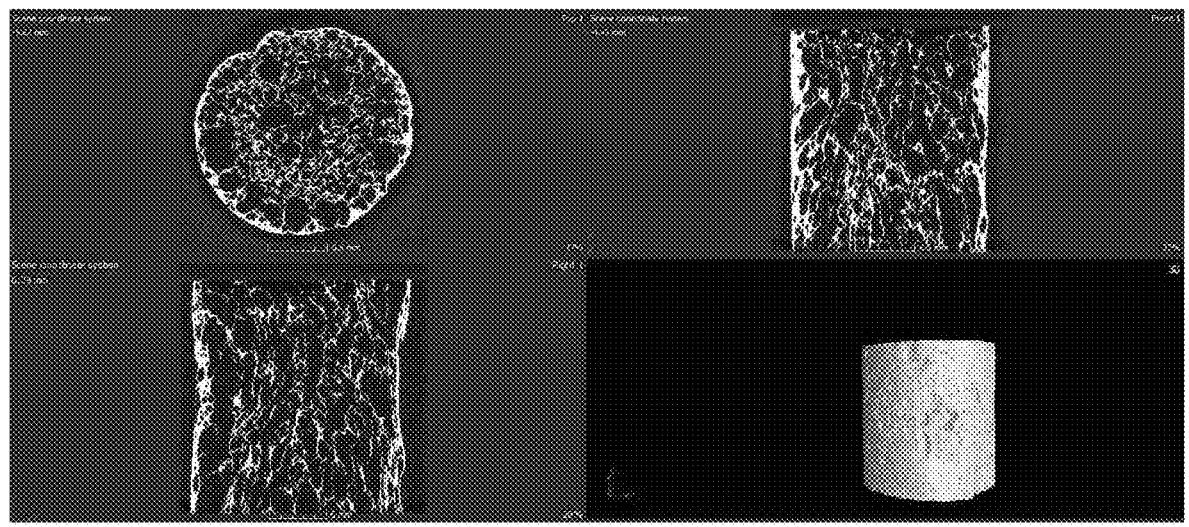

X-ray microtomography (Micro CT) was used to image the foams and calculate porosity. Micro CT imaging was used as a nondestructive way of imaging the internal structure of each foam (FIG. 16). Images from the X, Y, and Z plane clearly show that each foam as a wide distribution of pore sizes. Without any lignin (FIG. 16A) the pores were large and the polymer between pores was thicker than all other samples. When the foams where made with the lignin containing 1,4-butanediol resins (FIGS. 16 B & C) the size of the pores was reduced and the amount of polymer between pores became much thinner. Porosity calculations also show that the 1,4-butanediol resins with lignin also created a much more porous structure in the entire sample (Table 18) and a section that excluded the edges of the cylinder (Table 19).

Figure 1:
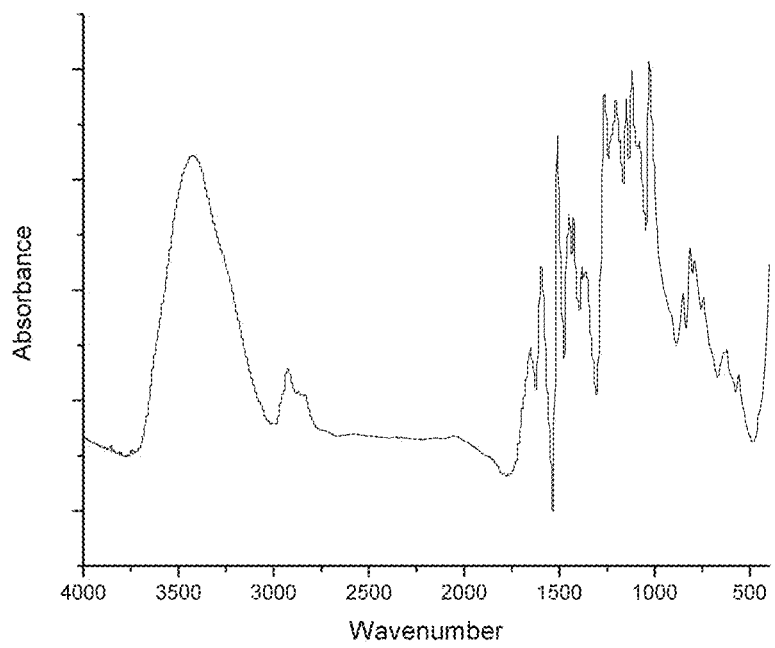
Figure 1:
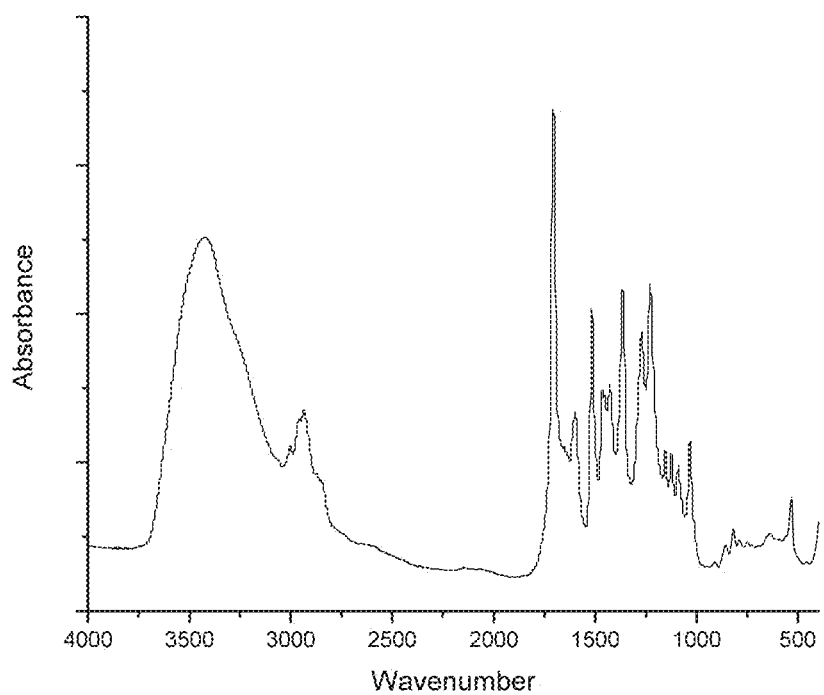
Figure 16C:
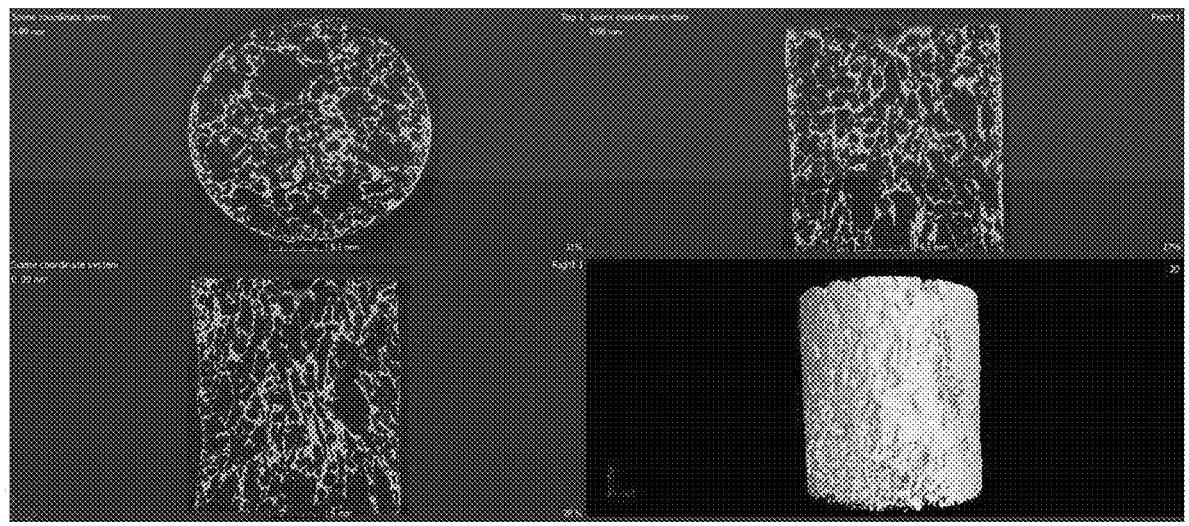
Figure 16D:
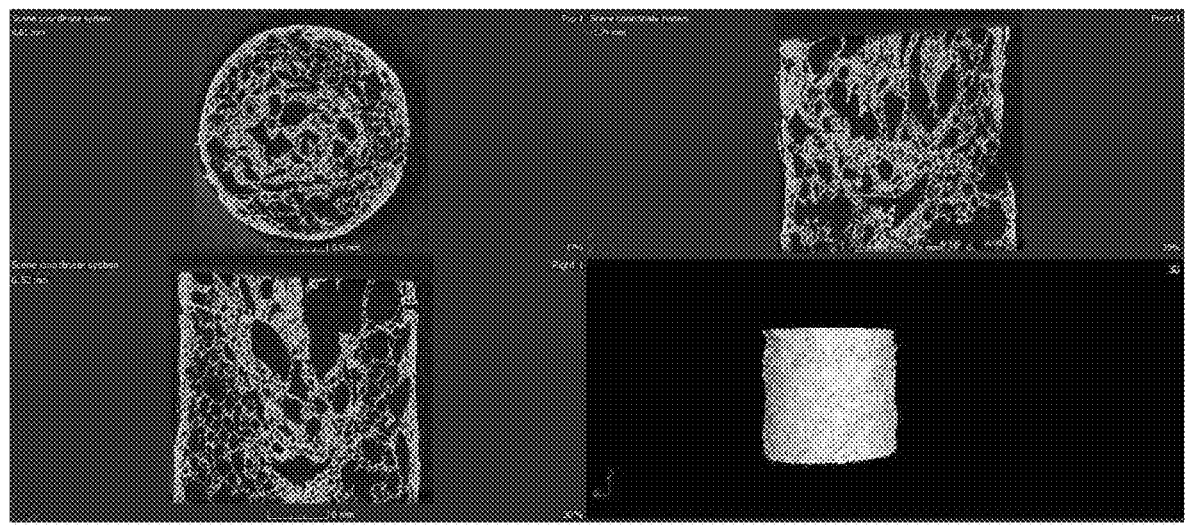
Figure 16E:
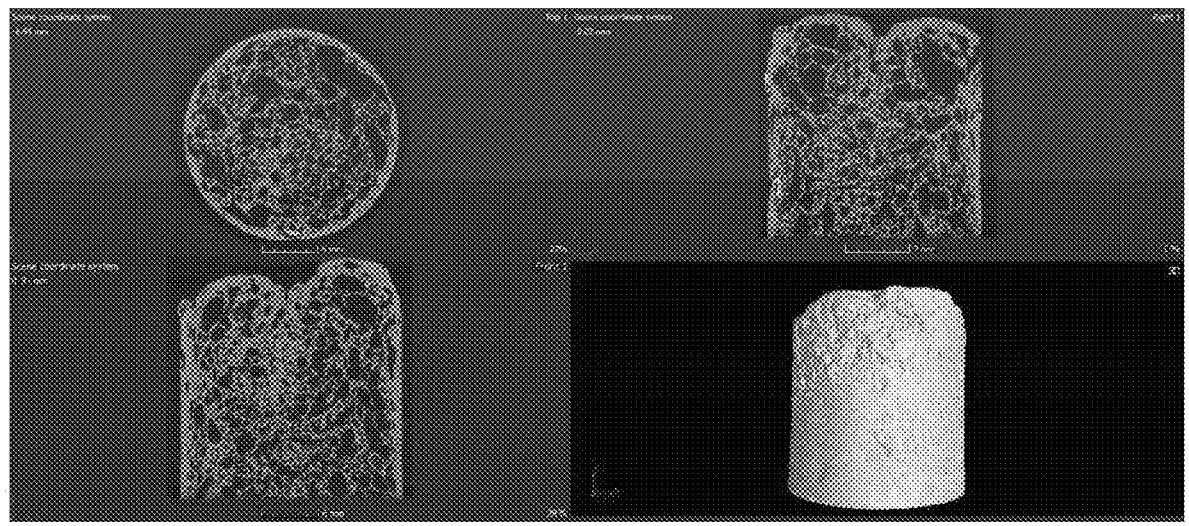
Figure 16F:
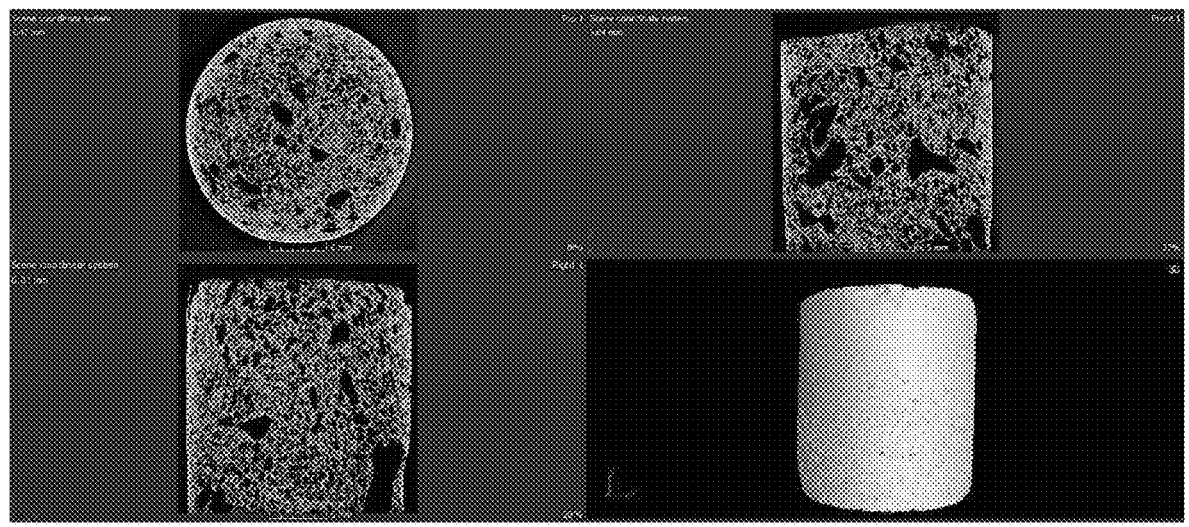
Figures 16, 16G:
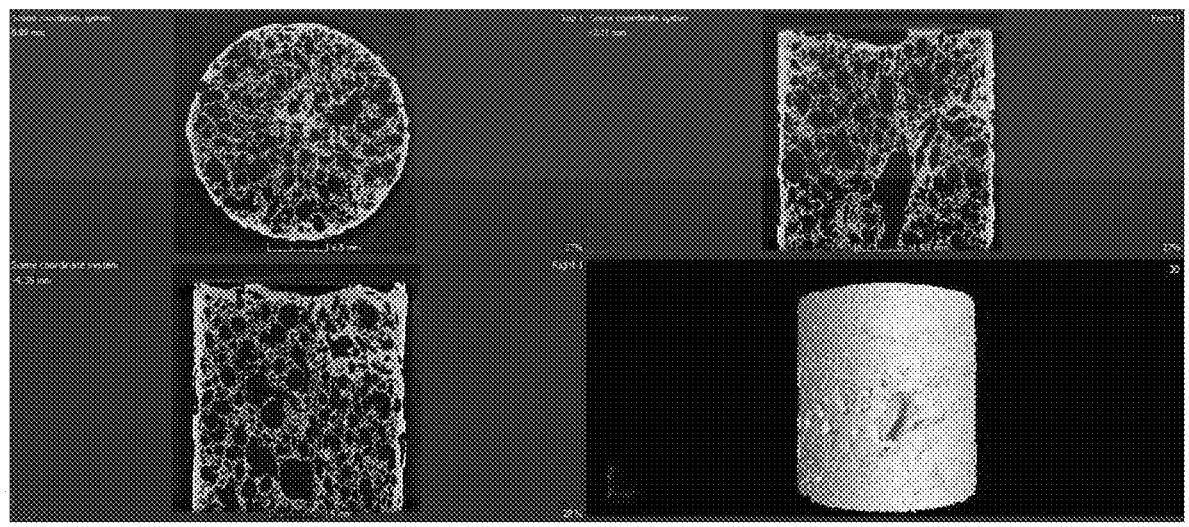

When examining foams made from 40% Kraft lignin resins made with different reactive diluents, the 1,4-butanediol resin showed the most consistent porosity through the bulk of the material (FIG. 16C). FIG. 16D diethylene glycol 40% Kraft lignin, FIG. 16E ethylene glycol 40% Kraft lignin, FIG. 16F 1,3-propanediol 40% Kraft lignin, and FIG. 16G glycerol 40% Kraft lignin all showed small porosity through the bulk with a few large pores in between. All of these samples also showed a greater percentage of material in both the bulk and the entire sample than the corresponding 1,4-butanediol 40% Kraft lignin resin.

TABLE 18

Porosity of the entire foams as calculated by Micro CT imaging.

| Reactive Diluent | Weight % Kraft lignin | Material Volume (cm³) | Air Volume (cm³) | Total Volume (cm³) | Air % | Material % |
|---|---|---|---|---|---|---|
| 1,4-butanediol | 0 | 3270.8 | 5349.3 | 8620.1 | 62.1 | 37.9 |
| 1,4-butanediol | 20 | 2326.2 | 9129.5 | 11455.7 | 79.7 | 20.3 |
| 1,4-butanediol | 40 | 2448.9 | 7729.5 | 10178.4 | 75.9 | 24.1 |
| Diethylene glycol | 40 | 3286.7 | 6674.1 | 9960.8 | 67.0 | 33.0 |
| Ethylene glycol | 40 | 3837.1 | 5611.5 | 9448.5 | 59.4 | 40.6 |
| 1,3-propanediol | 40 | 4657.9 | 5074.0 | 9731.9 | 52.1 | 47.9 |
| Glycerol | 40 | 3730.9 | 7027.3 | 10758.1 | 65.3 | 34.7 |

TABLE 19

Porosity of the bulk of the foams, excluding the outer edges.

| Reactive Diluent | Weight % Kraft lignin | Material Volume (cm³) | Air Volume (cm³) | Total Volume (cm³) | Air % | Material % |
|---|---|---|---|---|---|---|
| 1,4-butanediol | 0 | 2041.3 | 3679.6 | 5720.9 | 64.3 | 35.7 |
| 1,4-butanediol | 20 | 789.4 | 4931.2 | 5720.6 | 86.2 | 13.8 |
| 1,4-butanediol | 40 | 1255.0 | 4465.6 | 5720.6 | 78.2 | 21.9 |
| Diethylene glycol | 40 | 1777.1 | 3942.7 | 5719.8 | 68.9 | 31.1 |
| Ethylene glycol | 40 | 1953.9 | 3766.7 | 5720.6 | 65.8 | 34.2 |
| 1,3-propanediol | 40 | 2528.8 | 3195.6 | 5734.3 | 55.9 | 44.1 |
| Glycerol | 40 | 1539.3 | 4181.3 | 5720.6 | 73.2 | 26.9 |

2.3.4 SEM

Figure 17A:
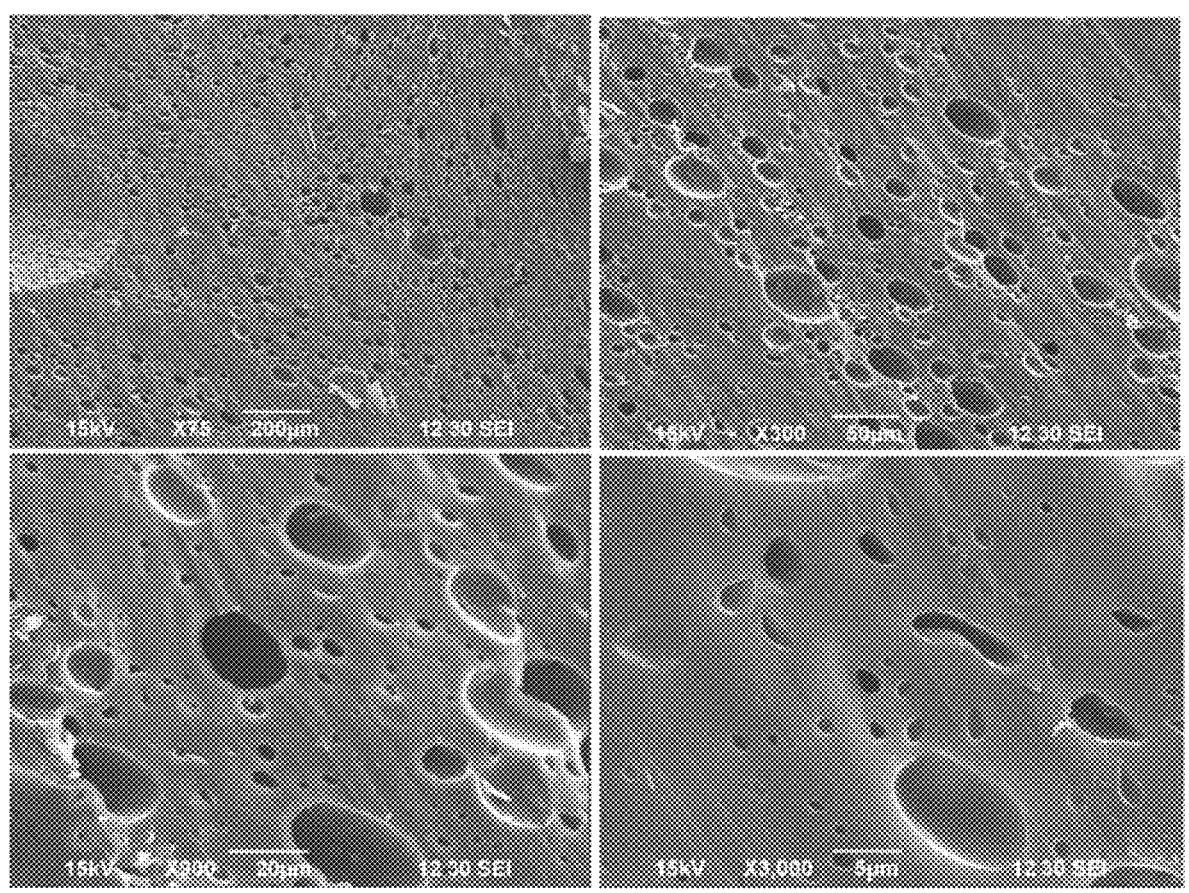
FIG. 17 shows the SEM scans of foam samples made from Kraft lignin resins and TAEA (FIG. 17A) 1,4-butanediol 0% Kraft lignin, FIG. 17B) 1,4-butanediol 20% Kraft lignin, FIG. 17C) 1,4-butanediol 40% Kraft lignin, FIG. 17D) diethylene glycol 40% Kraft lignin, FIG. 17E) ethylene glycol 40% Kraft lignin, FIG. 17F) 1,3-propanediol 40% Kraft lignin, FIG. 17G) glycerol 40% Kraft lignin).
Figure 17B:
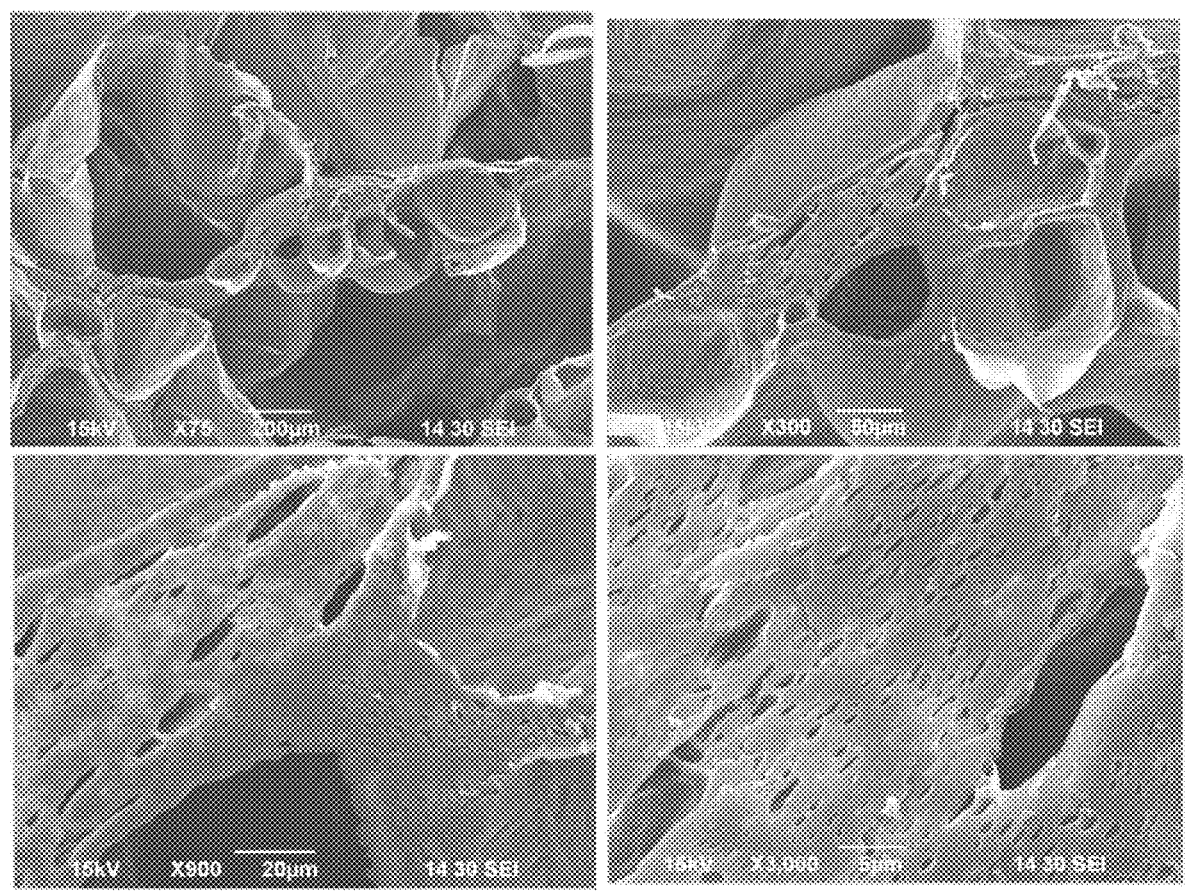
Figure 17C:
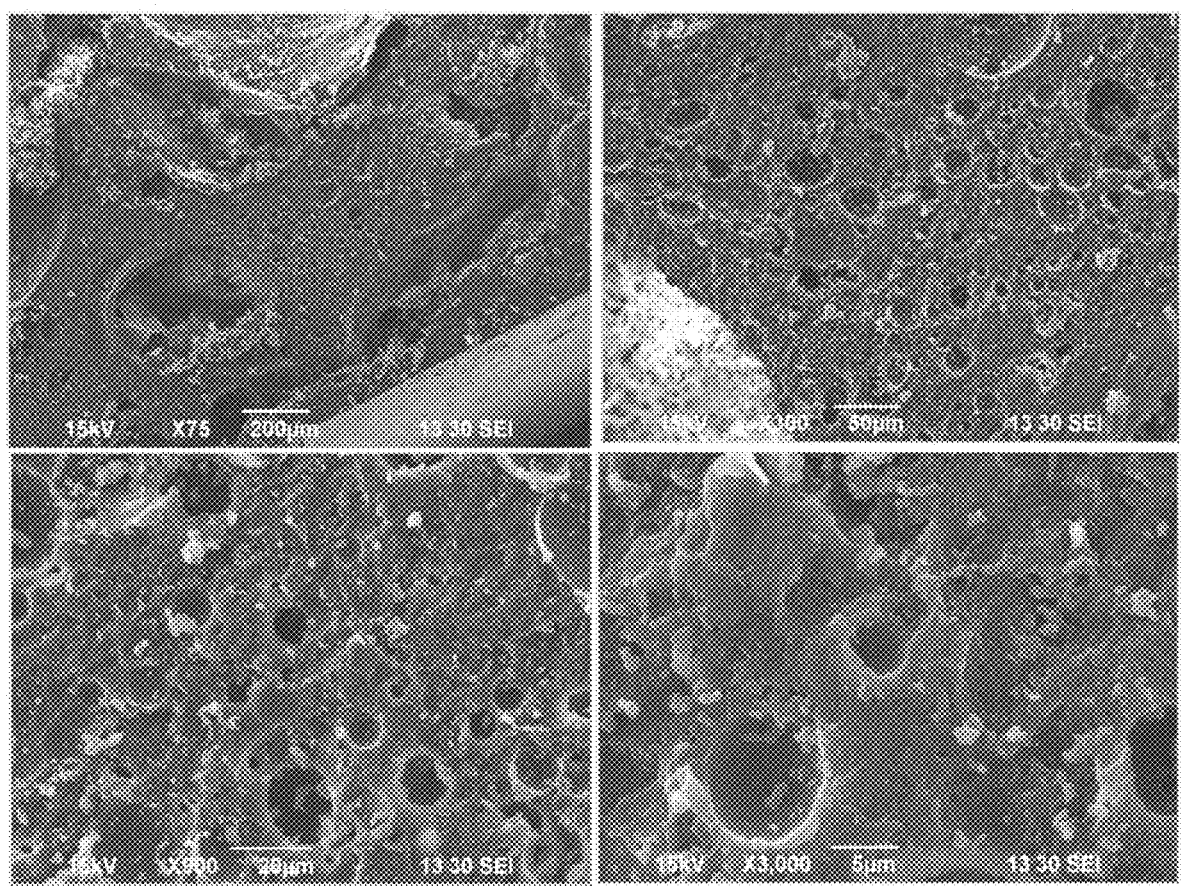
Figure 17D:
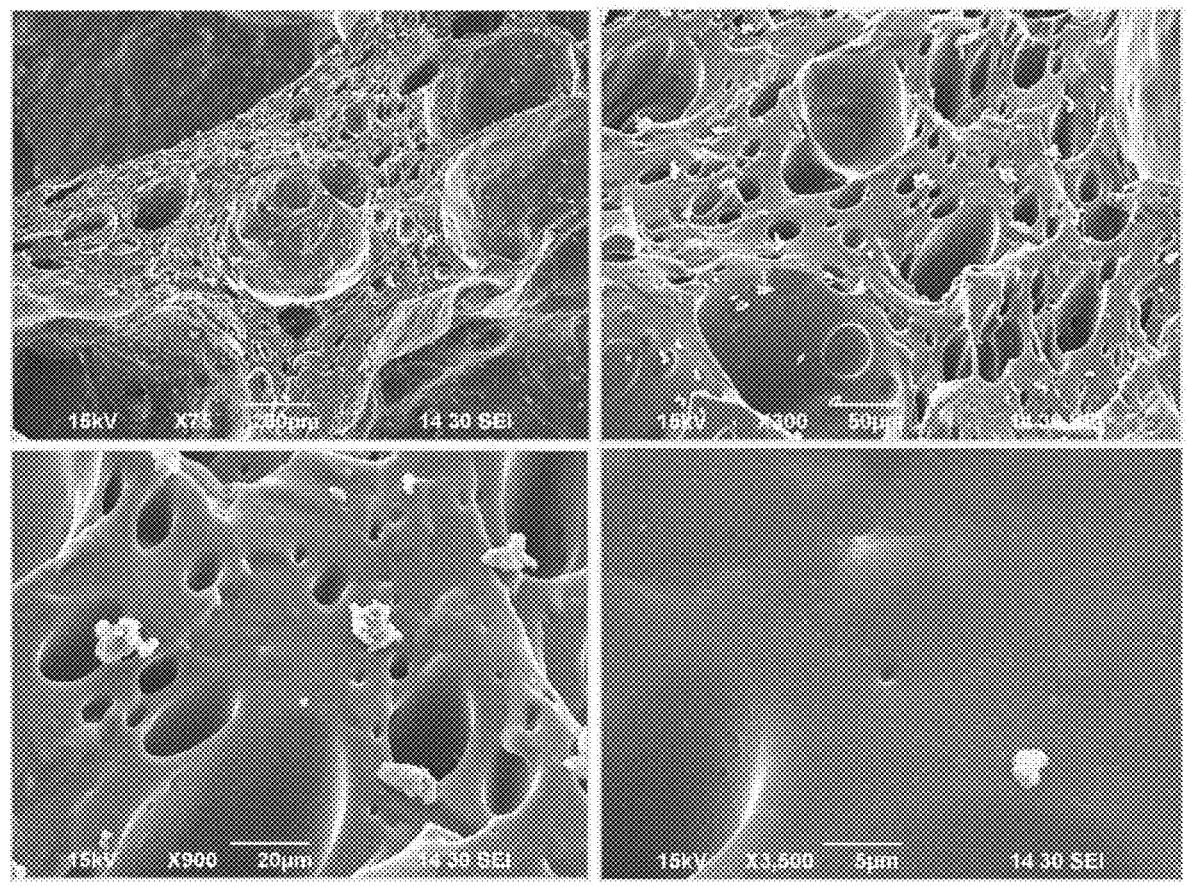
Figure 17E:
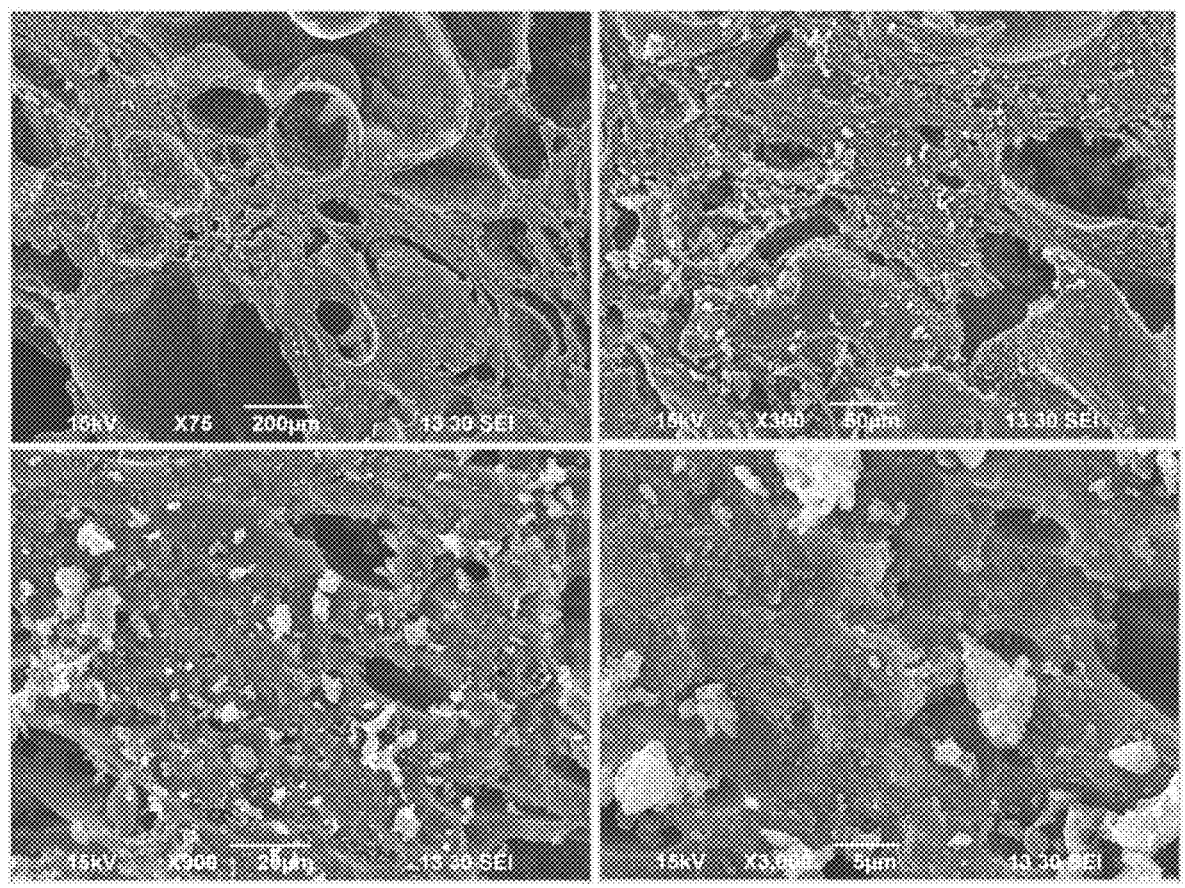
Figure 17F:
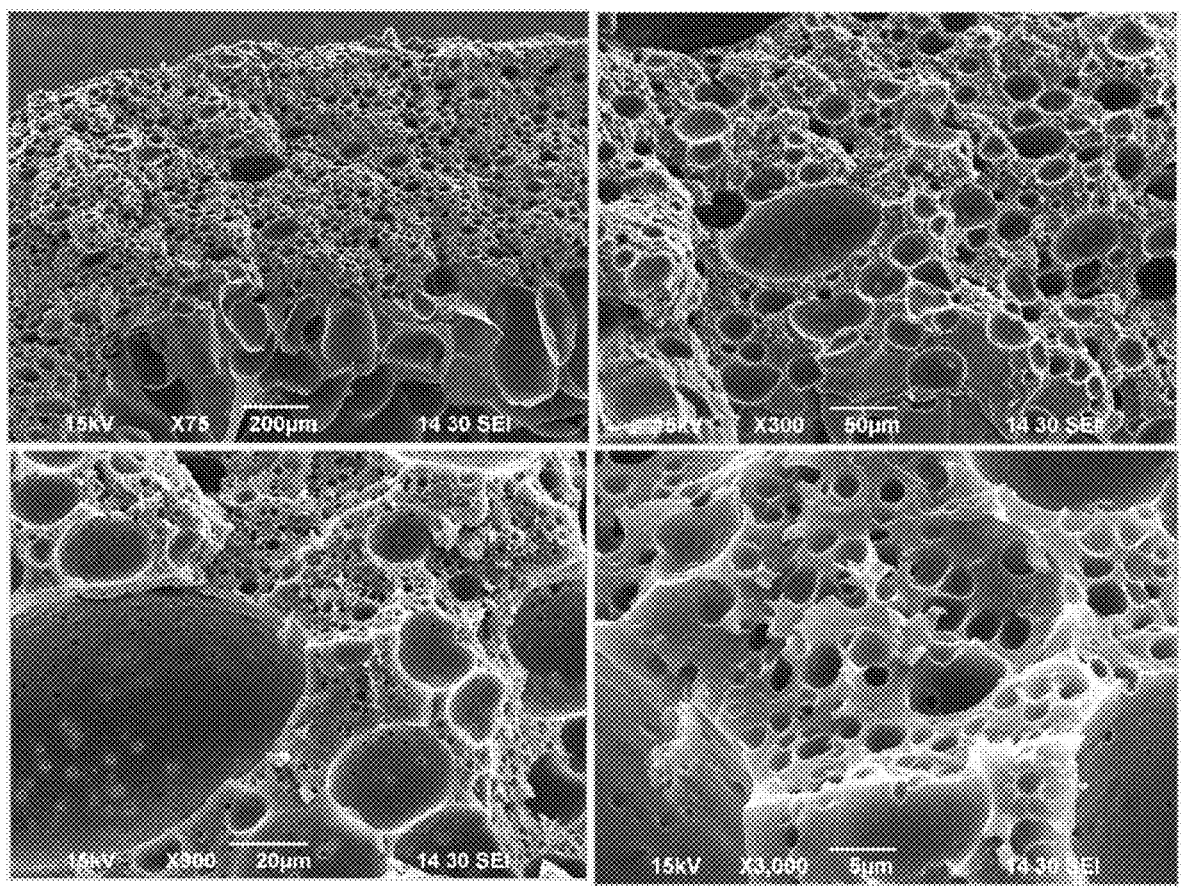
Figures 17, 17G:
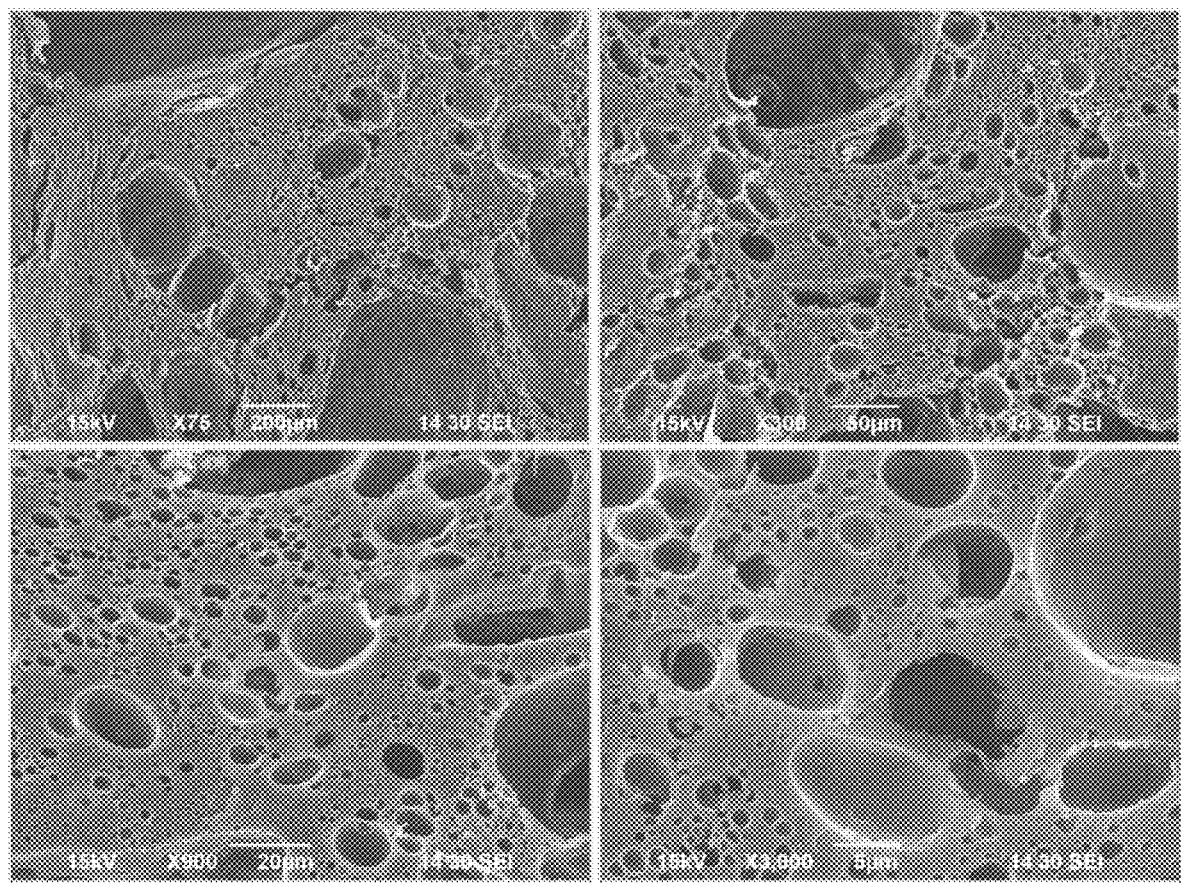

Scanning Electron Microscopy (SEM) was also used to understand the porosity at the micro scale for each of the materials. SEM images clearly show that even the material between the macro scale pores of each sample, had micro scale porosity on their own (FIG. 17). Much like the pores imaged using Micro-CT, the porosity shown using SEM also showed a distribution in pore sizes. Each sample had pores that were smaller than 5 µm as well as ones that were 50 µm or larger. The wide range in pore size suggests that the surfactant used was not doing an effective job of stabilizing gas bubbles as the polymerization occurred.

2.3.5 Compression Testing

Figure 18:
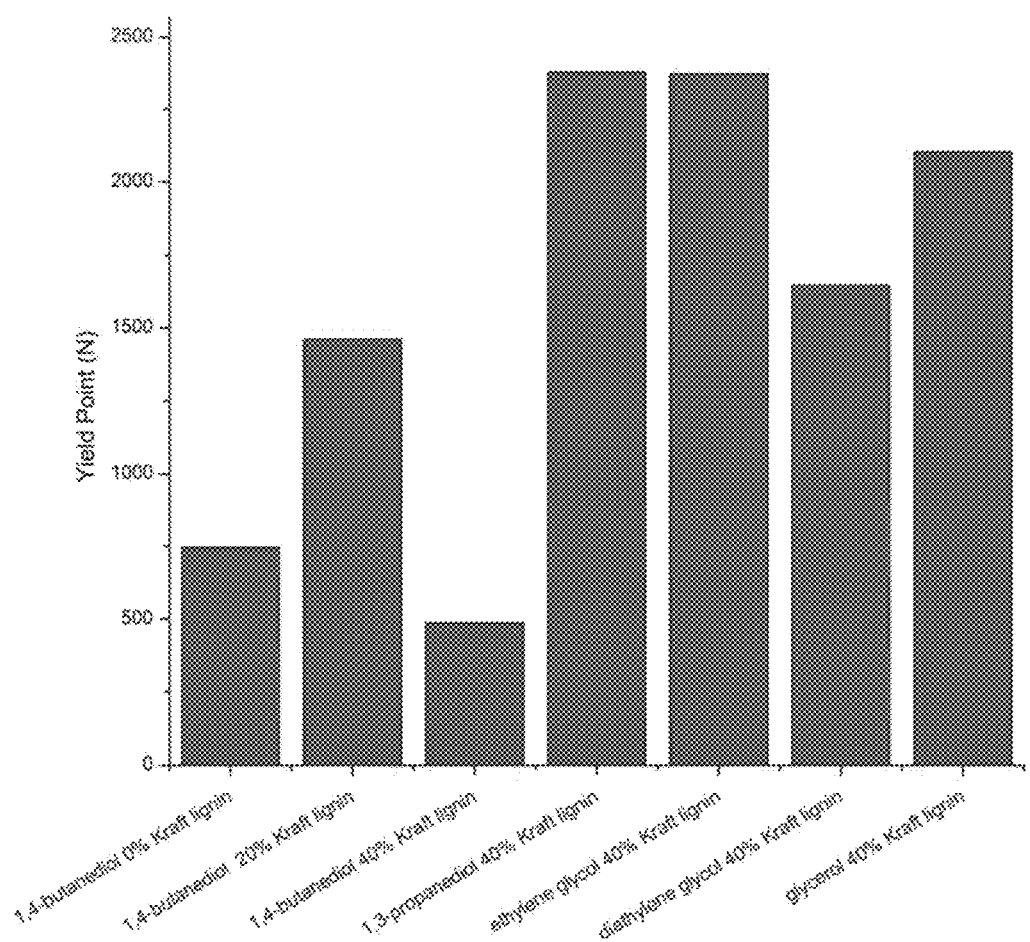
FIG. 18 shows the compression tests showing the yield force (N) for foams made from Kraft lignin resins and TAEA.

While the porosity may have been inconsistent across the macro and micro scales, there was some correlation with the compressive strength of the materials. The foams made from 40% Kraft lignin resins with different reactive diluents had increased compressive strength with a decrease in the percentage of air in the samples. The less porous foams, ethylene glycol and 1,3-propanediol, were the strongest. Glycerol-based foams had more porosity than diethylene glycol-based foams. However, glycerol also had more functionality than diethylene glycol which could account for the increase in yield force (FIG. 18).

The compressive strength of the 1,4-butanediol foams showed that increasing the amount of lignin to 20% by weight was beneficial. However, the addition of more lignin (40%) showed a reduction in the yield force of the foams. The strongest foam made from the 1,4-butanediol 20% Kraft lignin resin also showed the highest amount of porosity calculated from Micro-CT scans. Conversely, the density (Table 17) showed that the 1,4-butanediol 20% Kraft lignin foam yielded the highest density followed by 1,4-butanediol 0% Kraft lignin and 1,4-butanediol 40% Kraft lignin, respectively. The compressive strength of the foams was dependent on the porosity, density, amount of lignin, and the reactive diluent. Better control over the porosity of the foam helped to better elucidate the effects that Kraft lignin and the reactive diluents have on these foams.

2.3.6 Thermal Stability

Figure 19:
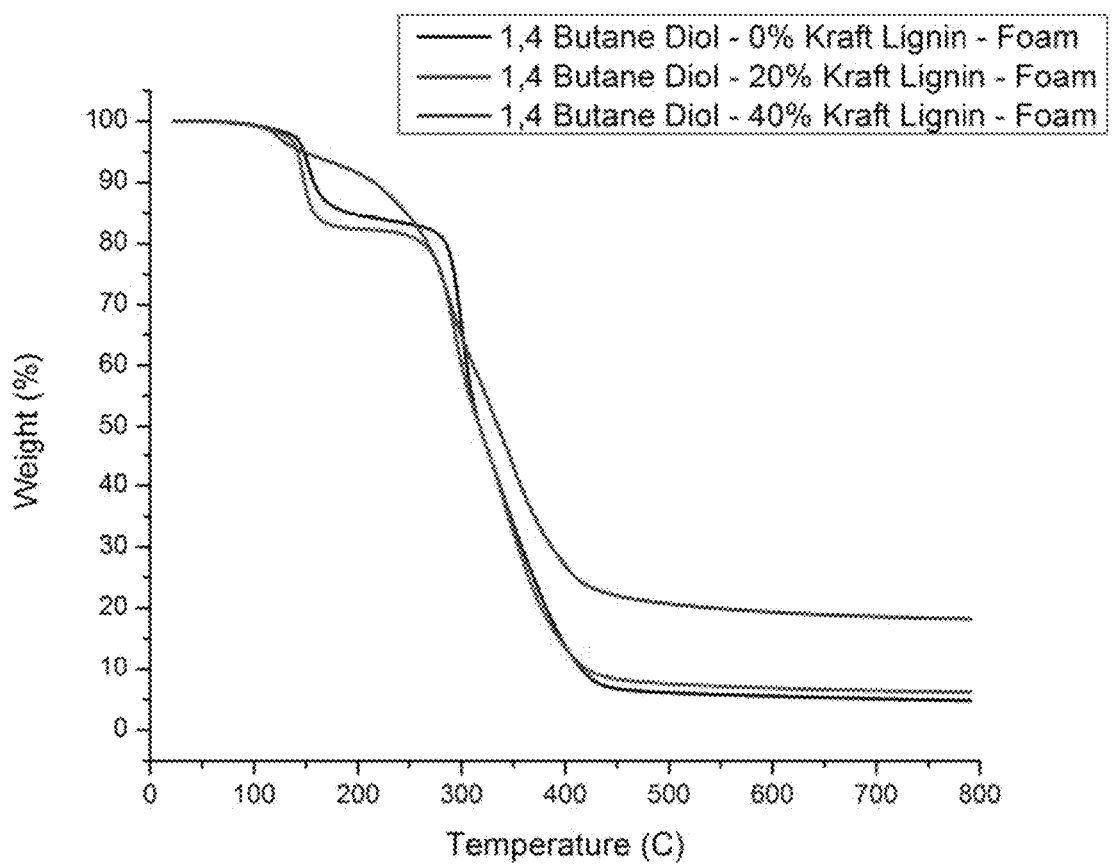
FIG. 19 shows the TGA curves in nitrogen atmosphere for foams made from 1,4-butanediol resins and TAEA.
Figure 20:
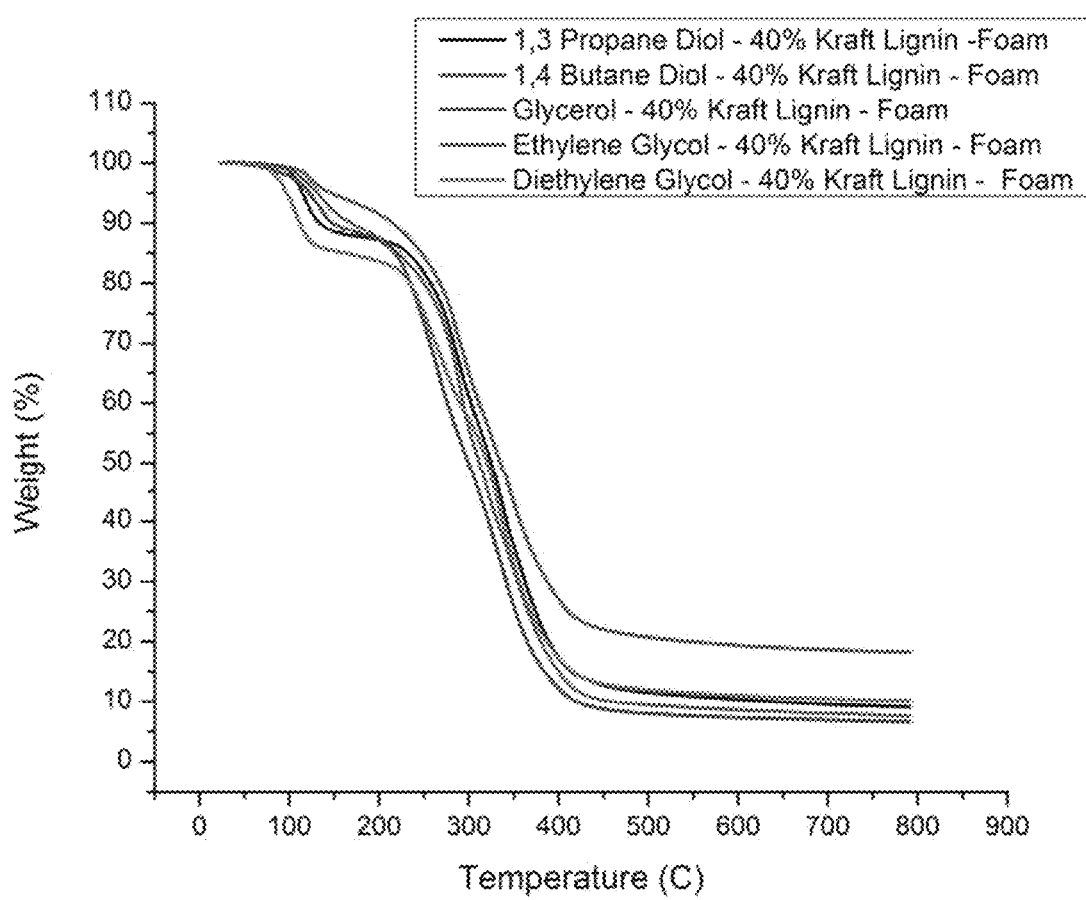
FIG. 20 shows the TGA curves in nitrogen atmosphere for foams made from 40% Kraft lignin resins made with different reactive diluents and TAEA.

The thermal stability of a rigid foam is important when it comes to the potential applications of the material. When the thermal stability of the synthesized foams was tested in a nitrogen atmosphere, that materials showed an immediate drop near 100° C. (FIG. 19, 20). This is likely due to the uptake of water by the foams. The amount of water that was absorbed by each foam greatly changed the temperature at 5% weight loss (Table 20). All the foams showed a similar drop near 100° C., but it was less pronounced in the 1,4-butanediol and glycerol resins with 40% Kraft lignin (FIG. 20). All the resins began to degrade rapidly between 250° and 300° C. As the amount of lignin in the foam increased the temperature at which the foams began to degrade rapidly was decreased (FIG. 19).

TABLE 20

TGA results for foams when experiments were run in nitrogen atmosphere and in air.

| Resin | Weight % Kraft Lignin | Temp at 5% weight loss (Air) (° C.) | Temp at 5% weight loss (N₂) (° C.) |
|---|---|---|---|
| 1,4-butanediol | 0 | 145.96 | 148.32 |
| 1,4-butanediol | 20 | 132.99 | 142.53 |
| 1,4-butanediol | 40 | 205.52 | 147.44 |
| 1,3-propanediol | 40 | 117.0 | 114.55 |
| Ethylene glycol | 40 | 114.5 | 132.12 |

TABLE 20-continued

TGA results for foams when experiments were run in nitrogen atmosphere and in air.

| Resin | Weight % Kraft Lignin | Temp at 5% weight loss (Air) (° C.) | Temp at 5% weight loss ($N_2$) (° C.) |
|---|---|---|---|
| Diethylene glycol | 40 | 96.89 | 97.13 |
| Glycerol | 40 | 194.37 | 122.49 |

Figure 21:
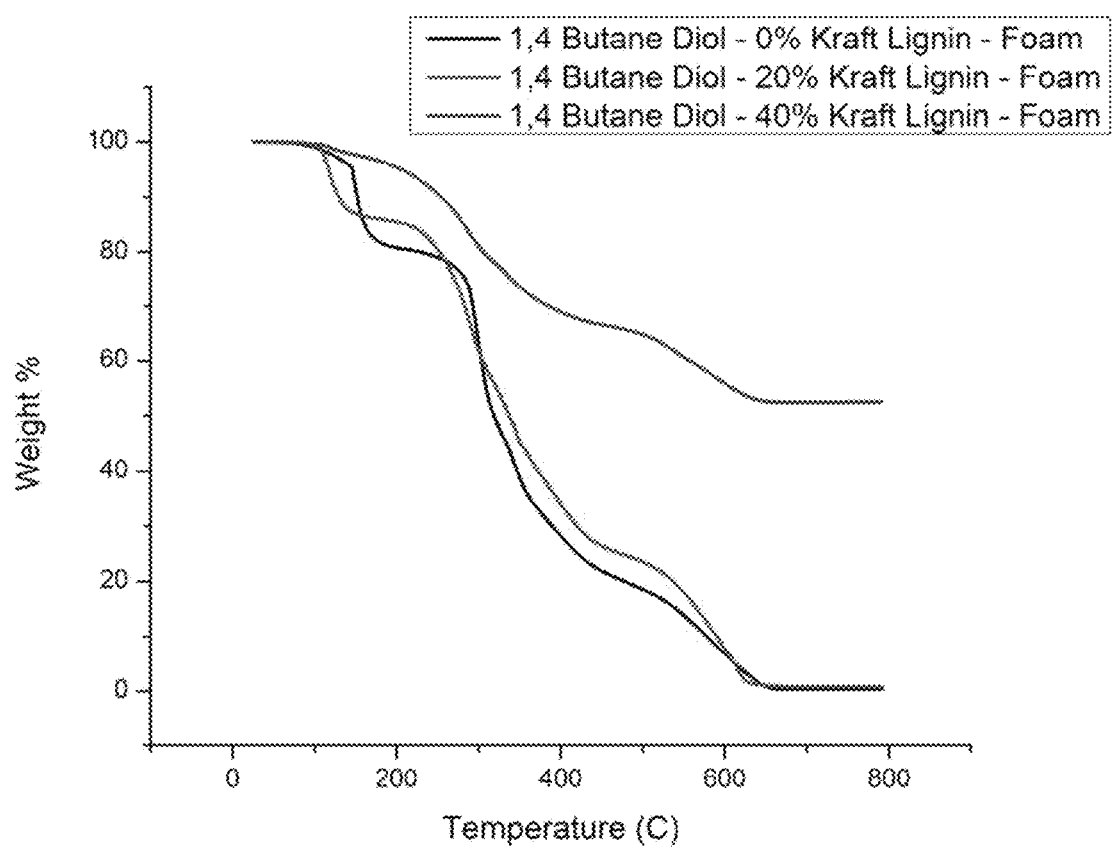
FIG. 21 shows the TGA curves in air of foams made from 1,4-butanediol Kraft lignin resins with TAEA.
Figure 22:
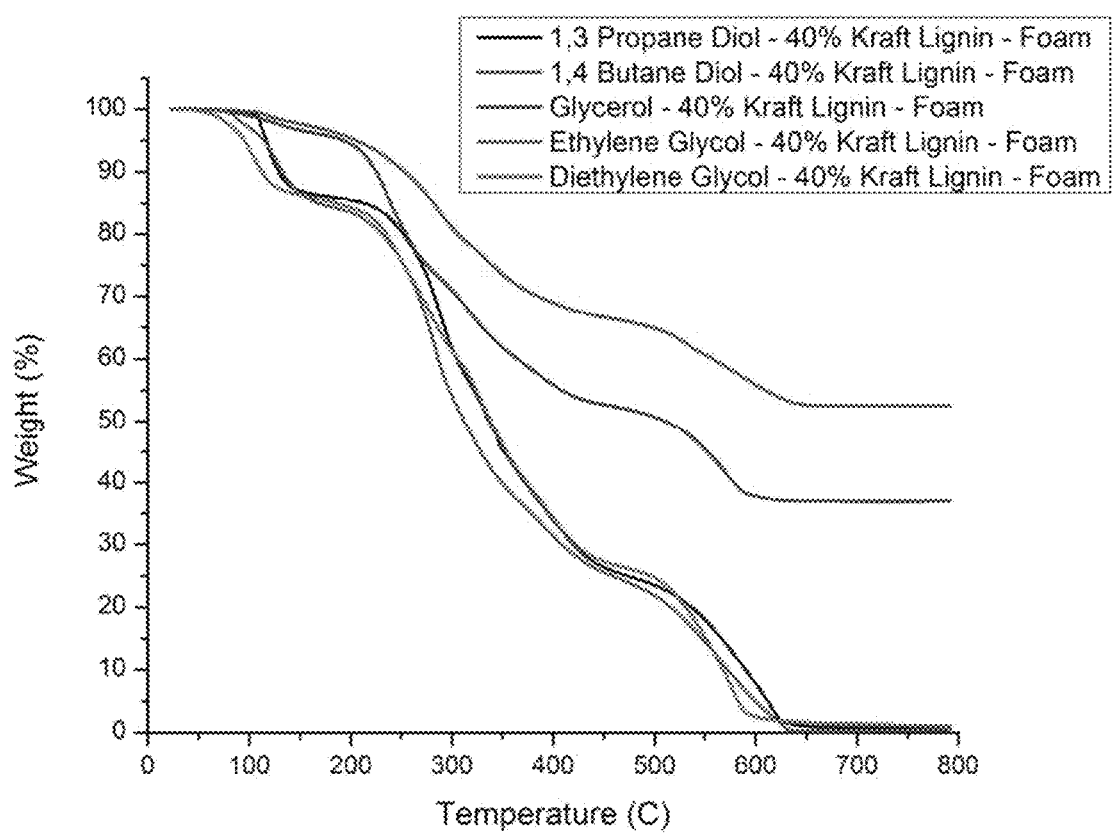
FIG. 22 shows the TGA curves in air of foams made from Kraft lignin resins made with different reactive diluents with TAEA.

Air was also used when performing TGA to see what effect oxidation had on the thermal degradation of the foams. The 1,4-butanediol resins with increasing amounts of Kraft lignin showed that lignin greatly affected both the shape of the curve as well as the amount of residual char (FIG. 21). Running the experiments in air increased the time and temperature required to decompose the foams suggesting that oxidation reactions are persistent and improve the thermal stability of the foams. The temperature at 5% weight loss was improved for all 1,4-butanediol foams except the 40% Kraft lignin foam which saw a decrease in the temperature at 5% weight loss. Foams made with a constant amount of lignin showed a similar increase in the area under the TGA curve (FIG. 22). The temperature at 5% weight loss was varied based on which resin was in question. Ethylene glycol showed a slight improvement of approximately 15° C. while glycerol saw a sharp decrease from 194° C. to 122° C. Additionally, the amount of char remaining at the end of the experiment was much greater in the 1,4-butanediol and glycerol foams, then any other foam. Both foams had very similar porosity calculated by Micro-CT (Tables 18 and 19). The additional air % of these materials meant that the foams had greater surface area in contact with air, providing greater material/air interface to undergo oxidation reactions. Increasing the surface area of the materials may be beneficial for char formation in TGA experiments.

2.3.7 Fire Retardancy

Foams were also investigated for their flammability by running UL-94 flammability tests. All foams burned for more than 30 seconds after 10 seconds of exposure to the open propane flame which constituted a failure under the UL-94 test parameters. However, lignin foams did burn differently than foams made without lignin. Observationally, lignin appeared to reduce the intensity of the flames and showed signs of bubbling upon burning. This is likely from lignin's ability to repolymerize and form char. Brodin et al., The behavior of kraft lignin during thermal treatment. *Journal of Analytical and Applied Pyrolysis* 2010, 87(1), 70-77. Because the flammability tests were also run in a hood (for safety measures), the inflow of air through the hood may have increased oxygen to the flame and skewed the burning test.

3 Polyenamine Foams Derived from Acetoacetylated Kraft Lignin Resins and Siloxane-Based Blowing Agents 3.1 Materials Indulin Kraft lignin was received from Ingevity (formerly MeadWestvaco). Tert-butyl acetoacetate was provided by Eastman Chemical Company. Ethylene glycol, 1,4-butanediol, 1,3-propanediol, and diethylene glycol were purchased from Sigma Aldrich. Glycerol was purchased from Acros Organic. Tris (2-aminoethyl) amine (TAEA) was purchased from Alfa Aesar. Polymethylhydrosiloxane (HMS-991, HMS-992, HMS-993) and 1,3,5,7-Tetramethylcyclotetrasiloxane (D'4) were purchased from Gelest Inc. All reagents were used as received.

3.2 Methods 3.2.1 Resin Synthesis

Indulin kraft lignin, tert-butyl acetoacetate, and diluents were added in amounts given in Table 21 below to make acetoacetylated kraft lignin.

TABLE 21

Raw Materials Used for Each Resin

| Resin | Kraft Lignin | Diluent | Tert-butyl Acetoacetate | Abbreviation |
|---|---|---|---|---|
| 0% Kraft lignin in 1,4-butanediol | 0 g | 40.00 g | 140.43 g | 0% KL BD |
| 20% Kraft lignin in 1,4-butanediol | 6.25 g | 25.00 g | 93.95 g | 20% KL BD |
| 40% Kraft lignin in 1,4-butanediol | 16.66 g | 25.00 g | 87.77 g | 40% KL BD |
| 60% Kraft lignin in 1,4-butanediol | 25.00 g | 16.66 g | 83.22 g | 60% KL BD |
| 40% Kraft lignin in 1,3-propanediol | 16.66 g | 25.00 g | 120.39 g | 40% KL PD |

The raw materials were charged to a 4-necked round-bottom flask. The center neck was used for the mechanical stir rod and was sealed off with an adapter. The other 3 outside necks were used for a nitrogen inlet, a temperature probe, and a condensation adapter that was fitted with a drip tip. The nitrogen needle was placed in the mixture while it was stirring and bubbled at 1 bubble per second. The temperature probe was also placed in the mixture to regulate temperature. The drip tip had a vacuum adapter to allow the air to escape to prevent pressure from building inside the flask. The drip tip was inserted into a flask in an ice bath to collect the byproduct, tert-butyl alcohol. The mixture was then heated to 130° C. for 24 hours.

The resin was then cooled to room temperature. The resins and byproducts were analyzed gravimetrically and by Fourier Transform Infrared Spectroscopy (FT-IR). The resins were used to create foams. Table 22 shows a sample of the formulations.

TABLE 22

Formulations for Enamine Foams Using HMS-991

| Resin | Resin Amount | HMS-991 | Tris (2-amino) ethylamine | Acetone |
|---|---|---|---|---|
| 0% KL BD | 5.00 g | 0.246 g | 1.88 g | — |
| 20% KL BD | 5.00 g | 0.243 g | 1.86 g | — |
| 40% KL BD | 5.00 g | 0.238 g | 1.67 g | — |
| 60% KL BD | 5.00 g | 0.218 g | 1.67 g | 0.50 g |
| 40% KL PD | 5.00 g | 0.237 g | 1.82 g | — |
| 40% KL EG | 5.00 g | 0.246 g | 1.88 g | — |
| 40% KL DEG | 5.00 g | 0.220 g | 1.68 g | — |
| 40% KL GLY | 5.00 g | 0.295 | 2.26 g | 0.50 g |

The foams were made by putting in all the reagents except for TAEA into a vial with a cap that contains a rubber septum. The reagents were then mixed until the solution was homogenous. The TAEA was then added to the vial quickly and the vial was capped. The reagents were mixed on a vortex mixer for 5 seconds and a hypodermic needle was inserted into the septum. The reagents were then mixed until the foam stopped rising, about 20 seconds. The foams were cured for a week in open air after the TAEA was added. They were then inserted into an 80° C. oven for an hour to evaporate or dry any unreacted material. The glass of the vials was broken in a controlled manner to extract the foams.

3.2.2 Foam Density

The foams were then tested in several ways to determine their mechanical and thermal properties. The foams were first tested for density. The density was tested according to ASTM D792.

3.2.3 Thermal Stability

TGA was run to determine thermal properties. The tests were run at a 10° C./min ramp running between the temperatures of 20° C. to 500° C. The probe was given 10 minutes to cool down after each test.

3.2.4 Heat Capacity

DSC measurements were taken to determine heat capacity. The test was a heat cool heat cycle. The last heat cycle was the measurements used to determine the heat capacity. The temperature was set to heat and cool at 5° C. per minute. Between each sample was a 20-minute cooling period to allow the DSC to return to room temperature. The gas used in the heating was nitrogen which flowed at 50 mL/minute.

3.2.5 SEM and microCT

SEM and microCT were both run at the NDSU Microscopy Lab. The sample was scanned in a GE Phoenix v|tome|xs X-ray computed tomography system (microCT) equipped with a 180 kV nanofocus X-ray tube and a high-contrast GE DXR250RT flat panel detector (GE Sensing & Inspection Technologies GmbH, Niels Bohr Str 7, 31515 Wunstorf, Germany). At a voltage of 80 kV and a current of 100 μA with a molybdenum target. Detector timing was 333 msec. The acquired images were reconstructed into a volume data set using GE datos|x3D computer tomography software version 2.2 (GE Sensing & Inspection Technologies GmbH, Niels Bohr Str 7, 31515 Wunstorf, Germany). The reconstructed volume was then viewed and porosity analysis was performed using VGStudio Max version 3.3 (Volume Graphics, Inc., 3219 Arbor Pointe Drive, Charlotte, NC 28210). For SEM, each foam sample was fractured manually. Fragments were attached to cylindrical aluminum mounts with colloidal-silver paste (Structure Probe Inc., West Chester PA, USA) oriented to view the fractured or exterior surface and then coated with a conductive layer of gold using a Cressington 108 auto sputter coater (Ted Pella Inc., Redding CA, USA). Images were obtained at an accelerating voltage of 15 kV using a JEOL JSM-6490LV scanning electron microscope (JEOL USA, Peabody MA, USA).

3.2.6 Young's Modulus

The Young's Modulus of the materials were tested using ASTM method D1621. This test was repeated three times to ensure repeatability.

3.2.7 Flame Retardancy

The flame retardancy of each foam was tested according to UL-94V standardization. Calvert et al., Characterization of commercial rigid polyurethane foams used as bone analogs for implant testing. *Journal of Materials Science: Materials in Medicine* 2010, 21 (5), 1453-1461. The gas used for burning the samples was butane.

3.3 Results 3.3.1 Density Measurements

The densities of the foams are provided in Table 23. The foams followed a trend of decreasing in density as the foaming agents increase in molecular weight. There are a few exceptions as in the 40% KL PD foams. The foams increased in density with increasing molecular weight. General Plastics, a company who makes structural foams, produces foams with similar densities. Mazzon et al., Biobased structural epoxy foams derived from plant-oil: Formulation, manufacturing and characterization. *Industrial Crops and Products* 2020, 144, 111994. Table 24 shows the numbers for these foams. The commercial foams have similar densities to the polyenamine foams of the invention. They range from 0.048 g/cm$^3$ to 0.641 g/cm$^3$. Mills, *Polymer Foams Handbook: Engineering And Biomechanics Applications And Design Guide*. Elsevier: 2007. This means that comparing other foam properties is relevant because these are similar in density to the commercial foams listed. If the foams were much denser, it would be a hard comparison because one is a more cellular material while the other is more solid.

TABLE 23

Densities of Enamine Foams in (g/cm$^3$)

| Resin | HMS-991 | HMS-992 | HMS-993 | HMS-D'4 |
|---|---|---|---|---|
| 0% KL BD | 0.219 | 0.236 | 0.200 | 0.163 |
| 20% KL BD | 0.165 | 0.171 | 0.160 | 0.126 |
| 40% KL BD | 0.215 | 0.186 | 0.176 | 0.151 |
| 60% KL BD | 0.223 | 0.240 | 0.219 | 0.135 |
| 40% KL PD | 0.240 | 0.245 | 0.294 | 0.140 |
| 40% KL EG | 0.247 | 0.242 | 0.235 | 0.0973 |
| 40% KL DEG | 0.233 | 0.221 | 0.219 | 0.158 |
| 40% KL GLY | 0.204 | 0.201 | 0.190 | 0.145 |

The molecular weight of the blowing agent increased as you move left on Table 23 with the exception of D'4 which is a cyclic hydrosiloxane. This indicates that the molecular weight of the blowing agent is inversely proportional to the density of the foam. With a change from linear to cyclic blowing agent, the density drastically changes. The cyclic blowing agent was more volatile during the foaming process. This led to the sharp decrease in density visible in Table 23.

TABLE 24

Commercial Foams Properties

| Property | FR-7104 | FR-7106 | FR-7108 | FR-7110 | FR-7115 | FR-7118 | FR-7120 |
|---|---|---|---|---|---|---|---|
| Density (g/cm$^3$) | 0.048 | 0.064 | 0.080 | 0.096 | 0.128 | 0.160 | 0.192 |
| Compressive Strength (kPa) | 310 | 480 | 760 | 1050 | 1500 | 2050 | 2550 |

3.3.2 microCT Measurements

Figure 23:
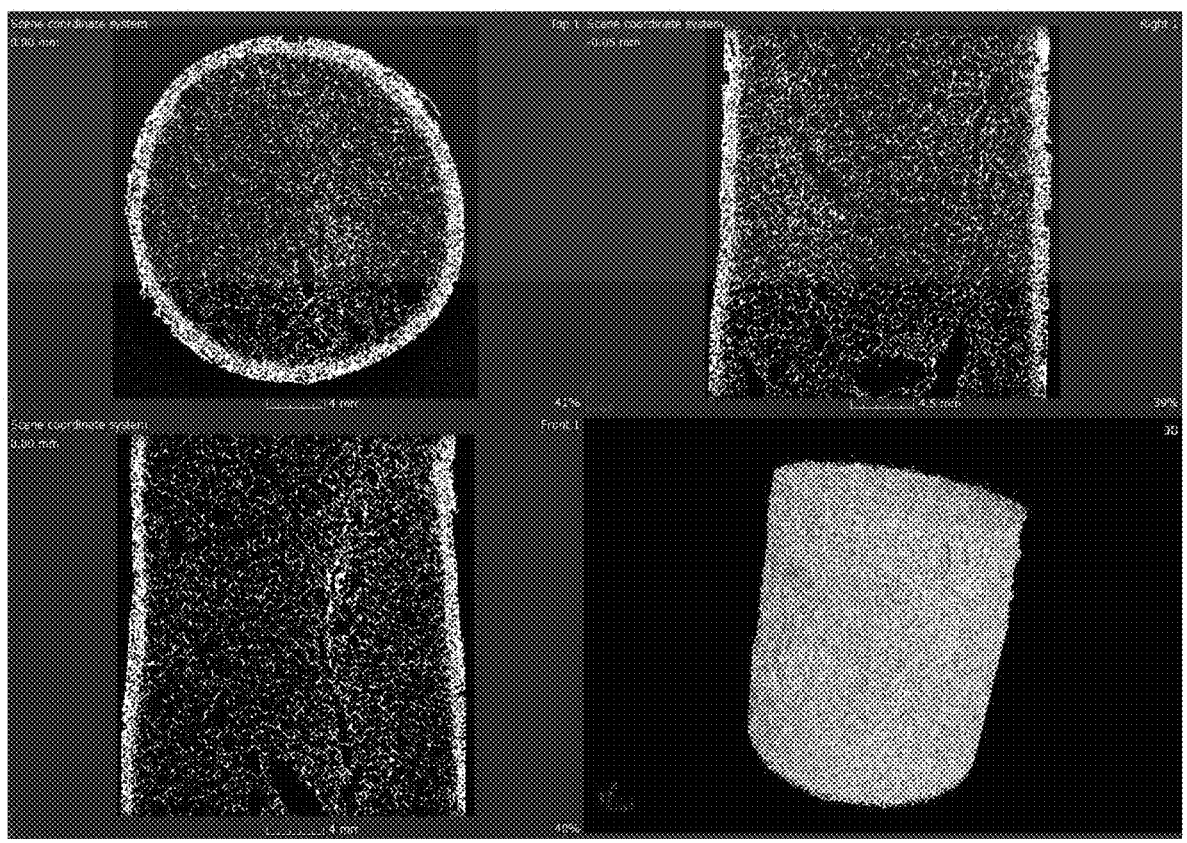
FIG. 23 shows the microCT of 40% Kraft lignin in 1,4-butanediol foam.
Figure 24A:
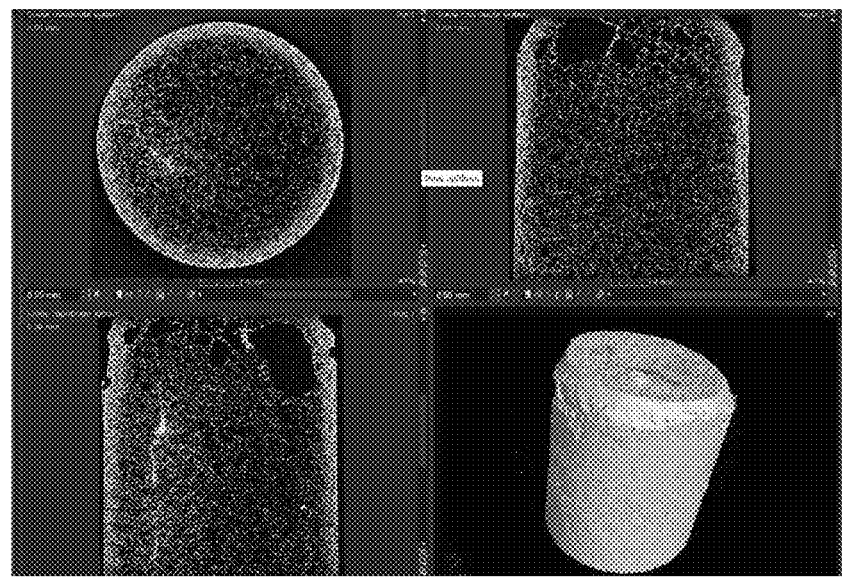
FIG. 24 shows the micro CT scans of foam samples made from Kraft lignin resins and various blowing agents (FIG. 24A) 0% Kraft lignin in 1,4-butanediol foam, FIG. 24B) 20% Kraft lignin in 1,4-butanediol foam, FIG. 24C) 40% Kraft lignin in 1,3-propanediol using D'4 foam, FIG. 24D) 40% Kraft lignin in 1,3-propanediol using HMS-991 foam, FIG. 24E) 40% Kraft lignin in 1,3-propanediol using HMS-992 foam, and FIG. 24F) 40% Kraft lignin in 1,3-propanediol using HMS-993 foam).
Figure 24B:
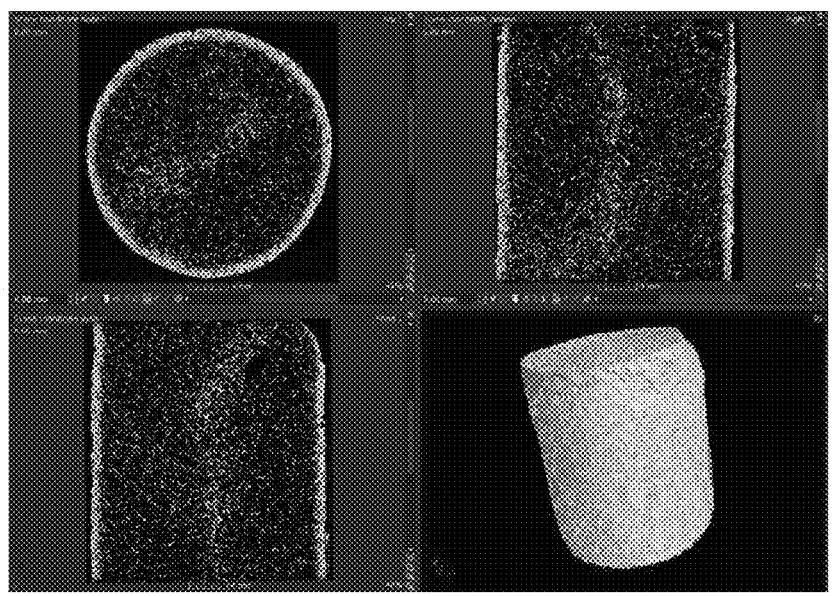
Figure 24C:
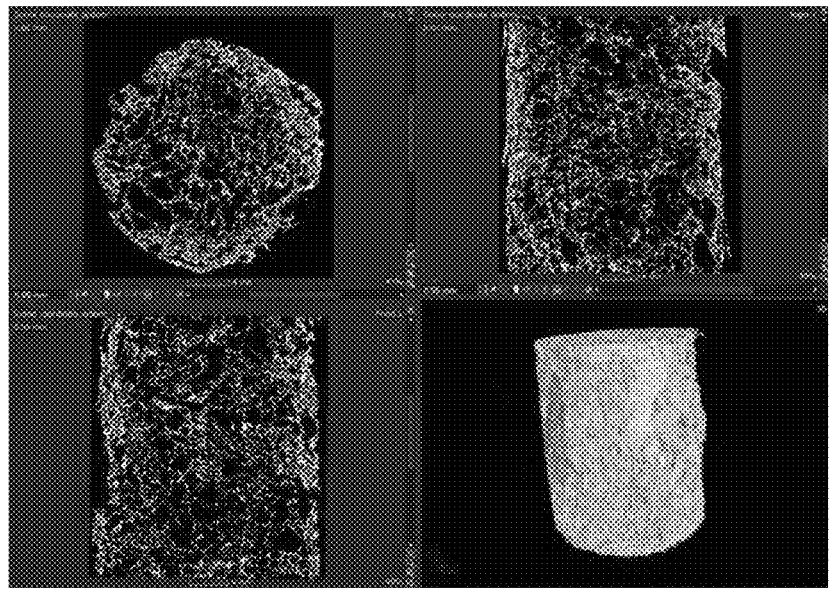
Figure 24D:
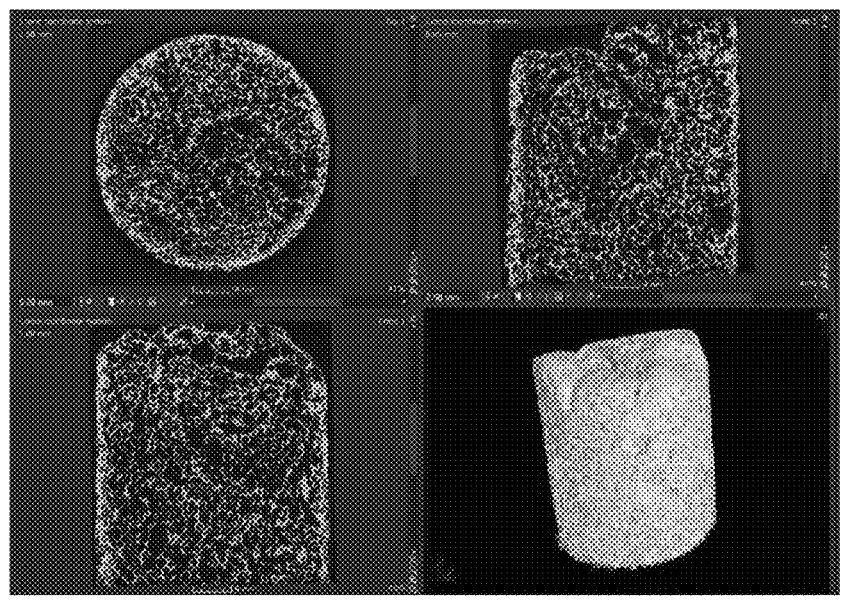

In FIG. 23, a top down view is visible in the top left picture, a side view from the right on the top right picture, and a left side view in the bottom left picture. The picture of the outside of the foam can be found in the bottom right. A structural foam is defined as having a rigid skin on the outside while having a cellular structure on the inside. Krall, Development of Novel Kraft Lignin Resins For Use In Thermoset Materials. Ph.D. Dissertation, North Dakota State University, Fargo, ND, 2019; Zepnik et al., Structural Foams of Biobased Isosorbide-Containing Copolycarbonate. *International Journal of Polymer Science* 2017, U.S. Pat. No. 4,308,687; Mazzon et al., Biobased structural epoxy foams derived from plant-oil: Formulation, manufacturing and characterization. *Industrial Crops and Products* 2020, 144, 111994. The images clearly demonstrate that these foams have a solid skin while still having a cellular core.

The cells on the inside of the foam exhibit a more uniform size distribution. There are some exceptions, but the bulk of the material exhibits a very uniform size. As discussed above, some foams had uneven size distribution which led to worse properties. Rong et al., Biginelli reaction on cellulose acetoacetate: a new approach for versatile cellulose derivatives. *Carbohydrate polymers* 2019, 209, 223-229.

The other trend that is noticeable is the larger the molecular weight of the blowing agents, the smaller the cells that were created (FIG. 24A-F). The foams made from cyclic blowing agents did follow this trend. These foams had very large pores that resembled some of the lignin foams disclosed above. This could explain why the foams made with a cyclic blowing agent had less than optimal mechanical properties and much lighter density than the foams made with non-cyclic blowing agents.

From FIG. 23, the foams seem to adopt a mixture of both open and closed cell structures. The open cell structures were present more in the foam with only a few cells being closed off. This trend stayed consistent for all the non-cyclic blowing agents. The foams made with cyclic blowing agents had all open cells. This may be due to the high amount of gas being released quickly from these blowing agents. This would account for both the larger cell size as well as the open cell structure.

Figure 25:
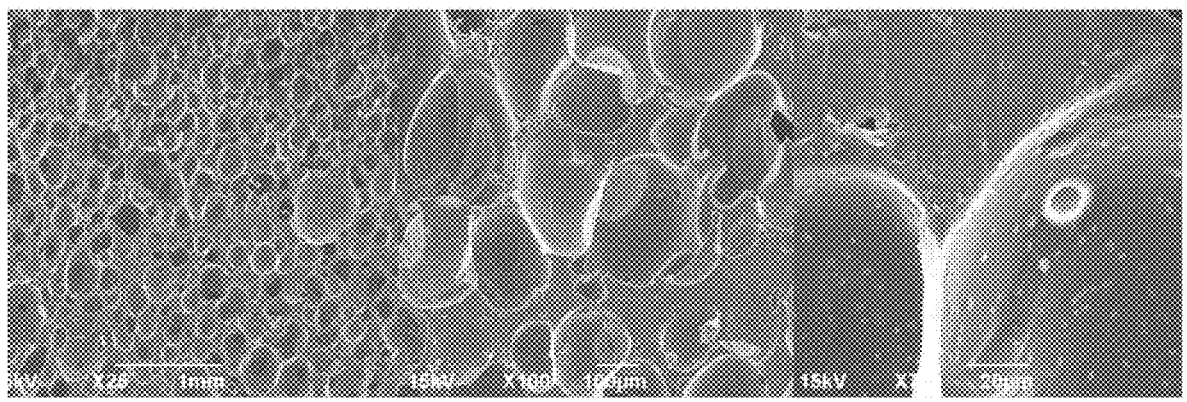
FIG. 25 shows SEM Images of 40% Kraft lignin in 1,4-butanediol foam.

FIG. 25 are images from SEM taken of the foam made from 40% Kraft lignin in 1,4-butanediol resin. These images exemplified what was consistent in the other foams. FIG. 24A-F show the rest of the images. The image on the left is under 25 times zoom. The image in the middle is under 100 times zoom and the image on the right is 750 times zoom.

FIG. 25 shows that the foam has pores that are too small for microCT to see. There are even micropores in the material. These are visible on the right most picture as the small specs inside the larger crevice. These pores are too small for the microCT to resolve and provide insight as to how the foam may initially form. This suggests that the larger pores are generated from much smaller reactions all releasing the hydrogen to form the larger pore.

3.3.3 Thermal Stability

Figure 26A:
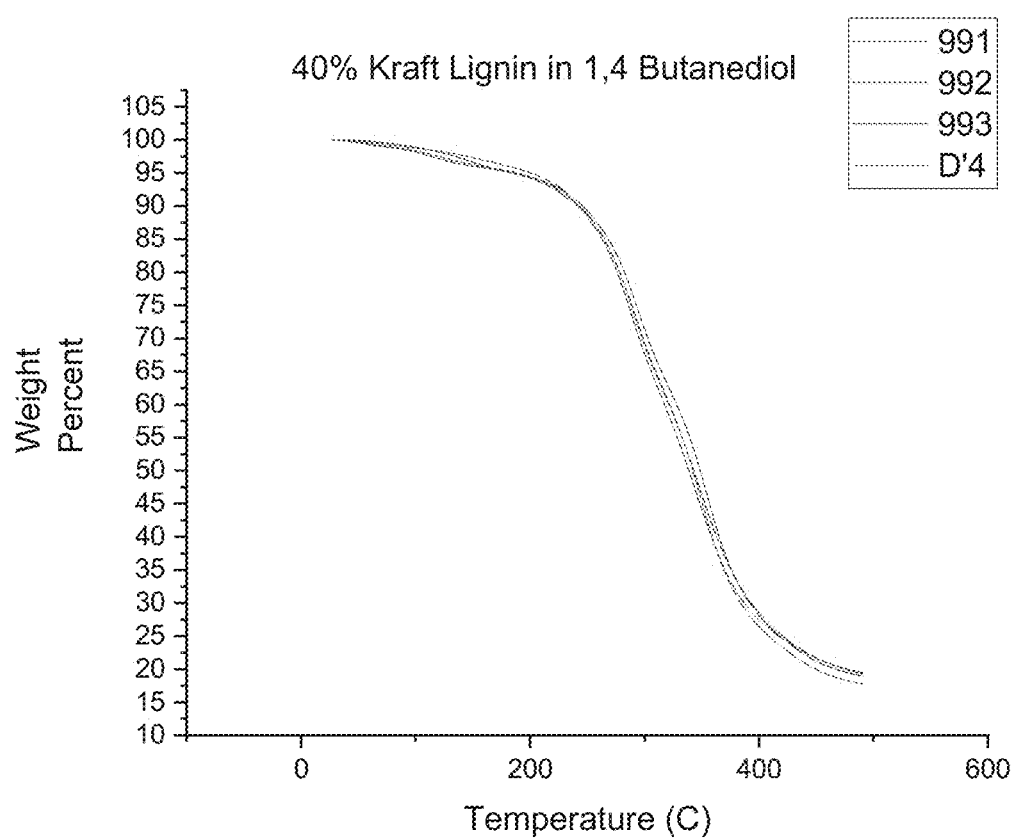
FIG. 26 shows the TGA Data of foam samples made from Kraft lignin resins and various blowing agents (FIG. 26A) 40% Kraft lignin in 1,4-butanediol foams, FIG. 26B) 60% Kraft lignin in 1,4-butanediol foams, FIG. 26C) 40% Kraft lignin in 1,3-propanediol foams, FIG. 26D) 40% Kraft lignin in diethylene glycol foams, FIG. 26E) 40% Kraft lignin in glycerol foams, FIG. 26F) 0% Kraft lignin in 1,4-butanediol foams, FIG. 26G) 20% Kraft lignin in 1,4-butanediol foams, and FIG. 26H) 40% Kraft lignin in ethylene glycol foams).
Figure 26B:
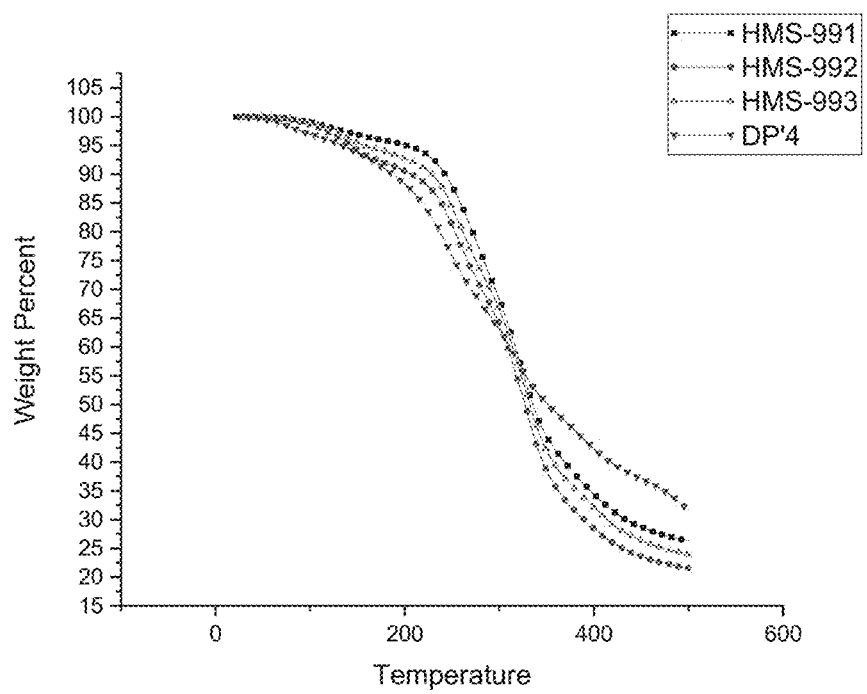
Figure 26C:
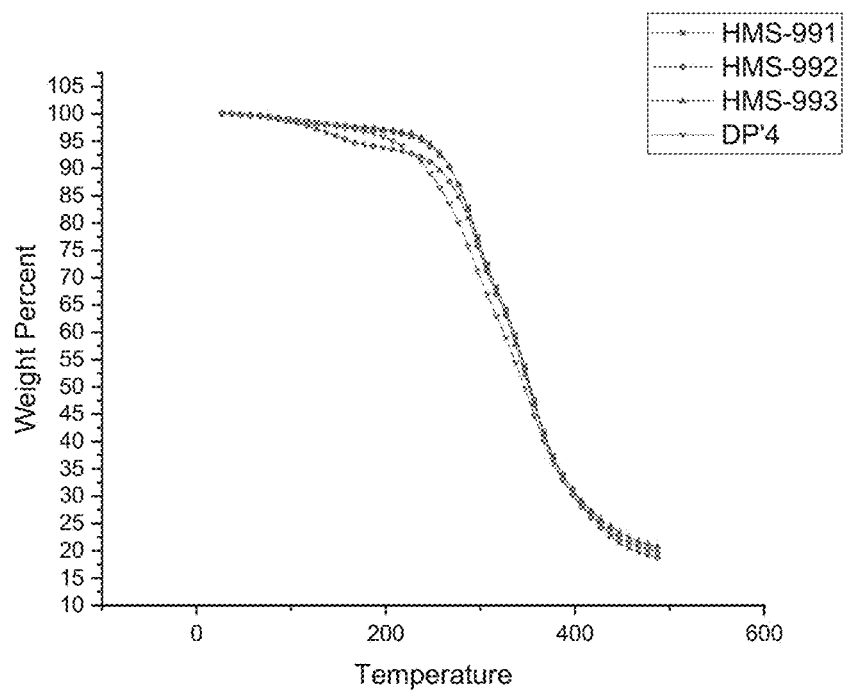
Figure 26D:
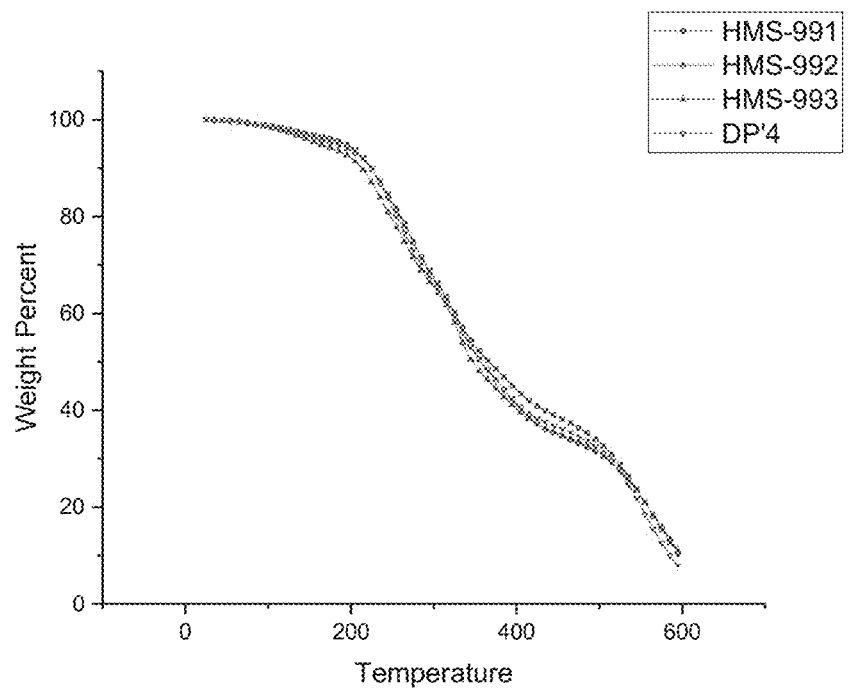
Figure 26E:
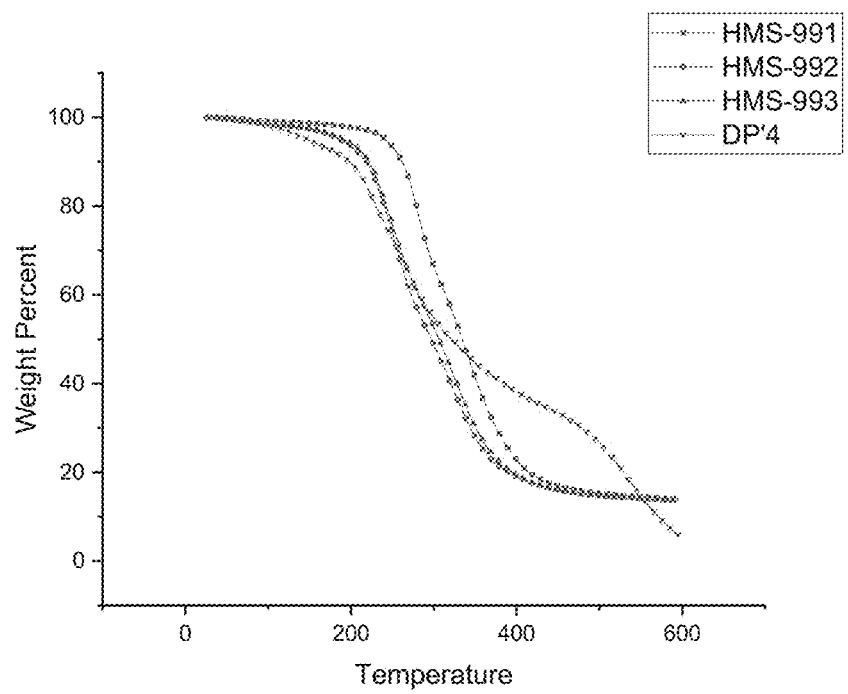
Figure 26F:
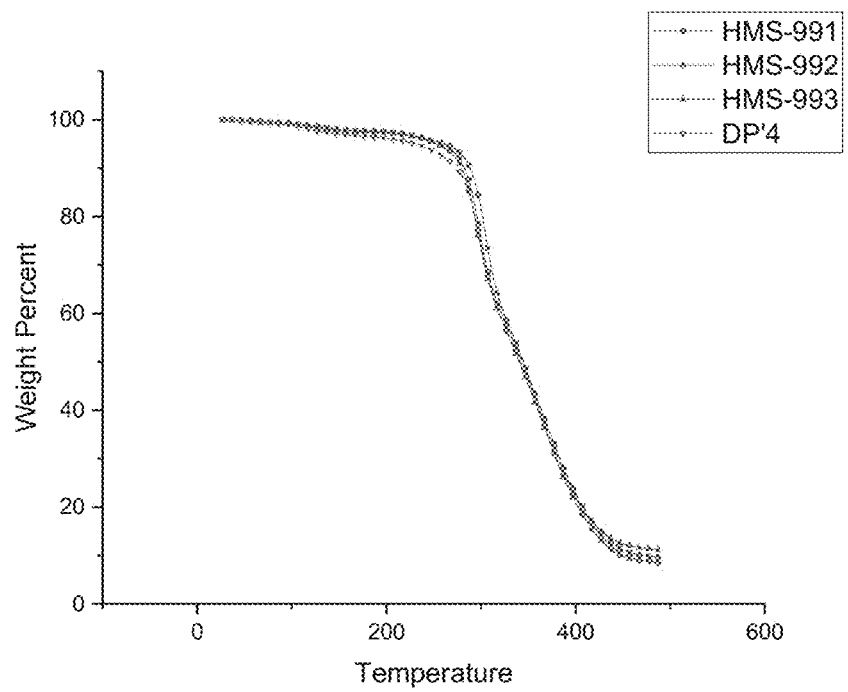
Figure 26G:
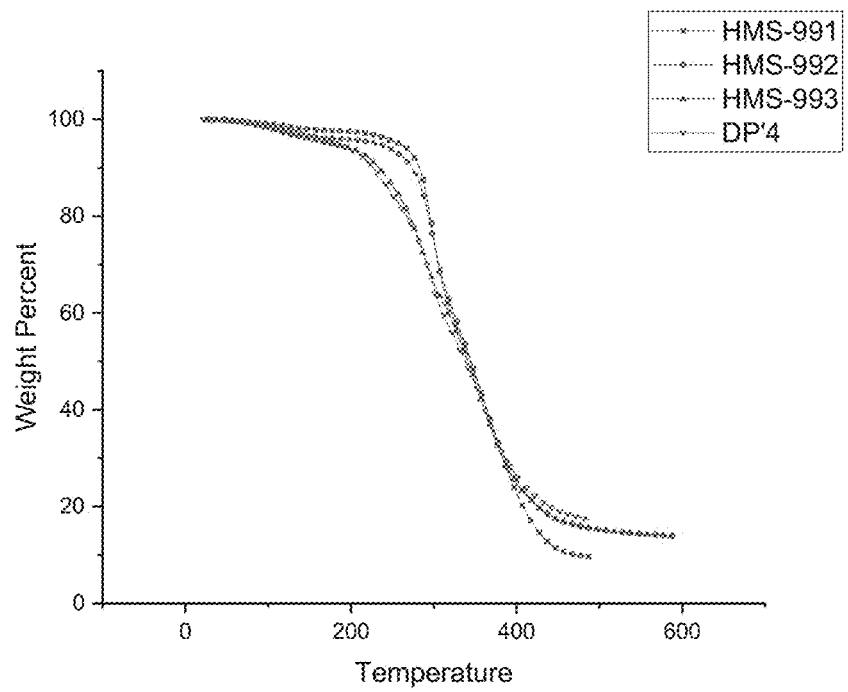
Figures 26, 26H:
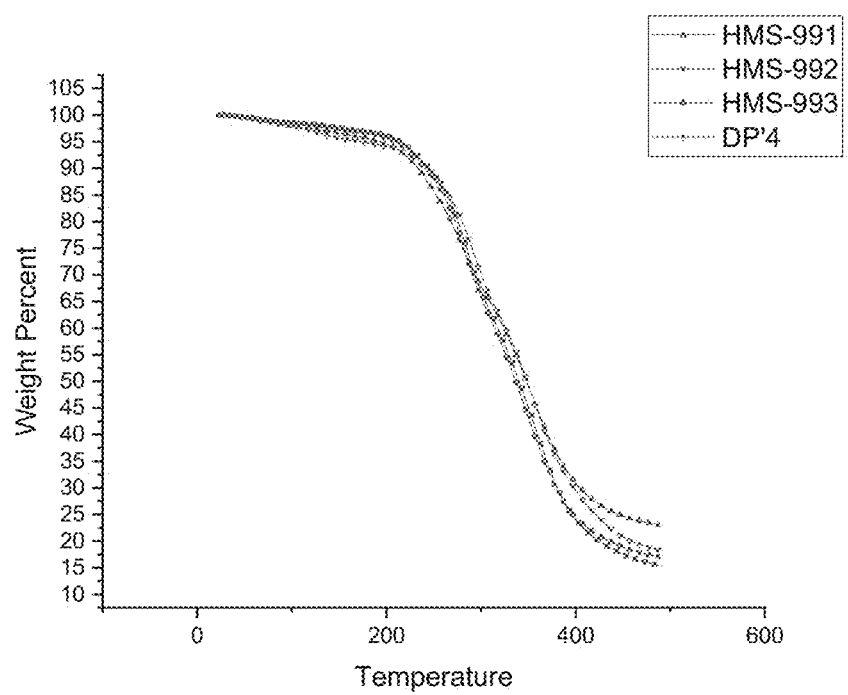

FIG. 26A shows the TGA curves of foams made with 40% KL BD resin. Using different blowing agents did not change the overall curve of the graph. This trend seems to be consistent even when changing diluent. This may be because the diluent is only a small portion of the overall weight of the foam. This would mean that changing the blowing agent would not affect the thermal degradation properties in a large way. The rest of the TGA curves for the other foams are shown in FIG. 26B-H.

The other trend is that the temperature at which the material decomposes is dependent on the type of diluent used. The increase in lignin concentration does not change the properties. This allows for the foams to have a higher concentration of lignin without losing properties. This both decreases the cost of production as well as increase how environmentally friendly each foam is.

3.3.4 Heat Capacity Measurements

Figure 27A:
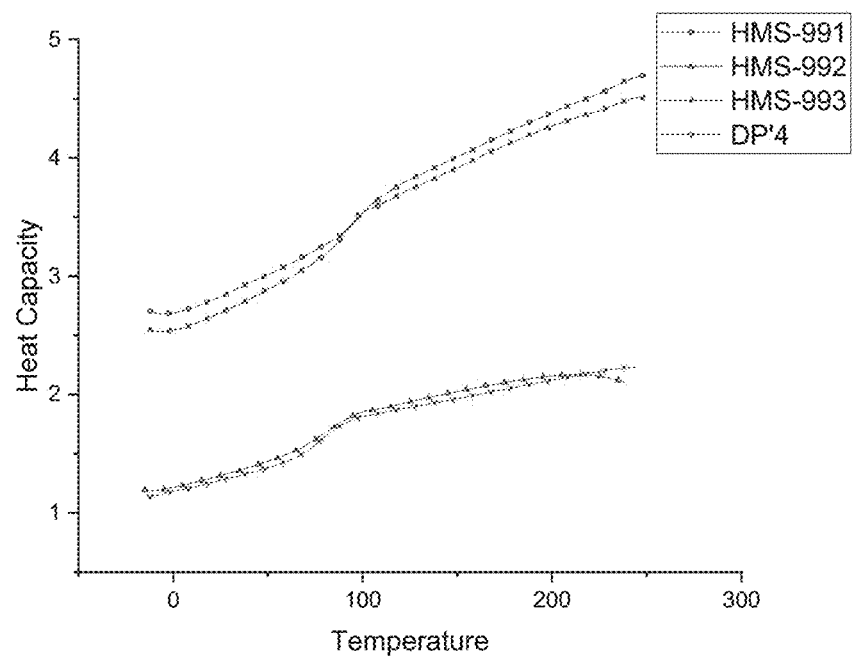
FIG. 27 shows the specific heat capacity measurements, measured by DSC, of foams made from Kraft lignin resins and various blowing agents (FIG. 27A) 40% Kraft lignin in ethylene glycol resin, FIG. 27B) 20% Kraft lignin in 1,4-butanediol foams, FIG. 27C) 40% Kraft lignin in glycerol foams, FIG. 27D) 0% Kraft lignin in 1,4-butanediol foams, and FIG. 27E) 60% Kraft lignin in 1,4-butanediol foams)
Figure 27B:
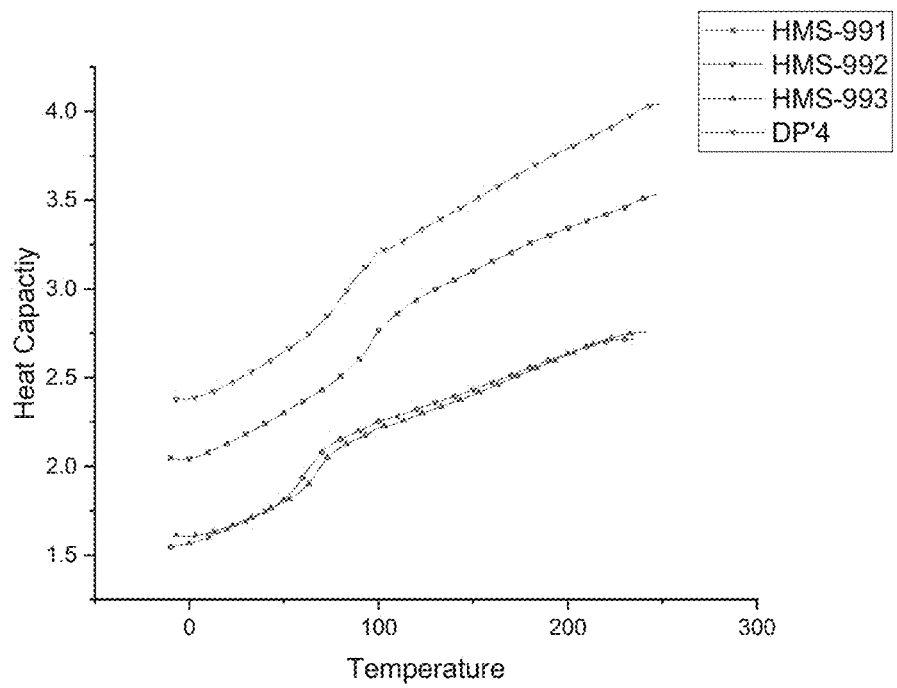
Figure 27C:
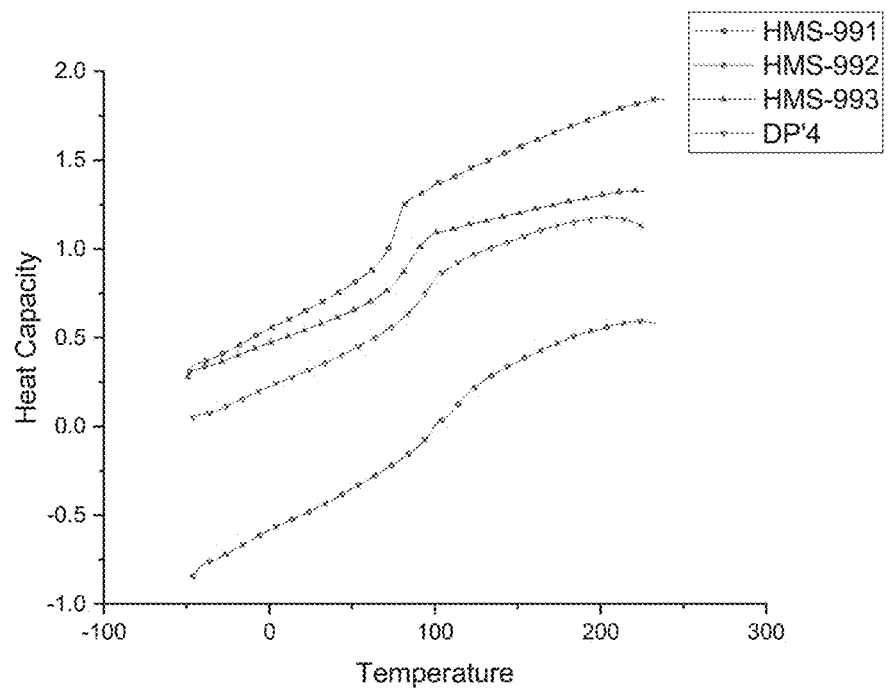
Figure 27D:
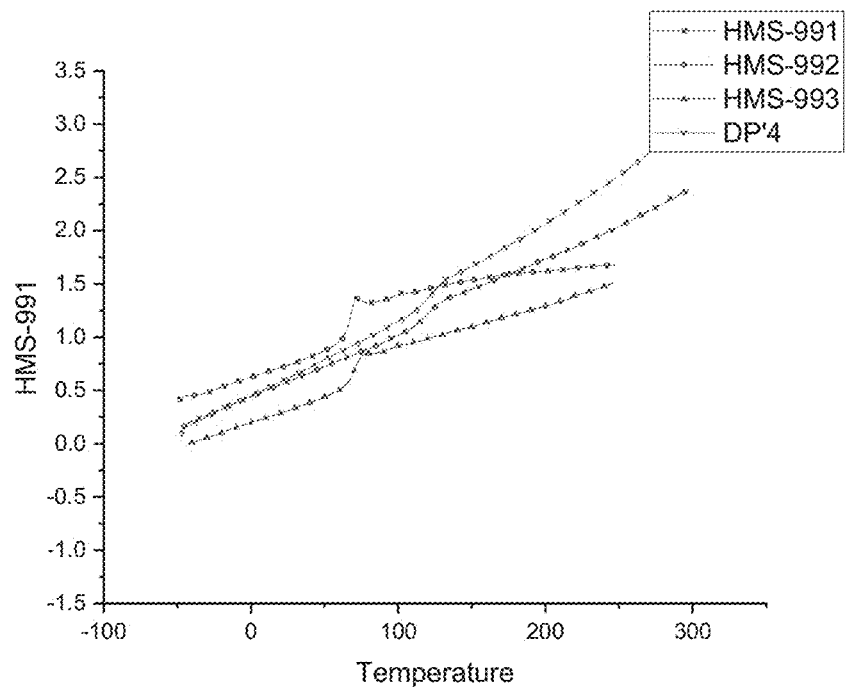
Figures 27, 27E:
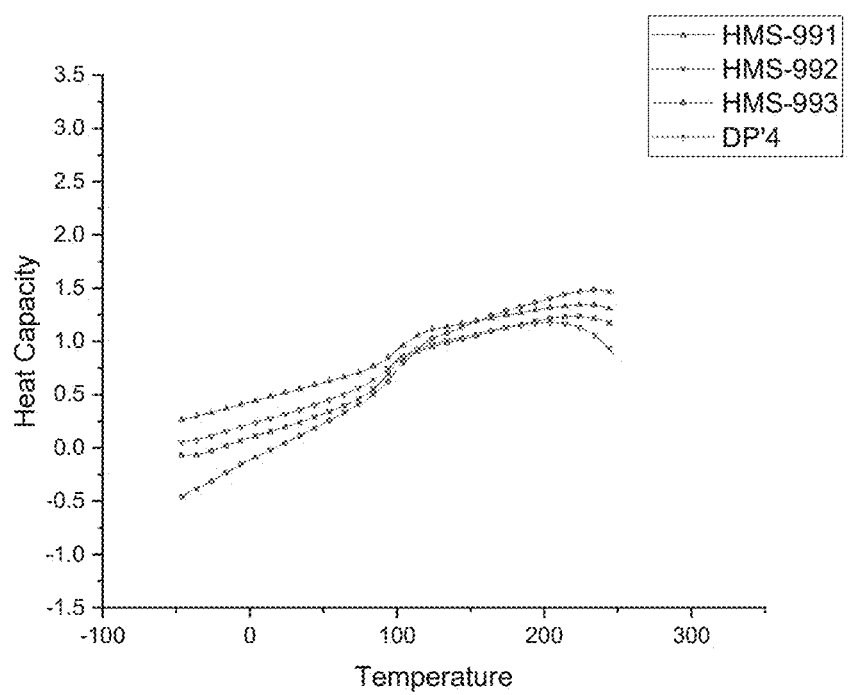

FIG. 27A shows the graph of the heat capacity of the foams made from 40% kraft lignin in ethylene glycol resin. The highest heat capacity of each different resin were the foams made with the blowing agent of HMS-991. The foams made with HMS-991 had the largest pore sizes. This follows previous work that the larger the pore size, the more insulating the foam is. Wang et al., Pore structures and thermal insulating properties of high Nb containing TiAl porous alloys. *Journal of alloys and compounds* 2010, 492 (1-2), 213-218. The glass transition temperature of each foam was 90±10° C. This foam is a hard glass until higher temperatures. The rest of the DSC curves for the other foams are shown in FIG. 27B-E.

3.3.5 Compressive Strength Measurements

Table 25 has the compressive strength of each foam in kPa. An interesting trend occurs throughout the entirety of the foams. The strongest foams were consistently made with HMS 992 blowing agent. This is odd because it has the molecular weight in the middle of the other two blowing agents. This suggests that the pore size that this blowing agent creates are geometrically stronger than what the other foams make. These properties compare well to those listed in Table 24. The foams sometimes have higher properties than that even of foams that are denser than themselves. The two strongest foams were those made with the blowing agent HMS 992 and the resins 20% KL BD and 40% KL PD. These both had compressive strengths over 6000 kPA.

TABLE 25

Compressive Strength of Enamine Foams in kPa

| Resin | HMS 991 | HMS 992 | HMS 993 |
|---|---|---|---|
| 0% KL BD | 3701 | 3783 | 2229 |
| 20% KL BD | 3163 | 6177 | 2788 |
| 40% KL BD | 1505 | 1914 | 858 |
| 60% KL BD | 1102 | 2573 | 2272 |
| 40% KL PD | 2715 | 6839 | 3781 |
| 40% KL EG | 1577 | 1805 | 1871 |
| 40% KL DEG | 1805 | 2002 | 1688 |
| 40% KL GLY | 540 | 2797 | 792 |

3.3.6 Flammability Testing

The results of the flame testing showed that none of the foams were flame retardant (Table 26). All flames were still burning after the allotted time. The foams, therefore, have no flame-retardant classifications according to UL-94V. https://www.professionalplastics.com/UL94FlameClassificationsForPlastics.

TABLE 26

Flammability Ratings According to UL-94V

| Resin | HMS-991 | HMS-992 | HMS-993 | D'4 |
|---|---|---|---|---|
| 0% KL BD | Fail/No Rating | Fail/No Rating | Fail/No Rating | Fail/No Rating |
| 20% KL BD | Fail/No Rating | Fail/No Rating | Fail/No Rating | Fail/No Rating |

TABLE 26-continued

Flammability Ratings According to UL-94V

| Resin | HMS-991 | HMS-992 | HMS-993 | D'4 |
|---|---|---|---|---|
| 40% KL BD | Fail/No Rating | Fail/No Rating | Fail/No Rating | Fail/No Rating |
| 60% KL BD | Fail/No Rating | Fail/No Rating | Fail/No Rating | Fail/No Rating |
| 40% KL PD | Fail/No Rating | Fail/No Rating | Fail/No Rating | Fail/No Rating |
| 40% KL EG | Fail/No Rating | Fail/No Rating | Fail/No Rating | Fail/No Rating |
| 40% KL DEG | Fail/No Rating | Fail/No Rating | Fail/No Rating | Fail/No Rating |
| 40% KL GLY | Fail/No Rating | Fail/No Rating | Fail/No Rating | Fail/No Rating |

4. Fire Retardant Lignin Foams

4.1 Materials

Indulin kraft lignin was received from Ingevity (formerly MeadWestvaco). Tert-butyl acetoacetate was provided by Eastman Chemical Company. 1,4-butanediol, and phytic acid were purchased from Sigma Aldrich. Tris (2-aminoethyl) amine (TAEA) was purchased from Alfa Aesar. Polymethylhydrosiloxane (HMS-991) were purchased from Gelest Inc. All reagents were used as received.

4.2 Methods

4.2.1 Resin Synthesis

Kraft lignin was placed in a reactor with 1,4-butanediol and tert-butyl acetoacetate. The ratio of 1,4-butanediol to kraft lignin was 60% to 40% by weight. Tert-butyl acetoacetate was added in a stoichiometric ratio based on the number of hydroxyls groups present. Nitrogen was bubbled through the mixture. The reaction was carried out at 130° C. for 24 hours. The reactor was connected to a condenser to collect any byproduct that boiled off. The resin was then analyzed gravimetrically and using Fourier-Transform Infrared Spectrometry (FT-IR). Infrared spectra were collected with a Nicolet™ iS™ 10 FTIR Spectrometer using a KBR pellet to hold the resin and processed using Omnix and KnowItAll Software.

4.2.2 Acetoacetate Titrations

To determine the extent of functionalization, a quantitative titration was done. To accomplish this an excess of amine and resin was mixed for 24 hours at 80° C. The mixture was then diluted with water and phenolphthalein indicator was added. The mixture was titrated until the end point and the acetoacetate equivalent weight was determined through back titration calculations.

4.2.3 Foam Creation

The resin was homogenized with the polysiloxane and phytic acid. TAEA was added in stoichiometric amounts and the mixture was stirred on a vortex mixer. The forming polymer was mixed in a mold to allow a free rise formation of foam. Once the foam had stopped rising, it was allowed to cure under ambient conditions for a week. Table 27 lists the foam formulations used. The foams containing 0% and 20% phytic acid were analyzed using FTIR to determine the linkage.

TABLE 27

Foam Formulations

| Foam | Lignin Resin | HMS-991 | TAEA | Phytic Acid |
|---|---|---|---|---|
| 0% | 5 g | 0.23 g | 1.82 | 0 g |
| 1% | 5 g | 0.23 g | 1.86 | 0.05 g |
| 2% | 5 g | 0.23 g | 1.90 | 0.10 g |
| 5% | 5 g | 0.23 g | 2.02 | 0.25 g |
| 10% | 5 g | 0.23 g | 2.22 | 0.50 g |
| 12% | 5 g | 0.23 g | 2.30 | 0.60 g |
| 15% | 5 g | 0.23 g | 2.40 | 0.75 g |
| 20% | 5 g | 0.23 g | 2.65 | 1.00 g |

4.2.4 Foam Density

The foams' density was tested according to ASTM D792. This test was repeated 6 times to ensure repeatability.

4.2.6 Thermal Stability

Each different foam was analyzed using thermal gravimetric analysis (TGA) to determine the decomposition temperature and its char formation at high temperatures. The analysis was run under both a nitrogen and ambient atmosphere. The heating rate was 5° C./min. The maximum temperature reached was 500° C. The material on which the samples were analyzed was platinum. The furnace was cooled for 10 minutes in between each sample. Thermal gravimetric analysis (TGA) curves were collected on a TA Q500 TGA.

4.2.7 Heat Capacity Measurements

Each different formulation was analyzed using differential scanning calorimetry (DSC) to determine its heat capacity and glass transition temperature (Tg). The test run was a heat-cool-heat cycle. The heating rate and cooling rate were both 5° C./min. The test started at ambient conditions, heated up to 250° C., cooled to 0° C., and then heated to 250° C. again. The pans used were made of aluminum. The gas used was nitrogen at 50 mL/min. The results were taken from the data of the third cycle. Differential scanning calorimetry (DSC) curves were collected on a TA Q1000 DSC.

Each different formulation was also analyzed under modulated DSC to determine the thermal conductivity. The test was conducted according to the procedure laid out by TA instruments.[31]

4.2.8 Compression Testing

The compressive strength was tested according to ASTM D1621.32 This test was repeated three times to ensure repeatability. The speed of compression was 5 mm/minute. The maximum compressive strength was determined by the maximum equilibrium force. Compressive strength data was collected on the MTS M26 Pull Tester.

4.2.9 XPS Measurements

Three samples were cut into discs. Each disk was scanned by XPS in three locations, the center of the disk, the edge of the disk and a midway point between the two. Once loaded into the XPS, the foam samples were held under vacuum overnight to off-gas the foam and allow trapped air to escape. The samples were then loaded into the analysis chamber the next day. Prior to measuring the surfaces, they were first cleaned by argon cluster ion beam etch for 30 seconds at 4,000 eV to remove surface contamination. Each spot was then analyzed by survey scan, 400 micron spot size, 200 eV pass energy, 10 ms dwell time, and 30 second scan time for a total of 10 scan. Each spot was then analyzed by Hi Res scan individually for P, C and O using a 400 micron spot size, 50 eV pass energy, 50 ms dwell time, for 10 scans. XPS data was collected on A Thermo Scientific K-Alpha X-Ray Photoelectron Spectrometer.

4.2.10 Flame Testing

The flame retardancy was first tested by the UL-94 standardization for each different formulation.[33] The gas used in the test was butane. The flame would completely surround the foam from the bottom side. This flame would be held on the foam for 10 seconds before being taken off. If the foam managed to put out the flame within 30 seconds the foam would then be subjected to another 10 seconds of flame. Each test had 6 replicates to ensure repeatability.

4.3. Results

4.3.1 FTIR and Acetoacetate Titration

Figure 28:
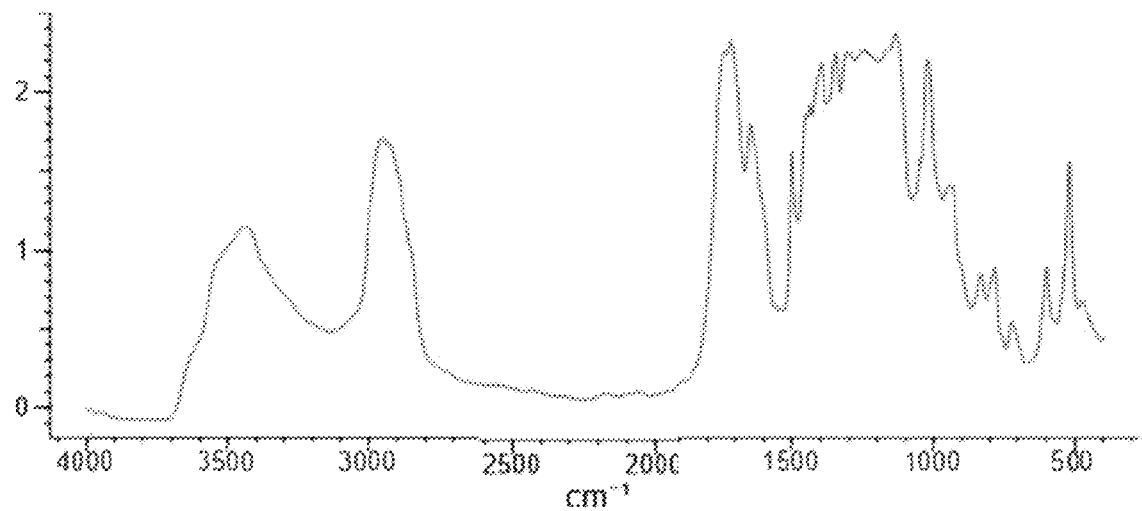
FIG. 28 shows the FTIR spectrum of the acetoacetylated Kraft lignin resin made with 1,4-butanediol.

FTIR results were used to determine whether the acetoacetylation was complete or not. FIG. 28 show the FTIR graph for the acetoacetylated Kraft lignin resin made with 1,4-butanediol.

The ketone of the acetoacetate can be seen at 1705-1725 $cm^1$. The two ester peaks can be seen at 1735-1750 $cm^1$ for the carbonyl and 1160-1210 $cm^{-1}$ for the ether. These peaks are sharp peaks and are very visible. The hydroxyl peaks should appear at 1180-1260 $cm^{-1}$ as very sharp and strong peaks, which they do not. The acetoacetate titrations revealed that the resin was within 5 grams per equivalent of the previously established equivalent weight.

Figure 29:
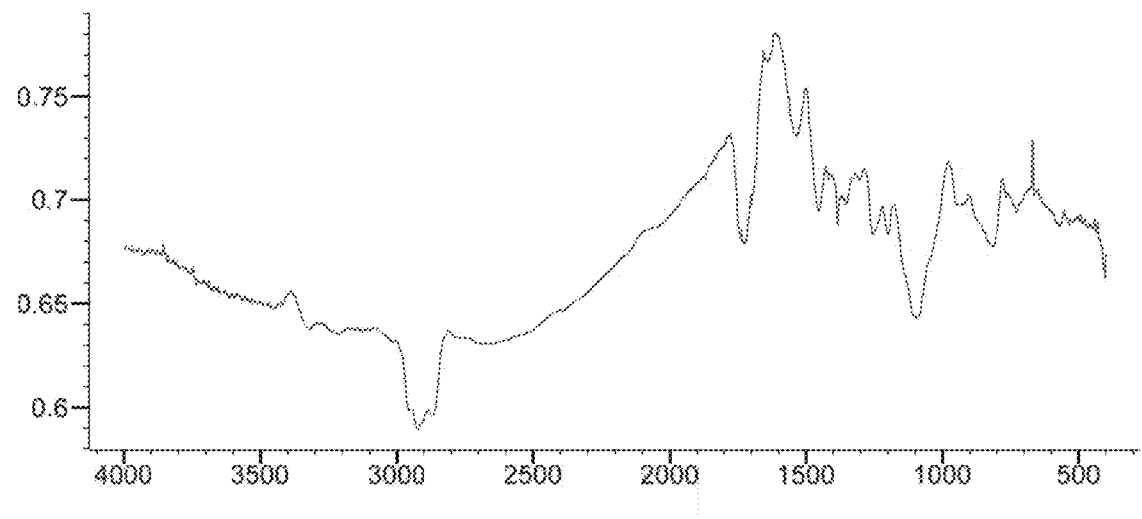
FIG. 29 shows the FTIR of 0% phytic acid foam.
Figure 30:
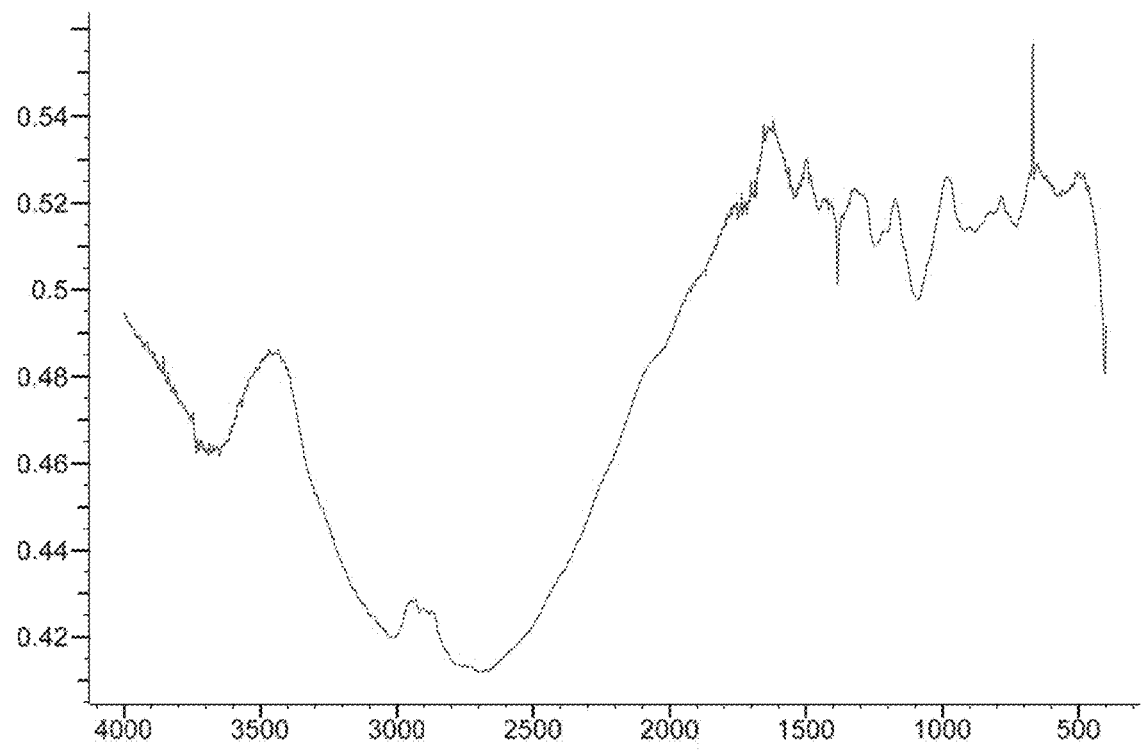
FIG. 30 shows the FTIR of 20% phytic acid foam.

FIGS. 29 and 30 show the FTIR of the foams. The peak at 985 $cm^1$ shows that the phosphorous oxygen group was modified. This is a shift from the 0% phytic acid phosphorous peak which is at 976 $cm^{-1}$.

The formation scheme of TAEA-PA is illustrated by Scheme 14. The amines of TAEA react with phytic acid to form quaternary ammonium salts. Shang et al., Facile preparation of layered melamine-phytate flame retardant via supramolecular self-assembly technology. *Journal of colloid and interface science* 2019, 553, 364-371. This then means that the phytic acid will be bound to the polymer matrix through ionic interactions.

Scheme 14. Formation of Quaternary Ammonium Salt

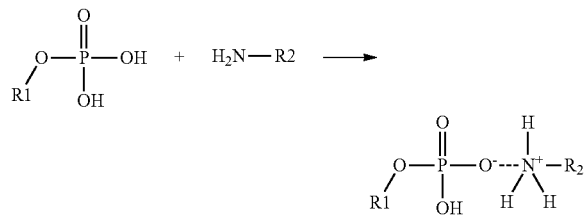

4.3.2 Density

The density of the foams increased with the addition of phytic acid. This is to be expected as increasing the amount of phytic acid corresponded to a decrease in amount that the foam would rise. Table 28 shows the data from the density measurements.

TABLE 28

Densities of Different Formulations (in g/cm³)

| Phytic Content | 0% | 1% | 2% | 5% | 10% | 12% | 15% | 20% |
|---|---|---|---|---|---|---|---|---|
| Density | 0.236 | 0.265 | 0.270 | 0.332 | 0.347 | 0.356 | 0.365 | 0.362 |

4.3.3 Thermal Stability

Figure 31:
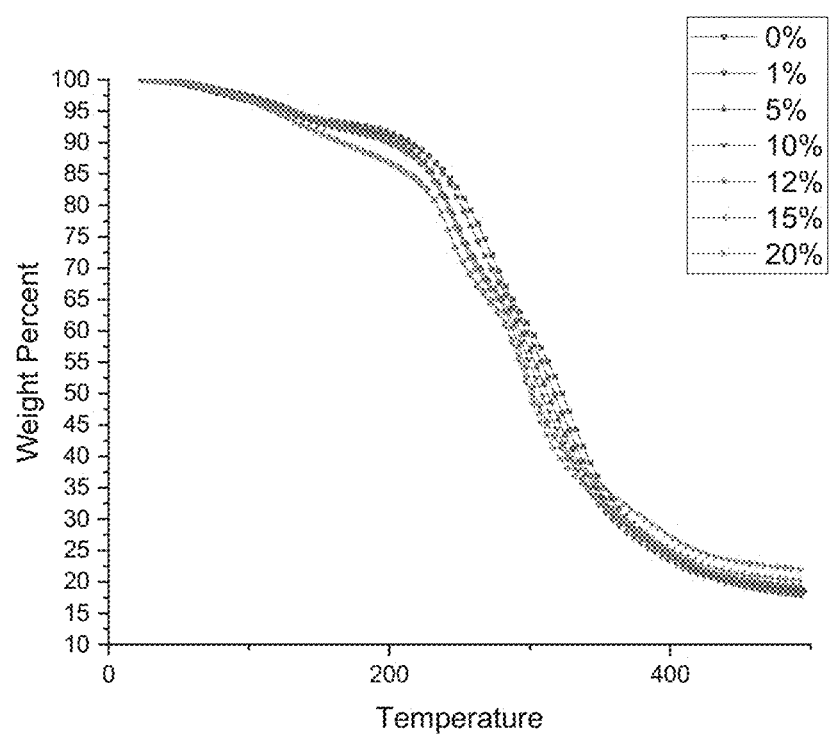
FIG. 31 shows the TGA curves under nitrogen atmosphere for the phytic acid foams.
Figure 32:
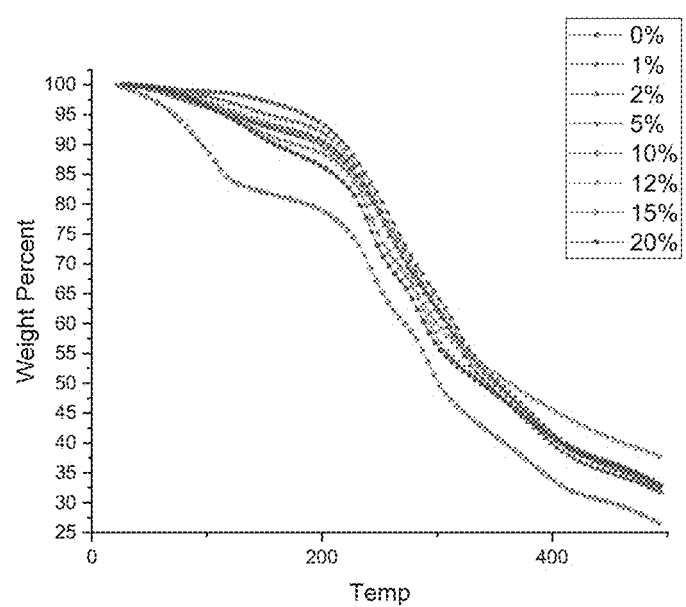
FIG. 32 shows the TGA curves under air for the phytic acid foams.
Figure 33:
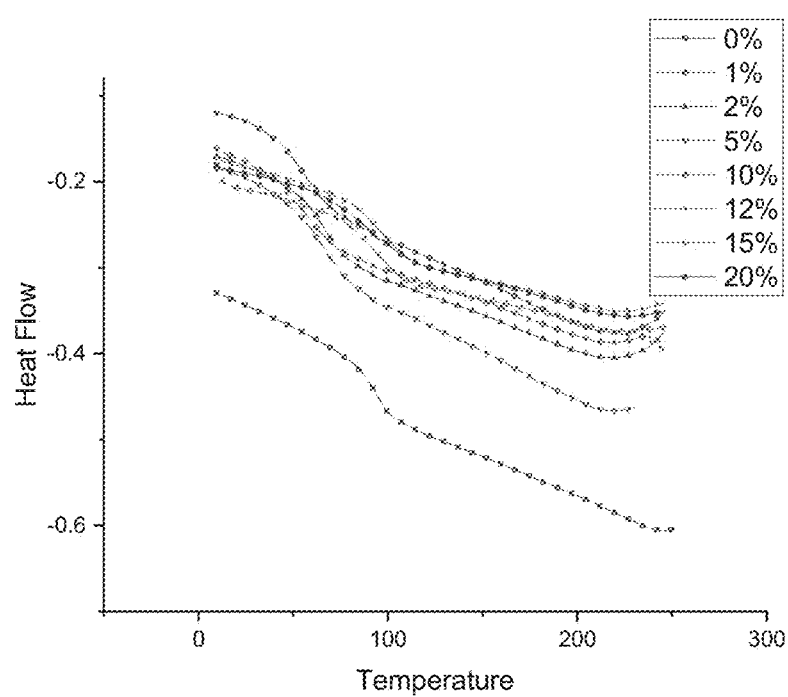
FIG. 33 shows the DSC curves of the phytic acid foams.

Two different gasses were used in TGA to test the breakdown of the material under both nitrogen and ambient atmospheric gases, since there may be different char formations based on the type of atmosphere. FIGS. 31 and 32 show the TGA curves for the two different gases. Table 29 shows the degradation temperatures.

Both graphs show similar trends. The real differences come after most of the foam has degraded where the char formation starts to happen. The higher the amount of phytic acid in the foam the more the graph starts to shift towards less weight loss as the foam reacts with the oxygen. The foams with higher phytic acid content had a larger degradation initially from the foams with lower amounts of phytic acid. Table 29 shows the temperature at which the foams had lost 5% of their weight (T5%).

TABLE 29

Degradation Temperatures (T5%) of Lignin Foams

| | Phytic Acid Percentage | | | | | | | |
|---|---|---|---|---|---|---|---|---|
| | 0% | 1% | 2% | 5% | 10% | 12% | 15% | 20% |
| Degradation Temperature (Nitrogen) | 213 | 216 | 212 | 206 | 201 | 199 | 165 | 167 |
| Degradation Temperature (Air) | 204 | 219 | 198 | 214 | 96 | 197 | 176 | 159 |

The foams showed the general trend of degrading at a lower temperature with the addition of more phytic acid. This trend is also evident from the data from the graphs as they showed the faster decrease in weight percentage than the ones with lower phytic content. This may be because the phytic acid has water content and when heated that water content is liberated resulting in higher weight loss at lower temperatures.

4.3.4 Heat Capacity

DSC was used to find both the thermal conductivity and glass transition temperature. FIG. 34 shows the graph of the DSC curves of the phytic acid foams. Table 30 shows all the glass transition temperatures and thermal conductivity data.

TABLE 30

Glass Transition Temperatures and Thermal Conductivity

| | Phytic Acid Percentage | | | | | | | |
|---|---|---|---|---|---|---|---|---|
| | 0% | 1% | 2% | 5% | 10% | 12% | 15% | 20% |
| $T_g$ (° C.) | 77.44 | 56.00 | 77.53 | 65.06 | 57.30 | 91.03 | 92.15 | 90.82 |
| Thermal Conductivity (W/Km) | .00284 | .00449 | .00306 | .00281 | .00109 | .00360 | .00627 | .0463 |

The results show that the glass transition temperature varied randomly with the addition of phytic acid. However, the 12-20% phytic acid foams have a significantly higher glass transition temperature than that of the lower concentrations. This may be due to the phytic acid making the foam more brittle once a critical concentration was reached.

4.3.5 Compression Testing

The compression testing showed that the foams incorporating phytic acid had lower strength than that of those made without phytic acid. The total compressive strength did not to a great extent but there was a noticeable level. Table 31 shows the results of the compression tests.

TABLE 31

Compression Testing (in kPa)

Phytic Acid Percentage

| | 0% | 1% | 2% | 5% | 10% | 12% | 15% | 20% |
|---|---|---|---|---|---|---|---|---|
| Strength | 1766 | 1578 | 1081 | 1224 | 1017 | 1023 | 961 | 952 |

The highest strength was the foams made without phytic acid. The strength then decreased after the addition of phytic acid. This is because the phytic acid made the foams more brittle and therefore easier to break. However, the strength of these foams is still high with even the highest concentration of phytic acid having nearly 1 MPa in strength.

4.3.6 XPS

XPS showed that the phytic acid was incorporated into the foam. Table 32 shows the data from XPS.

TABLE 32

XPS Data

| Section | Percent Phosphorous |
|---|---|
| 0% Phytic Acid Edge | 0% |
| 0% Phytic Acid Midway | 0% |
| 0% Phytic Acid Inside | 0% |
| 10% Phytic Acid Edge | 1.353% |
| 10% Phytic Acid Midway | 1.05% |
| 10% Phytic Acid Inside | 0% |
| 20% Phytic Acid Edge | 1.353% |
| 20% Phytic Acid Midway | 0.88% |
| 20% Phytic Acid Inside | 0% |

The phytic acid solution tended to stay towards the outside of the foam as the amount of phytic acid present in the foam decreased moving towards the center of the foam. This may be due to the density of the phytic acid and how the foam was created. Since the foam was homogenized using a vortex mixer, the denser parts of the material would be pushed to the outside due to centripetal force. This would then have the phytic acid trapped on the edge of the foam. This is beneficial because having the phytic acid on the outside of the foam would lead to more fire retardancy in the foam earlier.

4.3.7 UL-94 Standardization

The foams showed that even with a small amount of phytic acid, there was char formation. However, this char was not enough for some of the lower phytic acid concentrations to stop the spread of flame. Table 33 has the ratings for each foam formulation. The relevant ratings relate to the V UL-94 test method. A rating of V1 indicates that a substance was able to put out a flame in 30 seconds or less twice. The rating of V0 means that the foam was able to put out the flame within 10 seconds twice.

TABLE 33

UL-94 Standardizations

Phytic Acid Percentage

| | 0% | 1% | 2% | 5% | 10% | 12% | 15% | 20% |
|---|---|---|---|---|---|---|---|---|
| Standardization | N/A | N/A | N/A | N/A | N/A | V1 | V1 | V0 |

The foams with 12, 15, and 20 percent phytic acid all passed the standardization requirements. The lower concentrations failed to extinguish the flames or stop the spread up to the clamp during the tests. None of the foams had any dripping particles during any of the test runs. The foams made with 10% phytic acid extinguished the flame after 40 seconds while the others failed to do so in any meaningful time.

The claimed invention is:

1. A foam material, comprising the reaction product of:
   a) at least one acetoacetylated resin composition;
   b) at least one polyamine compound;
   c) at least one physical blowing agent and/or at least one polysiloxane compound;
   d) optionally at least one surfactant; and e) optionally phytic acid.

2. The foam of claim 1, wherein the acetoacetylated resin composition comprises the reaction product of:
   a1) at least one polyol;
   a2) optionally lignin; and
   a3) at least one acetoacetate ester.

3. The foam of claim 2, wherein the at least one polyol is selected from the group consisting of a diol, a triol, and mixtures thereof.

4. The foam of claim 3, wherein the diol is selected from the group consisting of diethylene glycol, 2-butyl-2-ethyl-1,3-propanediol, ethylene glycol, 1,2-propanediol, 1,3-propanediol, 2-methyl-1,3-propanediol, 1,4-butanediol, 2,3-butanediol, 1,5-pentanediol, 1,6-hexanediol, 1,4-cyclohexanedimethanol, neopentyl glycol, and mixtures thereof.

5. The foam of claim 3, wherein the triol is selected from the group consisting of trimethylolpropane, trimethylolethane, glycerol, and mixtures thereof.

6. The foam of claim 2, wherein the lignin is present.

7. The foam of claim 2, wherein the acetoacetate ester is tertiary-butyl acetoacetate.

8. The foam of claim 2, wherein:
   the polyol is selected from the group consisting of 1,4-butanediol, 1,3-propanediol, diethylene glycol, ethylene glycol, and glycerol;
   the lignin is Kraft lignin; and
   the acetoacetate ester is tertiary-butyl acetoacetate.

9. The foam of claim 1, wherein the acetoacetylated resin composition is present in an amount ranging from about 25-95 wt %.

10. The foam of claim 1, wherein the polyamine compound is tris (2-aminoethyl)amine.

11. The foam of claim 1, wherein the polyamine compound is present in an amount ranging from about 5-75 wt %.

12. The foam of claim 1, wherein the physical blowing agent is present in an amount ranging from about 0.5-45 wt %.

13. The foam of claim 1, wherein the polysiloxane compound is selected from the group consisting of poly(methylhydrosiloxane), copolymers of poly(methylhydrosiloxane), tetramethylcyclotetrasiloxane, and mixtures thereof.

14. The foam of claim 1, wherein the polysiloxane compound is present in an amount ranging from about 0.1-20 wt %.

15. The foam of claim 1, wherein the surfactant is present in an amount ranging from about 0.1-5 wt %.

16. The foam of claim 1, wherein the phytic acid is present in an amount ranging from about 0.1-45 wt %.

17. The foam of claim 1, wherein the foam is fire retardant as determined by UL-94V standardization.

18. A method for making the foam of claim 1, comprising the step of contacting the at least one acetoacetylated resin composition with the at least one polyamine compound, the at least one physical blowing agent and/or at least one polysiloxane compound, the at least one optional surfactant, and the optional phytic acid.

19. An article of manufacture, comprising the foam of claim 1.

20. The foam of claim 6, wherein the lignin is Kraft lignin.

21. The foam of claim 1, wherein the polyamine compound is a polyfunctional amine compound.

* * * * *